US012662213B2

(12) United States Patent
Hancock et al.

(10) Patent No.: US 12,662,213 B2
(45) Date of Patent: Jun. 23, 2026

(54) AUTOMATIC CONTROL OF A MOTOR-ASSISTED BICYCLE TO ACHIEVE A DESIRED RIDE OBJECTIVE OF A RIDER

(71) Applicant: enviolo B.V., Amsterdam (NL)

(72) Inventors: David Hancock, Dallas, TX (US); C.A. van den Ende, Amsterdam (NL); Kevin Kreidler, Round Rock, TX (US)

(73) Assignee: enviolo B.V., Amsterdam (NL)

( * ) Notice: Subject to any disclaimer, the term of this patent is extended or adjusted under 35 U.S.C. 154(b) by 897 days.

(21) Appl. No.: 17/677,551

(22) Filed: Feb. 22, 2022

(65) Prior Publication Data

US 2022/0266946 A1      Aug. 25, 2022

Related U.S. Application Data

(60) Provisional application No. 63/152,225, filed on Feb. 22, 2021.

(51) Int. Cl.
*B62M 6/50* (2010.01)
*B62J 45/20* (2020.01)
(Continued)

(52) U.S. Cl.
CPC ................ *B62M 6/50* (2013.01); *B62J 45/20* (2020.02); *B62J 45/412* (2020.02); *B62K 25/04* (2013.01)

(58) Field of Classification Search
CPC .... B62M 6/50; B62M 2025/006; B62J 45/20; B62J 45/412; B62J 45/414; B62J 45/4152;
(Continued)

(56) References Cited

U.S. PATENT DOCUMENTS

| 225,933 | A | 3/1880 | Kellogg |
| 719,595 | A | 2/1903 | Huss |
| | | (Continued) | |

FOREIGN PATENT DOCUMENTS

| CH | 118064 | 12/1926 |
| CN | 1047556 | 12/1990 |
| | (Continued) | |

OTHER PUBLICATIONS

Chinese Office Action dated Aug. 26, 2013 for Chinese Patent Application No. 201110120716.1.
(Continued)

*Primary Examiner* — Nga X Nguyen
(74) *Attorney, Agent, or Firm* — Sheppard Mullin Richter & Hampton LLP

(57)      ABSTRACT

Electric bikes ("e-bikes") configured to achieve automatic and dynamic ride control based on a rider's desired ride objective without requiring direct physical inputs from the rider during the ride are disclosed. A rider specifies, via her mobile device or a device integrated with the e-bike, various input parameters representative of a desired ride objective. An objective-based ride control algorithm is then executed to determine—based on sensor information indicative of input variables such as pedal cadence, vehicle speed, current transmission position, electric motor power, GPS location, terrain elevation, and the like—settings for controlled variables such as transmission ratio, motor assist level, braking force, and/or suspension pressure in order to support the rider's desired ride objective, as represented by the specified input parameters. As such, a rider achieves a desired ride experience without having to directly manipulate controlled variables during the ride.

21 Claims, 13 Drawing Sheets

(51) Int. Cl.
  *B62J 45/412* (2020.01)
  *B62K 25/04* (2006.01)

(58) Field of Classification Search
  CPC ......... B62J 45/416; B62J 50/22; B62K 25/04;
          B62K 2025/044; B62K 2025/045; Y02T
                  10/60; Y02T 90/16
  See application file for complete search history.

(56) References Cited

U.S. PATENT DOCUMENTS

| | | |
|---|---|---|
| 721,663 A | 3/1903 | James |
| 1,121,210 A | 12/1914 | Hans |
| 1,175,677 A | 3/1916 | Glenn |
| 1,207,985 A | 12/1916 | Null |
| 1,380,006 A | 5/1921 | Nielsen |
| 1,390,971 A | 9/1921 | Samain |
| 1,558,222 A | 10/1925 | Beetow |
| 1,629,092 A | 5/1927 | Crockett |
| 1,629,902 A | 5/1927 | Arter |
| 1,686,446 A | 10/1928 | Gilman |
| 1,774,254 A | 8/1930 | Daukus |
| 1,793,571 A | 2/1931 | Vaughn |
| 1,847,027 A | 2/1932 | Thomas |
| 1,850,189 A | 3/1932 | Weiss |
| 1,858,696 A | 5/1932 | Weiss |
| 1,865,102 A | 6/1932 | Hayes |
| 1,903,228 A | 3/1933 | Thomson |
| 1,947,044 A | 2/1934 | Gove |
| 1,978,439 A | 10/1934 | Sharpe |
| 2,030,203 A | 2/1936 | Gove |
| 2,060,884 A | 11/1936 | Madle |
| 2,086,491 A | 7/1937 | Dodge |
| 2,097,631 A | 11/1937 | Madle |
| 2,100,629 A | 11/1937 | Chilton |
| 2,109,845 A | 3/1938 | Madle |
| 2,112,763 A | 3/1938 | Cloudsley |
| 2,123,008 A | 7/1938 | Hayes |
| 2,131,158 A | 9/1938 | Almen |
| 2,134,225 A | 10/1938 | Christiansen |
| 2,152,796 A | 4/1939 | Erban |
| 2,196,064 A | 4/1940 | Erban |
| 2,209,254 A | 7/1940 | Ahnger |
| 2,259,933 A | 10/1941 | Holloway |
| 2,269,434 A | 1/1942 | Brooks |
| 2,314,833 A | 3/1943 | Keese |
| 2,325,502 A | 7/1943 | Auguste |
| RE22,761 E | 5/1946 | Wemp |
| 2,461,258 A | 2/1949 | Brooks |
| 2,469,653 A | 5/1949 | Kopp |
| 2,480,968 A | 9/1949 | Ronai |
| 2,553,465 A | 5/1951 | Barthelemy |
| 2,563,370 A | 8/1951 | Reese |
| 2,586,725 A | 2/1952 | Schottler |
| 2,595,367 A | 5/1952 | Picanol |
| 2,596,538 A | 5/1952 | Dicke |
| 2,597,849 A | 5/1952 | Uno |
| 2,675,713 A | 4/1954 | Acker |
| 2,696,888 A | 12/1954 | Chillson |
| 2,716,357 A | 8/1955 | Bernhard |
| 2,730,904 A | 1/1956 | Bernhard |
| 2,748,614 A | 6/1956 | Weisel |
| 2,868,038 A | 1/1959 | Billeter |
| 2,873,911 A | 2/1959 | Perrine |
| 2,874,592 A | 2/1959 | Oehrli |
| 2,883,883 A | 4/1959 | Chillson |
| 2,891,213 A | 6/1959 | Kern |
| 2,901,924 A | 9/1959 | Banker |
| 2,913,932 A | 11/1959 | Oehrli |
| 2,931,234 A | 4/1960 | Hayward |
| 2,931,235 A | 4/1960 | Hayward |
| 2,949,800 A | 8/1960 | Neuschotz |
| 2,959,063 A | 11/1960 | Brie |
| 2,959,070 A | 11/1960 | Flinn |
| 2,959,972 A | 11/1960 | Madson |
| 2,964,959 A | 12/1960 | Beck |
| 2,982,154 A | 5/1961 | Zapletal |
| 3,008,061 A | 11/1961 | Mims |
| 3,028,778 A | 4/1962 | Albert |
| 3,035,460 A | 5/1962 | Guichard |
| 3,051,020 A | 8/1962 | Hartupee |
| 3,081,641 A | 3/1963 | Iseman |
| 3,086,704 A | 4/1963 | Hurtt |
| 3,087,348 A | 4/1963 | Kraus |
| 3,088,704 A | 5/1963 | Grady |
| 3,154,957 A | 11/1964 | Kashihara |
| 3,163,050 A | 12/1964 | Kraus |
| 3,176,542 A | 4/1965 | Monch |
| 3,184,983 A | 5/1965 | Kraus |
| 3,204,476 A | 9/1965 | Rouverol |
| 3,207,248 A | 9/1965 | Strom |
| 3,209,606 A | 10/1965 | Yamamoto |
| 3,211,364 A | 10/1965 | Wentling |
| 3,216,283 A | 11/1965 | General |
| 3,229,538 A | 1/1966 | Schottler |
| 3,237,468 A | 3/1966 | Schottler |
| 3,246,531 A | 4/1966 | Kashihara |
| 3,248,960 A | 5/1966 | Schottler |
| 3,273,468 A | 9/1966 | Allen |
| 3,277,745 A | 10/1966 | Harned |
| 3,280,646 A | 10/1966 | Lemieux |
| 3,283,614 A | 11/1966 | Hewko |
| 3,292,443 A | 12/1966 | Perruca |
| 3,340,895 A | 9/1967 | Osgood, Jr. |
| 3,407,687 A | 10/1968 | Hayashi |
| 3,413,896 A | 12/1968 | Wildhaber |
| 3,430,504 A | 3/1969 | Frank |
| 3,439,563 A | 4/1969 | Ledward |
| 3,440,895 A | 4/1969 | George |
| 3,464,281 A | 9/1969 | Hiroshi |
| 3,477,315 A | 11/1969 | Fred |
| 3,487,726 A | 1/1970 | Frederick |
| 3,487,727 A | 1/1970 | Artur |
| 3,574,289 A | 4/1971 | Shelter |
| 3,581,587 A | 6/1971 | Dickenbrock |
| 3,588,154 A | 6/1971 | Voight |
| 3,661,404 A | 5/1972 | Bossaer |
| 3,695,120 A | 10/1972 | Titt |
| 3,707,888 A | 1/1973 | Schottler |
| 3,727,473 A | 4/1973 | Bayer |
| 3,727,474 A | 4/1973 | Fullerton |
| 3,736,803 A | 6/1973 | Horowitz |
| 3,743,063 A | 7/1973 | Blechschmidt |
| 3,745,844 A | 7/1973 | Schottler |
| 3,768,715 A | 10/1973 | Tout |
| 3,769,849 A | 11/1973 | Hagen |
| 3,800,607 A | 4/1974 | Zurcher |
| 3,802,284 A | 4/1974 | Sharpe |
| 3,810,398 A | 5/1974 | Kraus |
| 3,820,416 A | 6/1974 | Kraus |
| 3,837,179 A | 9/1974 | Barth |
| 3,866,985 A | 2/1975 | Whitehurst |
| 3,891,235 A | 6/1975 | Shelly |
| 3,934,493 A | 1/1976 | Hillyer |
| 3,954,282 A | 5/1976 | Hege |
| 3,984,129 A | 10/1976 | Hege |
| 3,987,681 A | 10/1976 | Keithley |
| 3,996,807 A | 12/1976 | Adams |
| 4,023,442 A | 5/1977 | Woods |
| 4,098,146 A | 7/1978 | McLarty |
| 4,103,514 A | 8/1978 | Grosse-Entrup |
| 4,159,653 A | 7/1979 | Koivunen |
| 4,169,609 A | 10/1979 | Zampedro |
| 4,177,683 A | 12/1979 | Moses |
| 4,227,712 A | 10/1980 | Dick |
| 4,314,485 A | 2/1982 | Adams |
| 4,345,486 A | 8/1982 | Olesen |
| 4,369,667 A | 1/1983 | Kemper |
| 4,382,186 A | 5/1983 | Denholm |
| 4,382,188 A | 5/1983 | Cronin |
| 4,391,156 A | 7/1983 | Tibbals, Jr. |
| 4,456,233 A | 6/1984 | Anton |
| 4,459,873 A | 7/1984 | Black |
| 4,464,952 A | 8/1984 | Stubbs |

(56)     References Cited

U.S. PATENT DOCUMENTS

| | | | |
|---|---|---|---|
| 4,468,984 A | 9/1984 | Castelli | |
| 4,494,524 A | 1/1985 | Wagner | |
| 4,496,051 A | 1/1985 | Ortner | |
| 4,501,172 A | 2/1985 | Kraus | |
| 4,515,040 A | 5/1985 | Takeuchi | |
| 4,526,255 A | 7/1985 | Hennessey | |
| 4,546,673 A | 10/1985 | Shigematsu | |
| 4,560,369 A | 12/1985 | Hattori | |
| 4,567,781 A | 2/1986 | Russ | |
| 4,569,670 A | 2/1986 | McIntosh | |
| 4,574,649 A | 3/1986 | Seol | |
| 4,585,429 A | 4/1986 | Marier | |
| 4,592,247 A | 6/1986 | Mutschler | |
| 4,617,838 A | 10/1986 | Anderson | |
| 4,628,766 A | 12/1986 | De Brie | |
| 4,630,839 A | 12/1986 | Seol | |
| 4,631,469 A | 12/1986 | Tsuboi | |
| 4,643,048 A | 2/1987 | Hattori | |
| 4,651,082 A | 3/1987 | Kaneyuki | |
| 4,663,990 A | 5/1987 | Hiroshi | |
| 4,667,525 A | 5/1987 | Schottler | |
| 4,700,581 A | 10/1987 | Tibbals, Jr. | |
| 4,706,518 A | 11/1987 | Moroto | |
| 4,713,976 A | 12/1987 | Wilkes | |
| 4,717,368 A | 1/1988 | Yamaguchi | |
| 4,735,430 A | 4/1988 | Tomkinson | |
| 4,738,164 A | 4/1988 | Kaneyuki | |
| 4,744,261 A | 5/1988 | Jacobson | |
| 4,756,211 A | 7/1988 | Fellows | |
| 4,781,663 A | 11/1988 | Reswick | |
| 4,828,422 A | 5/1989 | Anthony | |
| 4,838,122 A | 6/1989 | Takamiya | |
| 4,838,832 A | 6/1989 | Schmitt | |
| 4,856,374 A | 8/1989 | Kreuzer | |
| 4,857,035 A | 8/1989 | Anderson | |
| 4,869,130 A | 9/1989 | Wiecko | |
| 4,881,925 A | 11/1989 | Hattori | |
| 4,884,473 A | 12/1989 | Lew | |
| 4,900,046 A | 2/1990 | Aranceta-Angoitia | |
| 4,909,101 A | 3/1990 | Terry, Sr. | |
| 4,918,344 A | 4/1990 | Chikamori | |
| 4,961,477 A | 10/1990 | Sweeney | |
| 4,964,312 A | 10/1990 | Kraus | |
| 4,976,170 A | 12/1990 | Hayashi | |
| 5,006,093 A | 4/1991 | Hiroshi | |
| 5,020,384 A | 6/1991 | Kraus | |
| 5,025,685 A | 6/1991 | Kobayashi | |
| 5,033,322 A | 7/1991 | Nakano | |
| 5,033,571 A | 7/1991 | Morimoto | |
| 5,037,361 A | 8/1991 | Takahashi | |
| 5,044,214 A | 9/1991 | Barber, Jr. | |
| 5,059,158 A | 10/1991 | Bellio | |
| 5,069,655 A | 12/1991 | Schievelbusch | |
| 5,083,982 A | 1/1992 | Sato | |
| 5,099,710 A | 3/1992 | Nakano | |
| 5,121,654 A | 6/1992 | Fasce | |
| 5,125,677 A | 6/1992 | Ogilvie | |
| 5,138,894 A | 8/1992 | Kraus | |
| 5,156,412 A | 10/1992 | Meguerditchian | |
| 5,166,879 A | 11/1992 | Greene | |
| 5,194,052 A | 3/1993 | Ueda | |
| 5,230,258 A | 7/1993 | Nakano | |
| 5,236,211 A | 8/1993 | Meguerditchian | |
| 5,236,403 A | 8/1993 | Schievelbusch | |
| 5,261,858 A | 11/1993 | Browning | |
| 5,267,920 A | 12/1993 | Hibi | |
| 5,269,726 A | 12/1993 | Swanson | |
| 5,273,501 A | 12/1993 | Schievelbusch | |
| 5,318,486 A | 6/1994 | Lutz | |
| 5,319,486 A | 6/1994 | Vogel | |
| 5,330,396 A | 7/1994 | Lohr | |
| 5,355,749 A | 10/1994 | Obara | |
| 5,356,348 A | 10/1994 | Bellio | |
| 5,375,865 A | 12/1994 | Terry, Sr. | |
| 5,379,661 A | 1/1995 | Nakano | |
| 5,383,000 A | 1/1995 | Michaloski | |
| 5,383,677 A | 1/1995 | Thomas | |
| 5,387,000 A | 2/1995 | Sato | |
| 5,401,221 A | 3/1995 | Fellows | |
| 5,413,540 A | 5/1995 | Streib | |
| 5,451,070 A | 9/1995 | Lindsay | |
| 5,476,019 A | 12/1995 | Cheever | |
| 5,489,003 A | 2/1996 | Ohyama | |
| 5,508,574 A | 4/1996 | Vlock | |
| 5,514,047 A | 5/1996 | Tibbles | |
| 5,526,261 A | 6/1996 | Kallis | |
| 5,531,510 A | 7/1996 | Yamane | |
| 5,562,564 A | 10/1996 | Folino | |
| 5,564,998 A | 10/1996 | Fellows | |
| 5,577,423 A | 11/1996 | Mimura | |
| 5,582,489 A | 12/1996 | Marzio | |
| 5,584,778 A | 12/1996 | Machida | |
| 5,601,301 A | 2/1997 | Liu | |
| 5,607,373 A | 3/1997 | Ochiai | |
| 5,645,507 A | 7/1997 | Hathaway | |
| 5,651,750 A | 7/1997 | Imanishi | |
| 5,664,636 A | 9/1997 | Ikuma | |
| 5,669,845 A | 9/1997 | Muramoto | |
| 5,669,846 A | 9/1997 | Moroto | |
| 5,683,322 A | 11/1997 | Meyerle | |
| 5,690,346 A | 11/1997 | Keskitalo | |
| 5,701,786 A | 12/1997 | Kawakami | |
| 5,720,687 A | 2/1998 | Bennett | |
| D391,824 S | 3/1998 | Larson | |
| D391,825 S | 3/1998 | Larson | |
| 5,722,502 A | 3/1998 | Kubo | |
| 5,746,676 A | 5/1998 | Kawase | |
| 5,755,303 A | 5/1998 | Yamamoto | |
| D396,396 S | 7/1998 | Larson | |
| 5,799,541 A | 9/1998 | Arbeiter | |
| 5,819,864 A | 10/1998 | Koike | |
| 5,823,052 A | 10/1998 | Nobumoto | |
| 5,823,058 A | 10/1998 | Arbeiter | |
| 5,839,083 A | 11/1998 | Sugiyama | |
| 5,846,155 A | 12/1998 | Taniguchi | |
| 5,857,387 A | 1/1999 | Larson | |
| 5,888,160 A | 3/1999 | Miyata | |
| 5,895,337 A | 4/1999 | Fellows | |
| 5,899,827 A | 5/1999 | Nakano | |
| 5,902,207 A | 5/1999 | Sugihara | |
| 5,964,123 A | 10/1999 | Arbeiter | |
| 5,967,933 A | 10/1999 | Valdenaire | |
| 5,976,054 A | 11/1999 | Yasuoka | |
| 5,984,826 A | 11/1999 | Nakano | |
| 5,995,895 A | 11/1999 | Watt | |
| 6,000,707 A | 12/1999 | Miller | |
| 6,003,649 A | 12/1999 | Fischer | |
| 6,004,239 A | 12/1999 | Makino | |
| 6,006,151 A | 12/1999 | Graf | |
| 6,012,538 A | 1/2000 | Sonobe | |
| 6,015,359 A | 1/2000 | Kunii | |
| 6,019,701 A | 2/2000 | Mori | |
| 6,029,990 A | 2/2000 | Busby | |
| 6,042,132 A | 3/2000 | Suenaga | |
| 6,045,477 A | 4/2000 | Schmidt | |
| 6,045,481 A | 4/2000 | Kumagai | |
| 6,047,230 A | 4/2000 | Spencer | |
| 6,053,833 A | 4/2000 | Masaki | |
| 6,053,841 A | 4/2000 | Koide | |
| 6,054,844 A | 4/2000 | Frank | |
| 6,056,661 A | 5/2000 | Schmidt | |
| 6,066,067 A | 5/2000 | Greenwood | |
| 6,071,210 A | 6/2000 | Kato | |
| 6,074,320 A | 6/2000 | Miyata | |
| 6,076,846 A | 6/2000 | Clardy | |
| 6,079,726 A | 6/2000 | Busby | |
| 6,083,139 A | 7/2000 | Deguchi | |
| 6,085,140 A | 7/2000 | Choi | |
| 6,085,521 A | 7/2000 | Folsom | |
| 6,086,506 A | 7/2000 | Petersmann | |
| 6,095,940 A | 8/2000 | Ai | |
| 6,095,945 A | 8/2000 | Graf | |
| 6,099,431 A | 8/2000 | Hoge | |
| 6,101,895 A | 8/2000 | Yamane | |

(56)             References Cited

U.S. PATENT DOCUMENTS

| | | | |
|---|---|---|---|
| 6,113,513 | A | 9/2000 | Hiroyuki |
| 6,119,539 | A | 9/2000 | Papanicolaou |
| 6,119,800 | A | 9/2000 | McComber |
| 6,125,314 | A | 9/2000 | Graf |
| 6,146,297 | A | 11/2000 | Kimura |
| 6,159,126 | A | 12/2000 | Oshidari |
| 6,171,210 | B1 | 1/2001 | Miyata |
| 6,171,212 | B1 | 1/2001 | Reuschel |
| 6,174,260 | B1 | 1/2001 | Tsukada |
| 6,182,000 | B1 | 1/2001 | Ohta |
| 6,186,922 | B1 | 2/2001 | Bursal |
| 6,188,945 | B1 | 2/2001 | Graf |
| 6,203,238 | B1 | 3/2001 | Otto |
| 6,210,297 | B1 | 4/2001 | Knight |
| 6,217,473 | B1 | 4/2001 | Ueda |
| 6,217,478 | B1 | 4/2001 | Vohmann |
| 6,241,636 | B1 | 6/2001 | Miller |
| 6,243,638 | B1 | 6/2001 | Abo |
| 6,251,038 | B1 | 6/2001 | Ishikawa |
| 6,251,043 | B1 | 6/2001 | Gierling |
| 6,258,003 | B1 | 7/2001 | Hirano |
| 6,261,200 | B1 | 7/2001 | Miyata |
| 6,266,931 | B1 | 7/2001 | Erickson |
| 6,296,072 | B1 | 10/2001 | Turner |
| 6,296,593 | B1 | 10/2001 | Gotou |
| 6,311,113 | B1 | 10/2001 | Danz |
| 6,312,358 | B1 | 11/2001 | Goi |
| 6,322,475 | B2 | 11/2001 | Miller |
| 6,325,386 | B1 | 12/2001 | Shoge |
| 6,340,067 | B1 | 1/2002 | Fujiwara |
| 6,356,817 | B1 | 3/2002 | Abe |
| 6,358,174 | B1 | 3/2002 | Folsom |
| 6,358,178 | B1 | 3/2002 | Wittkopp |
| 6,358,183 | B1 | 3/2002 | Hughes |
| 6,367,833 | B1 | 4/2002 | Horiuchi |
| 6,371,878 | B1 | 4/2002 | Bowen |
| 6,375,412 | B1 | 4/2002 | Dial |
| 6,390,945 | B1 | 5/2002 | Young |
| 6,390,946 | B1 | 5/2002 | Hibi |
| 6,406,399 | B1 | 6/2002 | Ai |
| 6,414,401 | B1 | 7/2002 | Kuroda |
| 6,419,608 | B1 | 7/2002 | Miller |
| 6,425,838 | B1 | 7/2002 | Matsubara |
| 6,434,960 | B1 | 8/2002 | Rousseau |
| 6,440,035 | B2 | 8/2002 | Tsukada |
| 6,440,037 | B2 | 8/2002 | Takagi |
| 6,449,548 | B1 | 9/2002 | Jain |
| 6,459,978 | B2 | 10/2002 | Taniguchi |
| 6,461,268 | B1 | 10/2002 | Milner |
| 6,470,252 | B2 | 10/2002 | Tashiro |
| 6,482,094 | B2 | 11/2002 | Kefes |
| 6,492,785 | B1 | 12/2002 | Kasten |
| 6,494,805 | B2 | 12/2002 | Ooyama |
| 6,499,373 | B2 | 12/2002 | Van Cor |
| 6,499,958 | B2 | 12/2002 | Haugen |
| 6,513,405 | B1 | 2/2003 | Stuermer |
| 6,514,175 | B2 | 2/2003 | Taniguchi |
| 6,520,878 | B1 | 2/2003 | Leclair |
| 6,522,965 | B1 | 2/2003 | Gierling |
| 6,527,662 | B2 | 3/2003 | Miyata |
| 6,532,890 | B2 | 3/2003 | Chen |
| 6,551,210 | B2 | 4/2003 | Miller |
| 6,558,285 | B1 | 5/2003 | Sieber |
| 6,561,941 | B2 | 5/2003 | Nakano |
| 6,571,920 | B1 | 6/2003 | Sturmer |
| 6,575,047 | B2 | 6/2003 | Reik |
| 6,582,151 | B2 | 6/2003 | Hopson |
| 6,588,296 | B2 | 7/2003 | Wessel |
| 6,658,338 | B2 | 12/2003 | Joe |
| 6,659,901 | B2 | 12/2003 | Sakai |
| 6,672,418 | B1 | 1/2004 | Makino |
| 6,676,559 | B2 | 1/2004 | Miller |
| 6,679,109 | B2 | 1/2004 | Gierling |
| 6,681,652 | B2 | 1/2004 | Auer |
| 6,682,432 | B1 | 1/2004 | Shinozuka |
| 6,684,143 | B2 | 1/2004 | Friedrich |
| 6,689,012 | B2 | 2/2004 | Miller |
| 6,694,241 | B2 | 2/2004 | Kim |
| 6,718,247 | B1 | 4/2004 | Graf |
| 6,721,637 | B2 | 4/2004 | Abe |
| 6,723,014 | B2 | 4/2004 | Shinso |
| 6,723,016 | B2 | 4/2004 | Sumi |
| 6,805,654 | B2 | 10/2004 | Nishii |
| 6,808,053 | B2 | 10/2004 | Kirkwood |
| 6,839,617 | B2 | 1/2005 | Mensler |
| 6,849,020 | B2 | 2/2005 | Sumi |
| 6,859,709 | B2 | 2/2005 | Shinichiro |
| 6,868,949 | B2 | 3/2005 | Braford, Jr. |
| 6,909,953 | B2 | 6/2005 | Shinichiro |
| 6,931,316 | B2 | 8/2005 | Shinichiro |
| 6,932,739 | B2 | 8/2005 | Miyata |
| 6,942,593 | B2 | 9/2005 | Nishii |
| 6,945,903 | B2 | 9/2005 | Miller |
| 6,949,049 | B2 | 9/2005 | Miller |
| 6,958,029 | B2 | 10/2005 | Inoue |
| 6,991,575 | B2 | 1/2006 | Inoue |
| 6,991,579 | B2 | 1/2006 | Kobayashi |
| 6,994,189 | B2 | 2/2006 | Chen |
| 7,000,496 | B2 | 2/2006 | Wessel |
| 7,004,487 | B2 | 2/2006 | Matsumoto |
| 7,011,600 | B2 | 3/2006 | Miller |
| 7,011,601 | B2 | 3/2006 | Miller |
| 7,011,602 | B2 | 3/2006 | Makiyama |
| 7,014,591 | B2 | 3/2006 | Miller |
| 7,029,418 | B2 | 4/2006 | Taketsuna |
| 7,032,914 | B2 | 4/2006 | Miller |
| 7,036,620 | B2 | 5/2006 | Miller |
| 7,044,884 | B2 | 5/2006 | Miller |
| 7,063,195 | B2 | 6/2006 | Berhan |
| 7,063,640 | B2 | 6/2006 | Miller |
| 7,074,007 | B2 | 7/2006 | Miller |
| 7,074,154 | B2 | 7/2006 | Miller |
| 7,074,155 | B2 | 7/2006 | Miller |
| 7,077,777 | B2 | 7/2006 | Miyata |
| 7,086,979 | B2 | 8/2006 | Frenken |
| 7,086,981 | B2 | 8/2006 | Ali |
| 7,094,171 | B2 | 8/2006 | Inoue |
| 7,111,860 | B1 | 9/2006 | Grimaldos |
| 7,112,158 | B2 | 9/2006 | Miller |
| 7,112,159 | B2 | 9/2006 | Miller |
| 7,125,297 | B2 | 10/2006 | Miller |
| 7,131,930 | B2 | 11/2006 | Miller |
| 7,140,999 | B2 | 11/2006 | Miller |
| 7,147,586 | B2 | 12/2006 | Miller |
| 7,153,233 | B2 | 12/2006 | Miller |
| 7,156,770 | B2 | 1/2007 | Miller |
| 7,160,220 | B2 | 1/2007 | Shinojima |
| 7,160,222 | B2 | 1/2007 | Miller |
| 7,163,485 | B2 | 1/2007 | Miller |
| 7,163,486 | B2 | 1/2007 | Miller |
| 7,163,846 | B2 | 1/2007 | Sakai |
| 7,166,052 | B2 | 1/2007 | Miller |
| 7,166,056 | B2 | 1/2007 | Miller |
| 7,166,057 | B2 | 1/2007 | Miller |
| 7,166,058 | B2 | 1/2007 | Miller |
| 7,169,076 | B2 | 1/2007 | Miller |
| 7,172,529 | B2 | 2/2007 | Miller |
| 7,175,564 | B2 | 2/2007 | Miller |
| 7,175,565 | B2 | 2/2007 | Miller |
| 7,175,566 | B2 | 2/2007 | Miller |
| 7,192,381 | B2 | 3/2007 | Miller |
| 7,197,915 | B2 | 4/2007 | Luh |
| 7,198,582 | B2 | 4/2007 | Miller |
| 7,198,583 | B2 | 4/2007 | Miller |
| 7,198,584 | B2 | 4/2007 | Miller |
| 7,198,585 | B2 | 4/2007 | Miller |
| 7,201,693 | B2 | 4/2007 | Miller |
| 7,201,694 | B2 | 4/2007 | Miller |
| 7,201,695 | B2 | 4/2007 | Miller |
| 7,204,777 | B2 | 4/2007 | Miller |
| 7,207,918 | B2 | 4/2007 | Shimazu |
| 7,214,159 | B2 | 5/2007 | Miller |
| 7,217,215 | B2 | 5/2007 | Miller |
| 7,217,216 | B2 | 5/2007 | Inoue |

(56)                References Cited

U.S. PATENT DOCUMENTS

| | | | |
|---|---|---|---|
| 7,217,219 | B2 | 5/2007 | Miller |
| 7,217,220 | B2 | 5/2007 | Careau |
| 7,226,379 | B2 | 6/2007 | Masahiko |
| 7,232,395 | B2 | 6/2007 | Miller |
| 7,234,873 | B2 | 6/2007 | Kato |
| 7,235,031 | B2 | 6/2007 | Miller |
| 7,238,136 | B2 | 7/2007 | Miller |
| 7,238,137 | B2 | 7/2007 | Miller |
| 7,238,138 | B2 | 7/2007 | Miller |
| 7,238,139 | B2 | 7/2007 | Roethler |
| 7,246,672 | B2 | 7/2007 | Shirai |
| 7,250,018 | B2 | 7/2007 | Miller |
| 7,261,663 | B2 | 8/2007 | Miller |
| 7,275,610 | B2 | 10/2007 | Kuang |
| 7,285,068 | B2 | 10/2007 | Hosoi |
| 7,288,042 | B2 | 10/2007 | Miller |
| 7,288,043 | B2 | 10/2007 | Shioiri |
| 7,320,660 | B2 | 1/2008 | Miller |
| 7,322,901 | B2 | 1/2008 | Miller |
| 7,343,236 | B2 | 3/2008 | Wilson |
| 7,347,801 | B2 | 3/2008 | Guenter |
| 7,383,748 | B2 | 6/2008 | Rankin |
| 7,383,749 | B2 | 6/2008 | Schaefer |
| 7,384,370 | B2 | 6/2008 | Miller |
| 7,393,300 | B2 | 7/2008 | Miller |
| 7,393,302 | B2 | 7/2008 | Miller |
| 7,393,303 | B2 | 7/2008 | Miller |
| 7,395,731 | B2 | 7/2008 | Miller |
| 7,396,209 | B2 | 7/2008 | Miller |
| 7,402,122 | B2 | 7/2008 | Miller |
| 7,410,443 | B2 | 8/2008 | Miller |
| 7,419,451 | B2 | 9/2008 | Miller |
| 7,422,541 | B2 | 9/2008 | Miller |
| 7,422,546 | B2 | 9/2008 | Miller |
| 7,427,253 | B2 | 9/2008 | Miller |
| 7,431,677 | B2 | 10/2008 | Miller |
| 7,452,297 | B2 | 11/2008 | Miller |
| 7,455,611 | B2 | 11/2008 | Miller |
| 7,455,617 | B2 | 11/2008 | Miller |
| 7,462,123 | B2 | 12/2008 | Miller |
| 7,462,127 | B2 | 12/2008 | Miller |
| 7,470,210 | B2 | 12/2008 | Miller |
| 7,478,885 | B2 | 1/2009 | Urabe |
| 7,481,736 | B2 | 1/2009 | Miller |
| 7,510,499 | B2 | 3/2009 | Miller |
| 7,540,818 | B2 | 6/2009 | Miller |
| 7,547,264 | B2 | 6/2009 | Usoro |
| 7,574,935 | B2 | 8/2009 | Rohs |
| 7,591,755 | B2 | 9/2009 | Petrzik |
| 7,632,203 | B2 | 12/2009 | Miller |
| 7,651,437 | B2 | 1/2010 | Miller |
| 7,654,928 | B2 | 2/2010 | Miller |
| 7,670,243 | B2 | 3/2010 | Miller |
| 7,686,729 | B2 | 3/2010 | Miller |
| 7,717,815 | B2 | 5/2010 | Tenberge |
| 7,727,101 | B2 | 6/2010 | Miller |
| 7,727,106 | B2 | 6/2010 | Maheu |
| 7,727,107 | B2 | 6/2010 | Miller |
| 7,727,108 | B2 | 6/2010 | Miller |
| 7,727,110 | B2 | 6/2010 | Miller |
| 7,727,115 | B2 | 6/2010 | Serkh |
| 7,731,300 | B2 | 6/2010 | Gerstenslager |
| 7,731,615 | B2 | 6/2010 | Miller |
| 7,762,919 | B2 | 7/2010 | Smithson |
| 7,762,920 | B2 | 7/2010 | Smithson |
| 7,770,674 | B2 | 8/2010 | Miles |
| 7,785,228 | B2 | 8/2010 | Smithson |
| 7,828,685 | B2 | 11/2010 | Miller |
| 7,837,592 | B2 | 11/2010 | Miller |
| 7,871,353 | B2 | 1/2011 | Nichols |
| 7,882,762 | B2 | 2/2011 | Armstrong |
| 7,883,442 | B2 | 2/2011 | Miller |
| 7,885,747 | B2 | 2/2011 | Miller |
| 7,887,032 | B2 | 2/2011 | Malone |
| 7,909,723 | B2 | 3/2011 | Triller |
| 7,909,727 | B2 | 3/2011 | Smithson |
| 7,914,029 | B2 | 3/2011 | Miller |
| 7,959,533 | B2 | 6/2011 | Nichols |
| 7,963,880 | B2 | 6/2011 | Smithson |
| 7,967,719 | B2 | 6/2011 | Smithson |
| 7,976,426 | B2 | 7/2011 | Smithson |
| 8,048,056 | B2 | 11/2011 | Picha |
| 8,066,613 | B2 | 11/2011 | Smithson |
| 8,066,614 | B2 | 11/2011 | Miller |
| 8,070,635 | B2 | 12/2011 | Miller |
| 8,087,482 | B2 | 1/2012 | Miles |
| 8,123,653 | B2 | 2/2012 | Smithson |
| 8,133,149 | B2 | 3/2012 | Smithson |
| 8,142,323 | B2 | 3/2012 | Tsuchiya |
| 8,167,759 | B2 | 5/2012 | Pohl |
| 8,171,636 | B2 | 5/2012 | Smithson |
| 8,197,380 | B2 | 6/2012 | Heinzelmann |
| 8,230,961 | B2 | 7/2012 | Schneidewind |
| 8,262,536 | B2 | 9/2012 | Nichols |
| 8,267,829 | B2 | 9/2012 | Miller |
| 8,313,404 | B2 | 11/2012 | Carter |
| 8,313,405 | B2 | 11/2012 | Bazyn |
| 8,317,650 | B2 | 11/2012 | Nichols |
| 8,317,651 | B2 | 11/2012 | Lohr |
| 8,321,097 | B2 | 11/2012 | Vasiliotis |
| 8,321,103 | B2 | 11/2012 | Sakaue |
| 8,342,999 | B2 | 1/2013 | Miller |
| 8,360,917 | B2 | 1/2013 | Nichols |
| 8,376,889 | B2 | 2/2013 | Hoffman |
| 8,376,903 | B2 | 2/2013 | Pohl |
| 8,382,631 | B2 | 2/2013 | Hoffman |
| 8,382,637 | B2 | 2/2013 | Tange |
| 8,393,989 | B2 | 3/2013 | Pohl |
| 8,398,518 | B2 | 3/2013 | Nichols |
| 8,447,480 | B2 | 5/2013 | Usukura |
| 8,469,853 | B2 | 6/2013 | Miller |
| 8,469,856 | B2 | 6/2013 | Thomassy |
| 8,480,529 | B2 | 7/2013 | Pohl |
| 8,496,554 | B2 | 7/2013 | Pohl |
| 8,506,452 | B2 | 8/2013 | Pohl |
| 8,512,195 | B2 | 8/2013 | Lohr |
| 8,517,888 | B1 | 8/2013 | Brookins |
| 8,535,199 | B2 | 9/2013 | Lohr |
| 8,550,949 | B2 | 10/2013 | Miller |
| 8,585,528 | B2 | 11/2013 | Carter |
| 8,585,543 | B1 | 11/2013 | Davis |
| 8,608,609 | B2 | 12/2013 | Sherrill |
| 8,622,866 | B2 | 1/2014 | Bazyn |
| 8,622,871 | B2 | 1/2014 | Hoff |
| 8,626,409 | B2 | 1/2014 | Vasiliotis |
| 8,628,443 | B2 | 1/2014 | Miller |
| 8,641,572 | B2 | 2/2014 | Nichols |
| 8,641,577 | B2 | 2/2014 | Nichols |
| 8,663,050 | B2 | 3/2014 | Nichols |
| 8,663,052 | B2 | 3/2014 | Sich |
| 8,678,974 | B2 | 3/2014 | Lohr |
| 8,682,545 | B2 | 3/2014 | Jiang |
| 8,688,337 | B2 | 4/2014 | Takanami |
| 8,708,360 | B2 | 4/2014 | Miller |
| 8,721,485 | B2 | 5/2014 | Lohr |
| 8,738,255 | B2 | 5/2014 | Carter |
| 8,776,633 | B2 | 7/2014 | Armstrong |
| 8,784,248 | B2 | 7/2014 | Murakami |
| 8,790,214 | B2 | 7/2014 | Lohr |
| 8,814,739 | B1 | 8/2014 | Hamrin |
| 8,818,661 | B2 | 8/2014 | Keilers |
| 8,827,856 | B1 | 9/2014 | Younggren |
| 8,827,864 | B2 | 9/2014 | Durack |
| 8,845,485 | B2 | 9/2014 | Smithson |
| 8,852,050 | B2 | 10/2014 | Thomassy |
| 8,870,711 | B2 | 10/2014 | Pohl |
| 8,870,712 | B2 | 10/2014 | Steinborn |
| 8,888,643 | B2 | 11/2014 | Lohr |
| 8,900,085 | B2 | 12/2014 | Pohl |
| 8,920,021 | B2 | 12/2014 | Mertenat |
| 8,920,285 | B2 | 12/2014 | Smithson |
| 8,924,111 | B2 | 12/2014 | Fuller |
| 8,956,262 | B2 | 2/2015 | Tomomatsu |
| 8,961,363 | B2 | 2/2015 | Shiina |

(56)  References Cited

U.S. PATENT DOCUMENTS

| | | |
|---|---|---|
| 8,968,152 B2 | 3/2015 | Beaudoin |
| 8,992,376 B2 | 3/2015 | Ogawa |
| 8,996,263 B2 | 3/2015 | Quinn, Jr. |
| 9,017,207 B2 | 4/2015 | Pohl |
| 9,022,889 B2 | 5/2015 | Miller |
| 9,046,158 B2 | 6/2015 | Miller |
| 9,052,000 B2 | 6/2015 | Cooper |
| 9,074,674 B2 | 7/2015 | Nichols |
| 9,086,145 B2 | 7/2015 | Pohl |
| 9,121,464 B2 | 9/2015 | Nichols |
| 9,182,018 B2 | 11/2015 | Bazyn |
| 9,239,099 B2 | 1/2016 | Carter |
| 9,249,880 B2 | 2/2016 | Vasiliotis |
| 9,273,760 B2 | 3/2016 | Pohl |
| 9,279,482 B2 | 3/2016 | Nichols |
| 9,291,251 B2 | 3/2016 | Lohr |
| 9,328,807 B2 | 5/2016 | Carter |
| 9,341,246 B2 | 5/2016 | Miller |
| 9,360,089 B2 | 6/2016 | Lohr |
| 9,365,203 B2 | 6/2016 | Keilers |
| 9,371,894 B2 | 6/2016 | Carter |
| 9,388,896 B2 | 7/2016 | Hibino |
| 9,506,562 B2 | 11/2016 | Miller |
| 9,528,561 B2 | 12/2016 | Nichols |
| 9,541,179 B2 | 1/2017 | Cooper |
| 9,574,642 B2 | 2/2017 | Pohl |
| 9,574,643 B2 | 2/2017 | Pohl |
| 9,611,921 B2 | 4/2017 | Thomassy |
| 9,618,100 B2 | 4/2017 | Lohr |
| 9,656,672 B2 | 5/2017 | Schieffelin |
| 9,676,391 B2 | 6/2017 | Carter |
| 9,677,650 B2 | 6/2017 | Nichols |
| 9,683,638 B2 | 6/2017 | Kolstrup |
| 9,683,640 B2 | 6/2017 | Lohr |
| 9,709,138 B2 | 7/2017 | Miller |
| 9,726,282 B2 | 8/2017 | Pohl |
| 9,732,848 B2 | 8/2017 | Miller |
| 9,739,375 B2 | 8/2017 | Vasiliotis |
| 9,833,201 B2 | 12/2017 | Niederberger |
| 9,845,133 B2 | 12/2017 | Craven |
| 9,850,993 B2 | 12/2017 | Bazyn |
| 9,869,388 B2 | 1/2018 | Pohl |
| 9,878,717 B2 | 1/2018 | Keilers |
| 9,878,719 B2 | 1/2018 | Carter |
| 9,903,450 B2 | 2/2018 | Thomassy |
| 9,909,657 B2 | 3/2018 | Uchino |
| 9,920,823 B2 | 3/2018 | Nichols |
| 9,945,456 B2 | 4/2018 | Nichols |
| 9,950,608 B2 | 4/2018 | Miller |
| 9,963,199 B2 | 5/2018 | Hancock |
| 9,975,557 B2 | 5/2018 | Park |
| 10,023,266 B2 | 7/2018 | Contello |
| 10,036,453 B2 | 7/2018 | Smithson |
| 10,047,861 B2 | 8/2018 | Thomassy |
| 10,056,811 B2 | 8/2018 | Pohl |
| 10,066,712 B2 | 9/2018 | Lohr |
| 10,066,713 B2 | 9/2018 | Nichols |
| 10,088,026 B2 | 10/2018 | Versteyhe |
| 10,100,927 B2 | 10/2018 | Quinn, Jr. |
| 10,197,147 B2 | 2/2019 | Lohr |
| 10,208,840 B2 | 2/2019 | Nichols |
| 10,239,582 B2 | 3/2019 | Münch |
| 10,252,881 B2 | 4/2019 | Hiltunen |
| 10,253,859 B2 | 4/2019 | Schoolcraft |
| 10,253,880 B2 | 4/2019 | Pohl |
| 10,253,881 B2 | 4/2019 | Hamrin |
| 10,260,607 B2 | 4/2019 | Carter |
| 10,323,732 B2 | 6/2019 | Nichols |
| 10,400,872 B2 | 9/2019 | Lohr |
| 10,428,915 B2 | 10/2019 | Thomassy |
| 10,428,939 B2 | 10/2019 | Miller |
| 10,458,526 B2 | 10/2019 | Nichols |
| 10,634,224 B2 | 4/2020 | Lohr |
| 10,703,372 B2 | 7/2020 | Carter |
| 10,704,657 B2 | 7/2020 | Thomassy |
| 10,704,687 B2 | 7/2020 | Vasiliotis |
| 10,711,869 B2 | 7/2020 | Miller |
| 10,800,421 B2 | 10/2020 | Cho |
| 10,920,882 B2 | 2/2021 | Thomassy |
| 10,975,916 B2 | 4/2021 | Okada |
| 11,174,922 B2 | 11/2021 | Nichols |
| 11,530,739 B2 | 12/2022 | Nichols |
| 11,624,432 B2 | 4/2023 | Schoolcraft |
| 2001/0008192 A1 | 7/2001 | Morisawa |
| 2001/0023217 A1 | 9/2001 | Miyagawa |
| 2001/0041644 A1 | 11/2001 | Yasuoka |
| 2001/0044358 A1 | 11/2001 | Taniguchi |
| 2001/0044361 A1 | 11/2001 | Taniguchi |
| 2001/0046920 A1 | 11/2001 | Sugihara |
| 2002/0017819 A1 | 2/2002 | Chen |
| 2002/0019285 A1 | 2/2002 | Henzler |
| 2002/0025875 A1 | 2/2002 | Tsujioka |
| 2002/0028722 A1 | 3/2002 | Sakai |
| 2002/0037786 A1 | 3/2002 | Hirano |
| 2002/0045511 A1 | 4/2002 | Geiberger |
| 2002/0049113 A1 | 4/2002 | Watanabe |
| 2002/0117860 A1 | 8/2002 | Man |
| 2002/0128107 A1 | 9/2002 | Wakayama |
| 2002/0151401 A1 | 10/2002 | Lemanski |
| 2002/0161503 A1 | 10/2002 | Joe |
| 2002/0169051 A1 | 11/2002 | Oshidari |
| 2002/0179348 A1 | 12/2002 | Tamai |
| 2002/0189524 A1 | 12/2002 | Chen |
| 2003/0015358 A1 | 1/2003 | Abe |
| 2003/0015874 A1 | 1/2003 | Abe |
| 2003/0022753 A1 | 1/2003 | Mizuno |
| 2003/0027683 A1 | 2/2003 | Grillenberger |
| 2003/0036456 A1 | 2/2003 | Skrabs |
| 2003/0096674 A1 | 5/2003 | Uno |
| 2003/0132051 A1 | 7/2003 | Nishii |
| 2003/0135316 A1 | 7/2003 | Kawamura |
| 2003/0144105 A1 | 7/2003 | O'Hora |
| 2003/0151300 A1 | 8/2003 | Goss |
| 2003/0160420 A1 | 8/2003 | Fukuda |
| 2003/0181286 A1 | 9/2003 | Miller |
| 2003/0216216 A1 | 11/2003 | Inoue |
| 2003/0221892 A1 | 12/2003 | Matsumoto |
| 2004/0038772 A1 | 2/2004 | McIndoe |
| 2004/0051375 A1 | 3/2004 | Uno |
| 2004/0058772 A1 | 3/2004 | Inoue |
| 2004/0067816 A1 | 4/2004 | Taketsuna |
| 2004/0082421 A1 | 4/2004 | Wafzig |
| 2004/0087412 A1 | 5/2004 | Mori |
| 2004/0092359 A1 | 5/2004 | Imanishi |
| 2004/0119345 A1 | 6/2004 | Takano |
| 2004/0171452 A1 | 9/2004 | Miller |
| 2004/0171457 A1 | 9/2004 | Fuller |
| 2004/0204283 A1 | 10/2004 | Inoue |
| 2004/0224808 A1 | 11/2004 | Miller |
| 2004/0231331 A1 | 11/2004 | Shigeki |
| 2004/0254047 A1 | 12/2004 | Frank |
| 2005/0037876 A1 | 2/2005 | Unno |
| 2005/0037886 A1 | 2/2005 | Lemanski |
| 2005/0064986 A1 | 3/2005 | Ginglas |
| 2005/0073127 A1 | 4/2005 | Miller |
| 2005/0079948 A1 | 4/2005 | Miller |
| 2005/0085326 A1 | 4/2005 | Miller |
| 2005/0085327 A1 | 4/2005 | Miller |
| 2005/0085334 A1 | 4/2005 | Miller |
| 2005/0085336 A1 | 4/2005 | Miller |
| 2005/0085337 A1 | 4/2005 | Miller |
| 2005/0085338 A1 | 4/2005 | Miller |
| 2005/0085979 A1 | 4/2005 | Carlson |
| 2005/0096176 A1 | 5/2005 | Miller |
| 2005/0096179 A1 | 5/2005 | Miller |
| 2005/0113202 A1 | 5/2005 | Miller |
| 2005/0113210 A1 | 5/2005 | Miller |
| 2005/0117983 A1 | 6/2005 | Miller |
| 2005/0119086 A1 | 6/2005 | Miller |
| 2005/0119087 A1 | 6/2005 | Miller |
| 2005/0119090 A1 | 6/2005 | Miller |
| 2005/0119093 A1 | 6/2005 | Miller |
| 2005/0124453 A1 | 6/2005 | Miller |
| 2005/0124456 A1 | 6/2005 | Miller |

(56)             References Cited

U.S. PATENT DOCUMENTS

| | | |
|---|---|---|
| 2005/0130784 A1 | 6/2005 | Miller |
| 2005/0137046 A1 | 6/2005 | Miller |
| 2005/0137051 A1 | 6/2005 | Miller |
| 2005/0137052 A1 | 6/2005 | Miller |
| 2005/0148422 A1 | 7/2005 | Miller |
| 2005/0148423 A1 | 7/2005 | Miller |
| 2005/0153808 A1 | 7/2005 | Miller |
| 2005/0153809 A1 | 7/2005 | Miller |
| 2005/0153810 A1 | 7/2005 | Miller |
| 2005/0159265 A1 | 7/2005 | Miller |
| 2005/0159266 A1 | 7/2005 | Miller |
| 2005/0159267 A1 | 7/2005 | Miller |
| 2005/0164819 A1 | 7/2005 | Miller |
| 2005/0170927 A1 | 8/2005 | Miller |
| 2005/0176544 A1 | 8/2005 | Miller |
| 2005/0176545 A1 | 8/2005 | Miller |
| 2005/0178893 A1 | 8/2005 | Miller |
| 2005/0181905 A1 | 8/2005 | Ali |
| 2005/0184580 A1 | 8/2005 | Kuan |
| 2005/0197231 A1 | 9/2005 | Miller |
| 2005/0209041 A1 | 9/2005 | Miller |
| 2005/0227809 A1 | 10/2005 | Bitzer |
| 2005/0229731 A1 | 10/2005 | Parks |
| 2005/0233846 A1 | 10/2005 | Green |
| 2005/0255957 A1 | 11/2005 | Miller |
| 2006/0000684 A1 | 1/2006 | Agner |
| 2006/0006008 A1 | 1/2006 | Brunemann |
| 2006/0052204 A1 | 3/2006 | Eckert |
| 2006/0054422 A1 | 3/2006 | Dimsey |
| 2006/0064223 A1* | 3/2006 | Voss ...................... B62K 25/04 |
| | | 701/52 |
| 2006/0084549 A1 | 4/2006 | Smithson |
| 2006/0108956 A1 | 5/2006 | Clark |
| 2006/0111212 A9 | 5/2006 | Ai |
| 2006/0154775 A1 | 7/2006 | Ali |
| 2006/0172829 A1 | 8/2006 | Ishio |
| 2006/0180363 A1 | 8/2006 | Uchisasai |
| 2006/0223667 A1 | 10/2006 | Nakazeki |
| 2006/0234822 A1 | 10/2006 | Morscheck |
| 2006/0234826 A1 | 10/2006 | Moehlmann |
| 2006/0276299 A1 | 12/2006 | Imanishi |
| 2007/0004552 A1 | 1/2007 | Matsudaira |
| 2007/0004554 A1 | 1/2007 | Hans |
| 2007/0004556 A1 | 1/2007 | Rohs |
| 2007/0041823 A1 | 2/2007 | Miller |
| 2007/0049450 A1 | 3/2007 | Miller |
| 2007/0082770 A1 | 4/2007 | Nihei |
| 2007/0099753 A1 | 5/2007 | Matsui |
| 2007/0142161 A1 | 6/2007 | Miller |
| 2007/0149342 A1 | 6/2007 | Guenter |
| 2007/0155552 A1 | 7/2007 | De Cloe |
| 2007/0155567 A1 | 7/2007 | Miller |
| 2007/0155580 A1 | 7/2007 | Nichols |
| 2007/0167274 A1 | 7/2007 | Petrzik |
| 2007/0167275 A1 | 7/2007 | Miller |
| 2007/0167276 A1 | 7/2007 | Miller |
| 2007/0167277 A1 | 7/2007 | Miller |
| 2007/0167278 A1 | 7/2007 | Miller |
| 2007/0167279 A1 | 7/2007 | Miller |
| 2007/0167280 A1 | 7/2007 | Miller |
| 2007/0179013 A1 | 8/2007 | Miller |
| 2007/0193391 A1 | 8/2007 | Armstrong |
| 2007/0197337 A1 | 8/2007 | Miller |
| 2007/0219048 A1 | 9/2007 | Yamaguchi |
| 2007/0219696 A1 | 9/2007 | Miller |
| 2007/0228687 A1 | 10/2007 | Parker |
| 2007/0232423 A1 | 10/2007 | Katou |
| 2007/0245846 A1 | 10/2007 | Armstrong |
| 2007/0270265 A1 | 11/2007 | Miller |
| 2007/0270266 A1 | 11/2007 | Miller |
| 2007/0270267 A1 | 11/2007 | Miller |
| 2007/0270268 A1 | 11/2007 | Miller |
| 2007/0270269 A1 | 11/2007 | Miller |
| 2007/0270270 A1 | 11/2007 | Miller |
| 2007/0270271 A1 | 11/2007 | Miller |
| 2007/0270272 A1 | 11/2007 | Miller |
| 2007/0270278 A1 | 11/2007 | Miller |
| 2007/0275809 A1 | 11/2007 | Miller |
| 2007/0281819 A1 | 12/2007 | Miller |
| 2007/0287578 A1 | 12/2007 | Miller |
| 2007/0287579 A1 | 12/2007 | Miller |
| 2007/0287580 A1 | 12/2007 | Miller |
| 2008/0004008 A1 | 1/2008 | Nicol |
| 2008/0009389 A1 | 1/2008 | Jacobs |
| 2008/0032852 A1 | 2/2008 | Smithson |
| 2008/0032853 A1 | 2/2008 | Smithson |
| 2008/0032854 A1 | 2/2008 | Smithson |
| 2008/0034585 A1 | 2/2008 | Smithson |
| 2008/0034586 A1 | 2/2008 | Smithson |
| 2008/0039269 A1 | 2/2008 | Smithson |
| 2008/0039270 A1 | 2/2008 | Smithson |
| 2008/0039271 A1 | 2/2008 | Smithson |
| 2008/0039272 A1 | 2/2008 | Smithson |
| 2008/0039273 A1 | 2/2008 | Smithson |
| 2008/0039274 A1 | 2/2008 | Smithson |
| 2008/0039275 A1 | 2/2008 | Smithson |
| 2008/0039276 A1 | 2/2008 | Smithson |
| 2008/0039277 A1 | 2/2008 | Smithson |
| 2008/0040008 A1 | 2/2008 | Smithson |
| 2008/0070729 A1 | 3/2008 | Miller |
| 2008/0071436 A1 | 3/2008 | Dube |
| 2008/0073136 A1 | 3/2008 | Miller |
| 2008/0073137 A1 | 3/2008 | Miller |
| 2008/0073467 A1 | 3/2008 | Miller |
| 2008/0079236 A1 | 4/2008 | Miller |
| 2008/0081715 A1 | 4/2008 | Miller |
| 2008/0081728 A1 | 4/2008 | Faulring |
| 2008/0085795 A1 | 4/2008 | Miller |
| 2008/0085796 A1 | 4/2008 | Miller |
| 2008/0085797 A1 | 4/2008 | Miller |
| 2008/0085798 A1 | 4/2008 | Miller |
| 2008/0121486 A1 | 5/2008 | Miller |
| 2008/0121487 A1 | 5/2008 | Miller |
| 2008/0125281 A1 | 5/2008 | Miller |
| 2008/0125282 A1 | 5/2008 | Miller |
| 2008/0132373 A1 | 6/2008 | Miller |
| 2008/0132377 A1 | 6/2008 | Miller |
| 2008/0139363 A1 | 6/2008 | Williams |
| 2008/0141809 A1 | 6/2008 | Miller |
| 2008/0141810 A1 | 6/2008 | Miller |
| 2008/0146403 A1 | 6/2008 | Miller |
| 2008/0146404 A1 | 6/2008 | Miller |
| 2008/0149407 A1 | 6/2008 | Shibata |
| 2008/0161151 A1 | 7/2008 | Miller |
| 2008/0183358 A1 | 7/2008 | Thomson |
| 2008/0188345 A1 | 8/2008 | Miller |
| 2008/0200300 A1 | 8/2008 | Smithson |
| 2008/0228362 A1 | 9/2008 | Muller |
| 2008/0236319 A1 | 10/2008 | Nichols |
| 2008/0248917 A1 | 10/2008 | Nichols |
| 2008/0261771 A1 | 10/2008 | Nichols |
| 2008/0284170 A1 | 11/2008 | Cory |
| 2008/0305920 A1 | 12/2008 | Nishii |
| 2009/0011907 A1 | 1/2009 | Radow |
| 2009/0023545 A1 | 1/2009 | Beaudoin |
| 2009/0055061 A1 | 2/2009 | Zhu |
| 2009/0062062 A1 | 3/2009 | Choi |
| 2009/0082169 A1 | 3/2009 | Kolstrup |
| 2009/0107454 A1 | 4/2009 | Hiyoshi |
| 2009/0132135 A1 | 5/2009 | Quinn, Jr. |
| 2009/0164076 A1 | 6/2009 | Vasiliotis |
| 2009/0189397 A1 | 7/2009 | Miller |
| 2009/0221391 A1 | 9/2009 | Bazyn |
| 2009/0251013 A1 | 10/2009 | Vollmer |
| 2009/0280949 A1 | 11/2009 | Lohr |
| 2009/0312145 A1 | 12/2009 | Pohl |
| 2009/0318261 A1 | 12/2009 | Tabata |
| 2010/0056322 A1 | 3/2010 | Thomassy |
| 2010/0093479 A1 | 4/2010 | Carter |
| 2010/0093480 A1 | 4/2010 | Pohl |
| 2010/0093485 A1 | 4/2010 | Pohl |
| 2010/0120577 A1 | 5/2010 | Gu |
| 2010/0131164 A1 | 5/2010 | Carter |
| 2010/0145573 A1 | 6/2010 | Vasilescu |

(56) References Cited

U.S. PATENT DOCUMENTS

| | | | |
|---|---|---|---|
| 2010/0181130 A1 | 7/2010 | Chou | |
| 2010/0198453 A1* | 8/2010 | Dorogusker | G06F 1/1626 |
| | | | 340/427 |
| 2010/0228405 A1 | 9/2010 | Morgal | |
| 2010/0264620 A1 | 10/2010 | Miles | |
| 2010/0267510 A1 | 10/2010 | Nichols | |
| 2010/0313614 A1 | 12/2010 | Rzepecki | |
| 2011/0034284 A1 | 2/2011 | Pohl | |
| 2011/0088503 A1 | 4/2011 | Armstrong | |
| 2011/0105274 A1 | 5/2011 | Lohr | |
| 2011/0127096 A1 | 6/2011 | Schneidewind | |
| 2011/0172050 A1 | 7/2011 | Nichols | |
| 2011/0178684 A1 | 7/2011 | Umemoto | |
| 2011/0184614 A1 | 7/2011 | Keilers | |
| 2011/0190093 A1 | 8/2011 | Bishop | |
| 2011/0218072 A1 | 9/2011 | Lohr | |
| 2011/0230297 A1 | 9/2011 | Shiina | |
| 2011/0237385 A1 | 9/2011 | Andre Parise | |
| 2011/0254673 A1 | 10/2011 | Jean | |
| 2011/0291507 A1 | 12/2011 | Post | |
| 2011/0319222 A1 | 12/2011 | Ogawa | |
| 2012/0029744 A1 | 2/2012 | Yun | |
| 2012/0035011 A1 | 2/2012 | Menachem | |
| 2012/0035015 A1 | 2/2012 | Ogawa | |
| 2012/0035016 A1 | 2/2012 | Miller | |
| 2012/0043841 A1 | 2/2012 | Miller | |
| 2012/0115667 A1 | 5/2012 | Lohr | |
| 2012/0130603 A1 | 5/2012 | Simpson | |
| 2012/0158229 A1 | 6/2012 | Schaefer | |
| 2012/0226400 A1 | 9/2012 | Hsu | |
| 2012/0238386 A1 | 9/2012 | Pohl | |
| 2012/0239235 A1 | 9/2012 | Voigtlaender | |
| 2012/0258839 A1 | 10/2012 | Smithson | |
| 2012/0309579 A1 | 12/2012 | Miller | |
| 2013/0019712 A1 | 1/2013 | Murakami | |
| 2013/0035200 A1 | 2/2013 | Noji | |
| 2013/0053211 A1 | 2/2013 | Fukuda | |
| 2013/0072340 A1 | 3/2013 | Bazyn | |
| 2013/0079191 A1 | 3/2013 | Lohr | |
| 2013/0080006 A1 | 3/2013 | Vasiliotis | |
| 2013/0095977 A1 | 4/2013 | Smithson | |
| 2013/0102434 A1 | 4/2013 | Nichols | |
| 2013/0106258 A1 | 5/2013 | Miller | |
| 2013/0139531 A1 | 6/2013 | Pohl | |
| 2013/0146406 A1 | 6/2013 | Nichols | |
| 2013/0152715 A1 | 6/2013 | Pohl | |
| 2013/0190123 A1 | 7/2013 | Pohl | |
| 2013/0190125 A1 | 7/2013 | Nichols | |
| 2013/0288844 A1 | 10/2013 | Thomassy | |
| 2013/0288848 A1 | 10/2013 | Carter | |
| 2013/0310214 A1 | 11/2013 | Pohl | |
| 2013/0324344 A1 | 12/2013 | Pohl | |
| 2013/0331218 A1 | 12/2013 | Lohr | |
| 2013/0337971 A1 | 12/2013 | Kolstrup | |
| 2014/0011619 A1 | 1/2014 | Pohl | |
| 2014/0011628 A1 | 1/2014 | Lohr | |
| 2014/0026697 A1 | 1/2014 | Mori | |
| 2014/0038771 A1 | 2/2014 | Miller | |
| 2014/0073470 A1 | 3/2014 | Carter | |
| 2014/0094339 A1 | 4/2014 | Ogawa | |
| 2014/0121922 A1 | 5/2014 | Vasiliotis | |
| 2014/0128195 A1 | 5/2014 | Miller | |
| 2014/0141919 A1 | 5/2014 | Bazyn | |
| 2014/0144260 A1 | 5/2014 | Nichols | |
| 2014/0148303 A1 | 5/2014 | Nichols | |
| 2014/0155220 A1 | 6/2014 | Messier | |
| 2014/0179479 A1 | 6/2014 | Nichols | |
| 2014/0206499 A1 | 7/2014 | Lohr | |
| 2014/0228163 A1 | 8/2014 | Aratsu | |
| 2014/0248988 A1 | 9/2014 | Lohr | |
| 2014/0257650 A1 | 9/2014 | Carter | |
| 2014/0274536 A1 | 9/2014 | Versteyhe | |
| 2014/0323260 A1 | 10/2014 | Miller | |
| 2014/0329637 A1 | 11/2014 | Thomassy | |
| 2014/0335991 A1 | 11/2014 | Lohr | |
| 2014/0365059 A1 | 12/2014 | Keilers | |
| 2015/0018154 A1 | 1/2015 | Thomassy | |
| 2015/0038285 A1 | 2/2015 | Aratsu | |
| 2015/0039195 A1 | 2/2015 | Pohl | |
| 2015/0051801 A1 | 2/2015 | Quinn, Jr. | |
| 2015/0072827 A1 | 3/2015 | Lohr | |
| 2015/0080165 A1 | 3/2015 | Pohl | |
| 2015/0219194 A1 | 8/2015 | Winter | |
| 2015/0226323 A1 | 8/2015 | Pohl | |
| 2015/0233473 A1 | 8/2015 | Miller | |
| 2015/0260284 A1 | 9/2015 | Miller | |
| 2015/0337928 A1 | 11/2015 | Smithson | |
| 2015/0345599 A1 | 12/2015 | Ogawa | |
| 2015/0360747 A1 | 12/2015 | Baumgaertner | |
| 2015/0369348 A1 | 12/2015 | Nichols | |
| 2015/0377305 A1 | 12/2015 | Nichols | |
| 2016/0003349 A1 | 1/2016 | Kimura | |
| 2016/0031526 A1 | 2/2016 | Watarai | |
| 2016/0039496 A1 | 2/2016 | Hancock | |
| 2016/0040763 A1 | 2/2016 | Nichols | |
| 2016/0061301 A1 | 3/2016 | Bazyn | |
| 2016/0075175 A1 | 3/2016 | Biderman | |
| 2016/0131231 A1 | 5/2016 | Carter | |
| 2016/0146342 A1 | 5/2016 | Vasiliotis | |
| 2016/0178037 A1 | 6/2016 | Pohl | |
| 2016/0186847 A1 | 6/2016 | Nichols | |
| 2016/0195177 A1 | 7/2016 | Versteyhe | |
| 2016/0201772 A1 | 7/2016 | Lohr | |
| 2016/0244063 A1 | 8/2016 | Carter | |
| 2016/0273627 A1 | 9/2016 | Miller | |
| 2016/0281825 A1 | 9/2016 | Lohr | |
| 2016/0290451 A1 | 10/2016 | Lohr | |
| 2016/0298740 A1 | 10/2016 | Carter | |
| 2016/0347411 A1 | 12/2016 | Yamamoto | |
| 2016/0362108 A1 | 12/2016 | Keilers | |
| 2016/0377153 A1 | 12/2016 | Ajumobi | |
| 2017/0072782 A1 | 3/2017 | Miller | |
| 2017/0082049 A1 | 3/2017 | David | |
| 2017/0102053 A1 | 4/2017 | Nichols | |
| 2017/0103053 A1 | 4/2017 | Guerra | |
| 2017/0106866 A1 | 4/2017 | Schieffelin | |
| 2017/0159812 A1 | 6/2017 | Pohl | |
| 2017/0163138 A1 | 6/2017 | Pohl | |
| 2017/0204948 A1 | 7/2017 | Thomassy | |
| 2017/0204969 A1 | 7/2017 | Thomassy | |
| 2017/0211696 A1 | 7/2017 | Nassouri | |
| 2017/0211698 A1 | 7/2017 | Lohr | |
| 2017/0225742 A1* | 8/2017 | Hancock | B62M 6/45 |
| 2017/0268638 A1 | 9/2017 | Nichols | |
| 2017/0274903 A1 | 9/2017 | Carter | |
| 2017/0276217 A1 | 9/2017 | Nichols | |
| 2017/0284519 A1 | 10/2017 | Kolstrup | |
| 2017/0284520 A1 | 10/2017 | Lohr | |
| 2017/0314655 A1 | 11/2017 | Miller | |
| 2017/0327184 A1 | 11/2017 | Contello | |
| 2017/0328470 A1 | 11/2017 | Pohl | |
| 2017/0335961 A1 | 11/2017 | Hamrin | |
| 2017/0343105 A1 | 11/2017 | Vasiliotis | |
| 2017/0364995 A1 | 12/2017 | Yan | |
| 2018/0036593 A1 | 2/2018 | Ridgel | |
| 2018/0066754 A1 | 3/2018 | Miller | |
| 2018/0106359 A1 | 4/2018 | Kawakami | |
| 2018/0119786 A1 | 5/2018 | Mepham | |
| 2018/0134750 A1 | 5/2018 | Alkan | |
| 2018/0148055 A1 | 5/2018 | Carter | |
| 2018/0148056 A1 | 5/2018 | Keilers | |
| 2018/0195586 A1 | 7/2018 | Thomassy | |
| 2018/0202527 A1 | 7/2018 | Nichols | |
| 2018/0221714 A1 | 8/2018 | Anderson | |
| 2018/0236867 A1 | 8/2018 | Miller | |
| 2018/0251190 A1 | 9/2018 | Hancock | |
| 2018/0306283 A1 | 10/2018 | Engesather | |
| 2018/0327060 A1 | 11/2018 | De Jager | |
| 2018/0347693 A1 | 12/2018 | Thomassy | |
| 2018/0370593 A1 | 12/2018 | Park | |
| 2018/0372192 A1 | 12/2018 | Lohr | |
| 2019/0049004 A1 | 2/2019 | Quinn, Jr. | |
| 2019/0102858 A1 | 4/2019 | Pivnick | |
| 2019/0162275 A1 | 5/2019 | Hawkins | |

(56)　　　　　References Cited

U.S. PATENT DOCUMENTS

| | | | |
|---|---|---|---|
| 2019/0195321 | A1 | 6/2019 | Smithson |
| 2019/0277399 | A1 | 9/2019 | Guerin |
| 2019/0300105 | A1* | 10/2019 | Marshall ............... B62J 45/412 |
| 2019/0323582 | A1 | 10/2019 | Horak |
| 2020/0018384 | A1 | 1/2020 | Nichols |
| 2020/0247498 | A1 | 8/2020 | Yamamoto |
| 2022/0258824 | A1* | 8/2022 | Veldkamp ............... B62J 45/20 |

FOREIGN PATENT DOCUMENTS

| | | | |
|---|---|---|---|
| CN | 1054340 | | 9/1991 |
| CN | 2245830 | Y | 1/1997 |
| CN | 1157379 | | 8/1997 |
| CN | 1167221 | | 12/1997 |
| CN | 1178573 | | 4/1998 |
| CN | 1178751 | | 4/1998 |
| CN | 1204991 | | 1/1999 |
| CN | 2320843 | Y | 5/1999 |
| CN | 1281540 | | 1/2001 |
| CN | 1283258 | | 2/2001 |
| CN | 1297404 | | 5/2001 |
| CN | 1300355 | | 6/2001 |
| CN | 1412033 | | 4/2003 |
| CN | 1434229 | | 8/2003 |
| CN | 1474917 | | 2/2004 |
| CN | 1483235 | | 3/2004 |
| CN | 1555466 | | 12/2004 |
| CN | 1568407 | | 1/2005 |
| CN | 1654858 | | 8/2005 |
| CN | 2714896 | Y | 8/2005 |
| CN | 1736791 | | 2/2006 |
| CN | 1791731 | | 6/2006 |
| CN | 1847702 | | 10/2006 |
| CN | 1860315 | | 11/2006 |
| CN | 1896562 | | 1/2007 |
| CN | 1940348 | | 4/2007 |
| CN | 101016076 | | 8/2007 |
| CN | 101166922 | | 4/2008 |
| CN | 101312867 | | 11/2008 |
| CN | 201338543 | Y | 11/2009 |
| CN | 201777370 | U | 3/2011 |
| CN | 102165219 | | 8/2011 |
| CN | 102287530 | | 12/2011 |
| CN | 102947626 | A | 2/2013 |
| CN | 203358799 | U | 12/2013 |
| CN | 103857576 | A | 6/2014 |
| CN | 104648595 | A | 5/2015 |
| CN | 104854380 | A | 8/2015 |
| CN | 108501935 | | 9/2018 |
| CN | 110121460 | A | 8/2019 |
| CN | 110316307 | A | 10/2019 |
| DE | 498701 | | 5/1930 |
| DE | 866748 | C | 2/1953 |
| DE | 1165372 | B | 3/1964 |
| DE | 1171692 | | 6/1964 |
| DE | 2021027 | | 12/1970 |
| DE | 2136243 | | 2/1972 |
| DE | 2310880 | | 9/1974 |
| DE | 2436496 | | 2/1975 |
| DE | 3940919 | | 6/1991 |
| DE | 4120540 | C1 | 11/1992 |
| DE | 19851738 | | 5/2000 |
| DE | 10155372 | | 5/2003 |
| DE | 10261372 | | 7/2003 |
| DE | 102009016869 | | 10/2010 |
| DE | 102011016672 | | 10/2012 |
| DE | 102012107360 | | 2/2013 |
| DE | 102012107927 | | 2/2013 |
| DE | 102012210842 | | 1/2014 |
| DE | 102012212526 | | 1/2014 |
| DE | 102012023551 | | 6/2014 |
| DE | 102012222087 | | 6/2014 |
| DE | 102013201101 | | 7/2014 |
| DE | 102014007271 | | 12/2014 |
| DE | 102013214169 | | 1/2015 |
| DE | 102019121883 | | 9/2020 |
| EP | 0432742 | | 6/1991 |
| EP | 0528381 | | 2/1993 |
| EP | 0528382 | | 2/1993 |
| EP | 0635639 | | 1/1995 |
| EP | 0638741 | | 2/1995 |
| EP | 0831249 | | 3/1998 |
| EP | 0832816 | | 4/1998 |
| EP | 0877341 | | 11/1998 |
| EP | 0976956 | | 2/2000 |
| EP | 1010612 | | 6/2000 |
| EP | 1136724 | | 9/2001 |
| EP | 1188602 | | 3/2002 |
| EP | 1251294 | | 10/2002 |
| EP | 1362783 | | 11/2003 |
| EP | 1366978 | | 12/2003 |
| EP | 1433641 | | 6/2004 |
| EP | 1452441 | | 9/2004 |
| EP | 1518785 | | 3/2005 |
| EP | 1624230 | | 2/2006 |
| EP | 1811202 | | 7/2007 |
| EP | 1850038 | | 10/2007 |
| EP | 2261108 | | 12/2010 |
| EP | 2338782 | | 6/2011 |
| EP | 2464560 | | 6/2012 |
| EP | 2602672 | | 6/2013 |
| EP | 2620672 | | 7/2013 |
| EP | 2357128 | | 8/2014 |
| EP | 2893219 | | 7/2015 |
| EP | 2927534 | | 10/2015 |
| FR | 620375 | | 4/1927 |
| FR | 2460427 | | 1/1981 |
| FR | 2590638 | | 5/1987 |
| FR | 2909938 | | 6/2008 |
| FR | 2996276 | | 4/2014 |
| FR | 3073479 | | 5/2019 |
| GB | 891448 | | 4/1933 |
| GB | 592320 | | 9/1947 |
| GB | 772749 | A | 4/1957 |
| GB | 858710 | | 1/1961 |
| GB | 906002 | A | 9/1962 |
| GB | 919430 | A | 2/1963 |
| GB | 1132473 | | 11/1968 |
| GB | 1165545 | | 10/1969 |
| GB | 1376057 | | 12/1974 |
| GB | 2031822 | | 4/1980 |
| GB | 2035481 | | 6/1980 |
| GB | 2035482 | | 6/1980 |
| GB | 2080452 | | 2/1982 |
| JP | 38025315 | | 11/1963 |
| JP | 413126 | | 2/1966 |
| JP | 0422844 | | 2/1967 |
| JP | 441098 | | 1/1969 |
| JP | 46029087 | B | 8/1971 |
| JP | 47448 | B | 1/1972 |
| JP | 47962 | B | 1/1972 |
| JP | 47207 | | 6/1972 |
| JP | 4720535 | | 6/1972 |
| JP | 47001621 | | 8/1972 |
| JP | 4700962 | | 11/1972 |
| JP | 4729762 | | 11/1972 |
| JP | 4854371 | | 7/1973 |
| JP | 4912742 | | 3/1974 |
| JP | 49013823 | | 4/1974 |
| JP | 49041536 | | 11/1974 |
| JP | 50114581 | | 9/1975 |
| JP | 5125903 | | 8/1976 |
| JP | 51150380 | | 12/1976 |
| JP | 5235481 | | 3/1977 |
| JP | 53048166 | | 1/1978 |
| JP | 5350395 | U1 | 4/1978 |
| JP | 55135259 | | 10/1980 |
| JP | 5624251 | | 3/1981 |
| JP | 56047231 | | 4/1981 |
| JP | 56101448 | | 8/1981 |
| JP | 56127852 | | 10/1981 |
| JP | 58065361 | | 4/1983 |
| JP | 59069565 | | 4/1984 |
| JP | 59144826 | | 8/1984 |

(56) References Cited

FOREIGN PATENT DOCUMENTS

| | | |
|---|---|---|
| JP | 59190557 | 10/1984 |
| JP | 6073958 U | 5/1985 |
| JP | 60247011 | 12/1985 |
| JP | 61031754 | 2/1986 |
| JP | 61053423 | 3/1986 |
| JP | 61173722 | 10/1986 |
| JP | 61270552 | 11/1986 |
| JP | 62075170 | 4/1987 |
| JP | 63125854 | 5/1988 |
| JP | 63219953 | 9/1988 |
| JP | 63160465 | 10/1988 |
| JP | 01210653 | 8/1989 |
| JP | 01039865 | 11/1989 |
| JP | 01286750 | 11/1989 |
| JP | 01308142 | 12/1989 |
| JP | 02130224 | 5/1990 |
| JP | 02157483 | 6/1990 |
| JP | 02271142 | 6/1990 |
| JP | 02182593 | 7/1990 |
| JP | 03149442 | 6/1991 |
| JP | 03223555 | 10/1991 |
| JP | 422843 B | 1/1992 |
| JP | 470207 | 3/1992 |
| JP | 470962 | 3/1992 |
| JP | 479762 | 3/1992 |
| JP | 04166619 | 6/1992 |
| JP | 04272553 | 9/1992 |
| JP | 04327055 | 11/1992 |
| JP | 05087154 | 4/1993 |
| JP | 0650358 | 2/1994 |
| JP | 06050169 | 2/1994 |
| JP | 07042799 | 2/1995 |
| JP | 07133857 | 5/1995 |
| JP | 07139600 | 5/1995 |
| JP | 07259950 | 10/1995 |
| JP | 08135748 | 5/1996 |
| JP | 08170706 A | 7/1996 |
| JP | 08247245 | 9/1996 |
| JP | 08270772 | 10/1996 |
| JP | 09024743 A | 1/1997 |
| JP | 09089064 | 3/1997 |
| JP | 1078094 | 3/1998 |
| JP | 10061739 | 3/1998 |
| JP | 10089435 | 4/1998 |
| JP | 10115355 | 5/1998 |
| JP | 10115356 | 5/1998 |
| JP | 10194186 | 7/1998 |
| JP | 10225053 | 8/1998 |
| JP | 10511621 | 11/1998 |
| JP | H10307964 | 11/1998 |
| JP | 11063130 A | 3/1999 |
| JP | 11091411 | 4/1999 |
| JP | 11210850 | 8/1999 |
| JP | 11227669 | 8/1999 |
| JP | 11240481 | 9/1999 |
| JP | 11257479 | 9/1999 |
| JP | 11317653 | 11/1999 |
| JP | 2000006877 | 1/2000 |
| JP | 2000046135 | 2/2000 |
| JP | 2000177673 | 6/2000 |
| JP | 2001027298 | 1/2001 |
| JP | 2001071986 | 3/2001 |
| JP | 2001107827 | 4/2001 |
| JP | 2001165296 | 6/2001 |
| JP | 2001234999 | 8/2001 |
| JP | 2001328466 | 11/2001 |
| JP | 2001521109 | 11/2001 |
| JP | 2002147558 | 5/2002 |
| JP | 61144466 | 9/2002 |
| JP | 2002250421 | 9/2002 |
| JP | 2002291272 | 10/2002 |
| JP | 2002307956 | 10/2002 |
| JP | 2002533626 | 10/2002 |
| JP | 2002372114 | 12/2002 |
| JP | 2003028257 | 1/2003 |
| JP | 2003056662 | 2/2003 |
| JP | 2003507261 | 2/2003 |
| JP | 2003161357 | 6/2003 |
| JP | 2003194206 | 7/2003 |
| JP | 2003194207 | 7/2003 |
| JP | 2003524119 | 8/2003 |
| JP | 2003320987 | 11/2003 |
| JP | 2003336732 | 11/2003 |
| JP | 2004011834 | 1/2004 |
| JP | 2004038722 | 2/2004 |
| JP | 2004162652 | 6/2004 |
| JP | 2004189222 | 7/2004 |
| JP | 2004232776 | 8/2004 |
| JP | 2004526917 | 9/2004 |
| JP | 2004301251 | 10/2004 |
| JP | 2005003063 | 1/2005 |
| JP | 2005096537 | 4/2005 |
| JP | 2005188694 | 7/2005 |
| JP | 2005240928 | 9/2005 |
| JP | 2005312121 | 11/2005 |
| JP | 2006015025 | 1/2006 |
| JP | 2006283900 | 10/2006 |
| JP | 2006300241 | 11/2006 |
| JP | 2007085404 | 4/2007 |
| JP | 2007321931 | 12/2007 |
| JP | 2007535715 | 12/2007 |
| JP | 2008002687 | 1/2008 |
| JP | 2008014412 | 1/2008 |
| JP | 2008133896 | 6/2008 |
| JP | 4351361 | 10/2009 |
| JP | 2010069005 | 4/2010 |
| JP | 2010532454 | 10/2010 |
| JP | 2011178341 | 9/2011 |
| JP | 2012501418 | 1/2012 |
| JP | 2012506001 | 3/2012 |
| JP | 4913823 | 4/2012 |
| JP | 4941536 | 5/2012 |
| JP | 2012107725 | 6/2012 |
| JP | 2012121338 | 6/2012 |
| JP | 2012122568 | 6/2012 |
| JP | 2012211610 | 11/2012 |
| JP | 2012225390 | 11/2012 |
| JP | 2013521452 | 6/2013 |
| JP | 2013147245 | 8/2013 |
| JP | 5348166 | 11/2013 |
| JP | 5647231 | 12/2014 |
| JP | 5668205 | 2/2015 |
| JP | 2015505022 | 2/2015 |
| JP | 2015075148 | 4/2015 |
| JP | 2015227690 | 12/2015 |
| JP | 2015227691 | 12/2015 |
| JP | 5865361 | 2/2016 |
| JP | 5969565 | 8/2016 |
| JP | 6131754 | 5/2017 |
| JP | 6153423 | 6/2017 |
| JP | 2017523079 A | 8/2017 |
| JP | 2018502549 A | 1/2018 |
| JP | 6275170 | 2/2018 |
| JP | 2018025315 | 2/2018 |
| JP | 2019182227 A | 10/2019 |
| KR | 20020054126 | 7/2002 |
| KR | 20020071699 | 9/2002 |
| KR | 20080079274 | 8/2008 |
| KR | 20080081030 | 9/2008 |
| KR | 20130018976 | 2/2013 |
| KR | 101339282 | 1/2014 |
| NL | 98467 C | 7/1961 |
| TW | 74007 | 1/1984 |
| TW | 175100 | 12/1991 |
| TW | 218909 B | 1/1994 |
| TW | 227206 | 7/1994 |
| TW | 275872 | 5/1996 |
| TW | 294598 U | 1/1997 |
| TW | 360184 B | 6/1999 |
| TW | 366396 B | 8/1999 |
| TW | 101496 B | 8/2000 |
| TW | 510867 B | 11/2002 |
| TW | 512211 B | 12/2002 |
| TW | 582363 B | 4/2004 |

(56) References Cited

FOREIGN PATENT DOCUMENTS

| TW | 590955 B | 6/2004 |
| TW | 225129 B | 12/2004 |
| TW | 225912 B | 1/2005 |
| TW | 235214 B | 7/2005 |
| TW | 200637745 | 11/2006 |
| TW | 200741116 | 11/2007 |
| TW | 200821218 | 5/2008 |
| TW | 201339049 | 10/2013 |
| WO | 9908024 | 2/1999 |
| WO | 9920918 | 4/1999 |
| WO | 2000061388 | 10/2000 |
| WO | 0138758 | 5/2001 |
| WO | 2001073319 | 10/2001 |
| WO | 2002088573 | 11/2002 |
| WO | 2003086849 | 10/2003 |
| WO | 2003100294 | 12/2003 |
| WO | 2004079223 | 9/2004 |
| WO | 2005019669 | 3/2005 |
| WO | 2005083305 | 9/2005 |
| WO | 2005108825 | 11/2005 |
| WO | 2005111472 | 11/2005 |
| WO | 2006014617 | 2/2006 |
| WO | 2006047887 | 5/2006 |
| WO | 2006091503 | 8/2006 |
| WO | 2007061993 | 5/2007 |
| WO | 2007070167 | 6/2007 |
| WO | 2007077502 | 7/2007 |
| WO | 2008002457 | 1/2008 |
| WO | 2008057507 | 5/2008 |
| WO | 2008078047 | 7/2008 |
| WO | 2008095116 | 8/2008 |
| WO | 2008100792 | 8/2008 |
| WO | 2008101070 | 8/2008 |
| WO | 2008131353 | 10/2008 |
| WO | 2008154437 | 12/2008 |
| WO | 2008157443 | 12/2008 |
| WO | 2009006481 | 1/2009 |
| WO | 2009148461 | 12/2009 |
| WO | 2009157920 | 12/2009 |
| WO | 2010017242 | 2/2010 |
| WO | 2010024809 | 3/2010 |
| WO | 2010044778 | 4/2010 |
| WO | 2010073036 | 7/2010 |
| WO | 2010094515 | 8/2010 |
| WO | 2010135407 | 11/2010 |
| WO | 2011064572 | 6/2011 |
| WO | 2011101991 | 8/2011 |
| WO | 2011109444 | 9/2011 |
| WO | 2011121743 | 10/2011 |
| WO | 2011124415 | 10/2011 |
| WO | 2011138175 | 11/2011 |
| WO | 2012030213 | 3/2012 |
| WO | 2013042226 | 3/2013 |
| WO | 2013112408 | 8/2013 |
| WO | 2014186732 | 11/2014 |
| WO | 2016022553 | 2/2016 |
| WO | 2016062461 | 4/2016 |
| WO | 2016079620 | 5/2016 |
| WO | 2016086057 A1 | 6/2016 |
| WO | 2016205639 | 12/2016 |
| WO | 2017056541 | 4/2017 |
| WO | 2017186911 | 11/2017 |
| WO | 2019102495 | 5/2019 |
| WO | 2022178434 | 8/2022 |

OTHER PUBLICATIONS

Chinese Office Action dated Dec. 24, 2012 for Chinese Patent Application No. 201110120717.6.
Chinese Office Action dated Jan. 22, 2010 for Chinese Patent Application No. 200680052833.6.
Chinese Office Action dated May 28, 2013 for Chinese Patent Application No. 201110120717.6.

Examination Report dated Dec. 17, 2020 in Indian Patent Application No. 201837029026, 7 pages.
Examination report dated Jul. 11, 2018 in Indian Patent Application No. 2060/KOLNP/2010.
Examination Report dated Mar. 2, 2017 in Indian Patent Application No. 2772/KOLNP/2008.
Examination Report dated Sep. 25, 2013 for European Patent Application No. 06816430.0.
First Office Action dated Sep. 2, 2015 in Chinese Patent Application No. 201410145485.3.
International Search Report and Written Opinion dated Apr. 16, 2008, for PCT Application No. PCT/US2007/023315.
International Search Report and Written Opinion dated Dec. 20, 2006 from International Patent Application No. PCT/US2006/033104, filed on Aug. 23, 2006.
International Search Report and Written Opinion dated Feb. 2, 2010 from International Patent Application No. PCT/US2008/068929, filed on Jan. 7, 2008.
International Search Report and Written Opinion dated Jan. 25, 2010 from International Patent Application No. PCT/US2009/052761, filed on Aug. 4, 2009.
International Search Report and Written Opinion dated Jul. 21, 2017 in PCT/US2017/032023.
International Search Report and Written Opinion dated Jul. 27, 2009 from International Patent Application No. PCT/US2008/079879, filed on Oct. 14, 2008.
International Search Report and Written Opinion dated Jun. 27, 2017 in PCT/US2016/063880.
International Search Report and Written Opinion dated May 16, 2007 from International Patent Application No. PCT/IB2006/054911, dated Dec. 18, 2006.
International Search Report and Written Opinion dated May 19, 2009 from International Patent Application No. PCT/US2008/083660, filed on Nov. 14, 2008.
International Search Report and Written Opinion dated May 8, 2020 in PCT/US2020/019446.
International Search Report and Written Opinion dated Nov. 13, 2009 from International Patent Application No. PCT/US2008/053951, filed on Feb. 14, 2008.
International Search Report dated May 16, 2007, for PCT Application No. PCT/IB2006/054911.
International Search Report dated Nov. 21, 2002, for PCT Application No. PCT/US02/13399, filed on Apr. 25, 2002.
International Search Report for International Application No. PCT/US04/15652 dated Aug. 26, 2005.
International Search Report for International Application No. PCT/US05/25539 dated Jun. 8, 2006.
International Search Report for International Application No. PCT/US07/14510 dated Sep. 23, 2008.
International Search Report for International Application No. PCT/US2006/041389 dated Sep. 24, 2007.
International Search Report for International Application No. PCT/US2006/044983 dated Jun. 13, 2008.
International Search Report for International Application No. PCT/US2008/053347 dated Jul. 18, 2008.
International Search Report for International application No. PCT/US2005/035164 dated Jun. 27, 2007.
International Search Report for International Application No. PCT/US2006/039166 dated Feb. 27, 2007.
International Search Report for International application No. PCT/US2009/035540 dated Aug. 6, 2009.
Invitation to Pay Additional Fees dated May 3, 2017 in PCT/US2016/063880.
Notice of Office Action dated Jun. 22, 2016 in Taiwan Patent Application No. 103129866.
Notification of Reasons for Rejection dated Oct. 6, 2020 in Japanese Patent Application No. 2018-536480, 21 pages.
Notification of Reexamination dated Aug. 29, 2013 for Chinese Patent Application No. 200680052833.6.
Notification of the First Office Action dated Jun. 26, 2019 in Chinese Patent Application No. 201680080281.3.
Notification of the Second Office Action dated Mar. 16, 2020 in Chinese Patent Application No. 201680080281.3, 15 pages.

(56) References Cited

OTHER PUBLICATIONS

Office Action dated Apr. 2, 2014 in U.S. Appl. No. 13/288,711.
Office Action dated Aug. 13, 2013 for Canadian Patent Application No. 2632751.
Office Action dated Aug. 20, 2010 for Chinese Patent Application No. 200680052482.9.
Office Action dated Aug. 23, 2006 from Japanese Patent Application No. 2000-517205.
Office Action dated Aug. 29, 2013 in U.S. Appl. No. 13/288,711.
Office Action dated Aug. 3, 2015 in U.S. Appl. No. 14/541,875.
Office Action dated Dec. 12, 2011 for U.S. Appl. No. 12/271,611.
Office Action dated Dec. 12, 2016 in U.S. Appl. No. 13/938,056.
Office Action dated Dec. 29, 2017 in U.S. Appl. No. 14/839,567.
Office Action dated Dec. 4, 2012 for Korean Patent Application No. 10-2008-7016716.
Office Action dated Feb. 17, 2010 from Japanese Patent Application No. 2009-294086.
Office Action dated Feb. 24, 2010 from Japanese Patent Application No. 2006-508892.
Office Action dated Jan. 18, 2017 in U.S. Appl. No. 14/529,773.
Office Action dated Jan. 20, 2012 for U.S. Appl. No. 12/137,456.
Office Action dated Jan. 20, 2015 in U.S. Appl. No. 13/682,176.
Office Action dated Jul. 16, 2012 for U.S. Appl. No. 12/271,611.
Office Action dated Jul. 18, 2016 in U.S. Appl. No. 13/938,056.
Office Action dated Jul. 25, 2012 for European Patent Application No. 06816430.0.
Office Action dated Jul. 5, 2017 in U.S. Appl. No. 14/529,773.
Office Action dated Jul. 6, 2016 in U.S. Appl. No. 14/529,773.
Office Action dated Jun. 19, 2014 in U.S. Appl. No. 13/682,176.
Office Action dated Jun. 28, 2011 from Japanese Patent Application No. 2009-518168.
Office Action dated Jun. 8, 2018 in U.S. Appl. No. 14/839,567.
Office Action dated Mar. 14, 2012 for U.S. Appl. No. 12/137,480.
Office Action dated Mar. 18, 2010 from U.S. Appl. No. 12/137,464.
Office Action dated Mar. 5, 2015 in U.S. Appl. No. 14/541,875.
Office Action dated May 17, 2002 for Chinese Patent Application No. 98812170.0.
Office Action dated May 17, 2012 for U.S. Appl. No. 12/159,688.

Office Action dated May 29, 2013 for Chinese Patent Application No. 200880116244.9.
Office Action dated Nov. 14, 2012 for U.S. Appl. No. 12/159,688.
Office Action dated Nov. 14, 2017 in U.S. Appl. No. 15/172,031, 5 pages.
Office Action dated Nov. 3, 2017 in U.S. Appl. No. 14/996,743, 10 pages.
Office Action dated Oct. 19, 2012 for Canadian Patent Application No. 2632751.
Office Action dated Sep. 14, 2010 for Japanese Patent Application No. 2007-278224.
Office Action dated Sep. 15, 2010 for U.S. Appl. No. 11/543,311.
Office Action dated Sep. 24, 2012 for Chinese Patent Application No. 200880116244.9.
Office Action dated Sep. 24, 2012 for Taiwanese Patent Application No. 095137289.
Office Action dated Sep. 28, 2005 for Japanese Patent Application No. 2001-540276.
Partial International Search Report for International Application No. PCT/US2008/052685 dated Sep. 2, 2008.
Preliminary Notice of First Office Action dated Jan. 14, 2014 for Taiwanese Patent Application No. 095137289.
Preliminary Notice of First Office Action dated Jun. 20, 2014 in Taiwanese Patent Application No. 97144386.
Rejection Decision dated May 29, 2015 in Taiwanese Patent Application No. 97144386.
Second Office Action dated Feb. 24, 2016 in Chinese Patent Application No. 201410145485.3.
Supplementary European Search Report dated Apr. 1, 2009, for European Application No. 04715691.4, filed Feb. 7, 2004.
Taiwan Search Report and Preliminary Notice of First Office Action dated Oct. 30, 2008 for Taiwanese Patent Application No. 094134761.
Thomassy, Fernand A., "An Engineering Approach to Simulating Traction EHL", CVT-Hybrid International Conference Mecc/ Maastricht/The Netherlands, Nov. 17-19, 2010, p. 97.
Ho et al., "Torque Measurement and Control for Electric-Assisted Bike Considering Different External Load Conditions", sensors, 2023, May 11, 2023, retrieved on [Aug. 24, 2025], retrieved from the Internet <URL: https://www.mdpi.com/1424-8220/23/10/4657>, 30 pages.

* cited by examiner

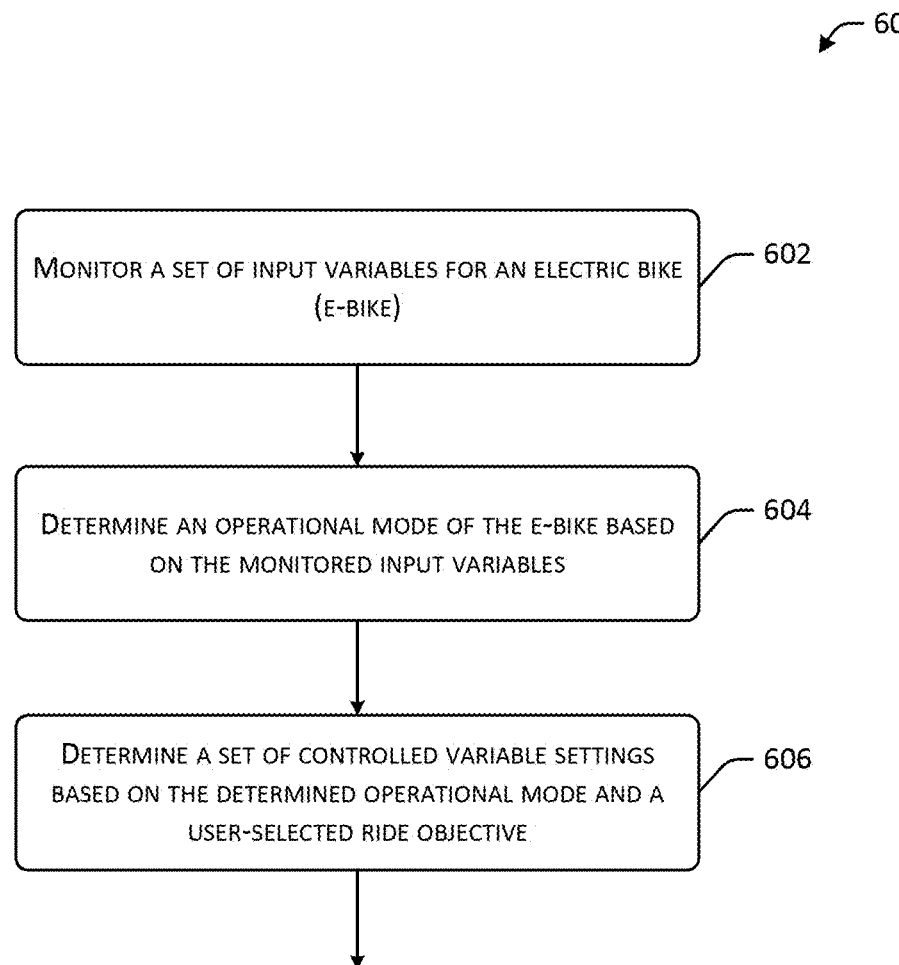

┌─ 600

MONITOR A SET OF INPUT VARIABLES FOR AN ELECTRIC BIKE (E-BIKE) ─ 602

DETERMINE AN OPERATIONAL MODE OF THE E-BIKE BASED ON THE MONITORED INPUT VARIABLES ─ 604

DETERMINE A SET OF CONTROLLED VARIABLE SETTINGS BASED ON THE DETERMINED OPERATIONAL MODE AND A USER-SELECTED RIDE OBJECTIVE ─ 606

CONTROL ONE OR MORE E-BIKE OPERATIONAL COMPONENTS BASED ON THE SET OF CONTROLLED VARIABLE SETTINGS ─ 608

FIG. 6

AUTOMATIC CONTROL OF A MOTOR-ASSISTED BICYCLE TO ACHIEVE A DESIRED RIDE OBJECTIVE OF A RIDER

CROSS REFERENCE TO RELATED APPLICATION

This application is a nonprovisional application of and claims the benefit of U.S. Provisional Application Ser. No. 63/152,225, entitled "USER INTERFACE FOR A BICYCLE OR SCOOTER EXPERIENCE (MOODS/UX)," filed Feb. 22, 2021, which is incorporated by reference in their entirety herein for all purposes.

TECHNICAL FIELD

This disclosure pertains to motor-assisted vehicles, and more particularly to automatic control of a motor-assisted bicycle to achieve a rider's desired ride objective.

BACKGROUND

A motor-assisted vehicle is a motorized vehicle with an integrated motor or engine that assists with vehicle propulsion. An electric bicycle ("e-bike") is a type of motor-assisted bicycle in which the propulsion assist is provided by an integrated electric motor. E-bikes can generally be grouped into two categories: 1) those that assist the rider's pedal power, and 2) those that add a throttle, and as such, integrate moped-style functionality. Both categories of e-bikes retain the ability to be manually pedaled by a rider.

The electric motor of an e-bike may be a hub motor that is situated in the hub of a wheel of the e-bike to provide propulsion through the application of additional torque to the wheel. A front hub motor is connected to the front wheel and creates a "pulling" sensation, while a rear hub motor is connected to the rear wheel and creates a "pushing" sensation. An alternative to a hub motor is a mid-drive motor. Rather than being located in hub of one of the wheels, a mid-drive motor typically drives power to the e-bike's drivetrain at the crankset. By directly powering an e-bike's cranks, mid-drive motors are able to work in tight coordination with an e-bike's existing gearset, thereby amplifying the mechanical advantage it provides.

An e-bike's electric motor operates in conjunction with a power source (e.g., a rechargeable battery) and a drivetrain to provide the propulsion assist. A drivetrain is the system that provides the power and torque necessary to turn the wheels of a vehicle. On standard, non-motorized bicycles, the drivetrain consists of the crankset, chain, and some sort of gear system that is typically attached to the rear wheel. In some cases, the drivetrain includes a set of differently sized gears and derailleurs configured to mechanically move a bike chain across the gears. In other cases, an internally geared hub/transmission may be provided that houses the gearing.

A particular type of internally geared hub is a continuously variable transmission (CVT) that does not have fixed gear ratios, but rather provides virtually unlimited shifting across a range of transmission/gear ratios. In an example configuration, a planetary CVT includes a set of rotating balls supported by an idler and positioned around a center axis of the idler. The balls contact an input ring representing the sprocket driven by pedaling and an output ring corresponding to the wheel to be driven. A tilt angle of the balls is adjusted by manipulating a shifter (which may be provided on a handlebar) to cause a control rod to move, thereby moving the idler along its center axis. By adjusting the tilt axis of the balls in this manner, a transmission ratio of the CVT is adjusted. In underdrive, the balls have a tilt axis that causes the input ring to spin faster than the output ring, while in overdrive, the tilt axis of the balls causes the output ring to spin faster than the input ring. Moreover, in some configurations, high pressure of the rolling contact of the balls with the input and output rings causes momentary solidification of a fluid that passes between a microscopic space between the rotating balls and the input and output rings, thereby enabling torque transfer to occur.

The transmission ratio and the torque output of an electric motor of an e-bike can be controlled through direct rider inputs to the e-bike using, for example, switches, levers, knobs, joysticks, or the like. A rider may need to manipulate these direct inputs repeatedly throughout a ride to achieve a desired ride experience, which can become cumbersome.

SUMMARY

Motor-assisted vehicles and systems, methods, and computer-readable media for automatically and dynamically determining controlled variable settings of a motor-assisted vehicle during a ride to support a rider's desired ride objective are disclosed. According to example embodiments of the technology disclosed herein, the rider's ride objective may be determined from a set of rider-specified input parameters. The input parameters may indicate, for example, that the rider desires a ride experience-based ride objective, a fitness-based ride objective, or a ride attribute-based ride objective. Sensor information may be received from one or more onboard sensors, and optionally, from one or more sensors remote from the motor-assisted vehicle. The sensor information may correspond to a set of input variables, which may be associated with operational characteristics of the vehicle and/or environmental characteristics.

A set of controlled variable settings for controlling one or more operational components of the vehicle may then be dynamically determined using an objective-based ride control algorithm, the sensor information, and the set of input parameters. The operational components of the vehicle may include a transmission, an electric motor, a braking system, a suspension system, or the like. The controlled variable settings may include a transmission ratio, an adjustment to the transmission ratio, a motor assist level/motor torque output, an adjustment to the motor assist level/motor torque output, a braking force/braking modulation, an adjustment to the braking force/braking modulation, a suspension pressure, an adjustment to the suspension pressure, or the like. The controlled variable settings may be automatically and dynamically determined during the ride so as to attempt to satisfy the rider's specified ride objective. In this manner, the rider obtains her desired ride objective without having to provide direct inputs to the motor-assisted vehicle to control the controlled variable settings.

In an example embodiment, a method of objective-based ride control of a motor-assisted bicycle is disclosed. The method includes receiving, via a user interface, user input indicative of a desired ride experience for a user, the desired ride experience associated with a set of input parameters; receiving sensor information indicative of at least one of an operational characteristic of the motor-assisted bicycle or an environmental characteristic; using an objective-based ride control algorithm, the set of input parameters, and the sensor information to determine a set of controlled variable settings for one or more operational components of the motor-assisted bicycle; and controlling the one or more operational components of the motor-assisted bicycle based on the set of controlled settings to support the desired ride experience for the user.

In an example embodiment, the set of input parameters includes at least one of a ride experience parameter, a fitness parameter, or a ride attribute parameter.

In an example embodiment, the ride experience parameter indicates a level of effort that the user desires to expend for a ride between a starting location and a destination location.

In an example embodiment, the fitness parameter includes one of a target caloric burn for the user for a ride between a starting location and a destination location or a heart rate zone for at least a portion of the ride.

In an example embodiment, the ride attribute parameter includes a target remaining charge of a battery of the motor-assisted bicycle upon reaching a destination location.

In an example embodiment, the set of controlled variable settings includes at least one of a transmission ratio of the motor-assisted bicycle, an adjustment to the transmission ratio, a torque output by an electric motor of the motor-assisted bicycle, or an adjustment to the torque output.

In an example embodiment, the set of controlled variable settings includes at least one of a braking force applied by a braking mechanism of the motor-assisted bicycle, an adjustment to the braking force, a suspension pressure of a suspension system of the motor-assisted bicycle, or an adjustment to the suspension pressure.

In an example embodiment, the sensor information includes at least one of location information indicative of a location of the motor-assisted bicycle, an elevation at the location of the motor-assisted bicycle, a cadence speed of the motor-assisted bicycle, a speed of the motor-assisted bicycle, a power output of an electric motor of the motor-assisted bicycle, an input current to the electric motor, a braking force applied to a braking mechanism of the motor-assisted bicycle, or a suspension pressure of a suspension system of the motor-assisted bicycle.

In an example embodiment, receiving the sensor information includes receiving the sensor information from one or more sensors onboard the motor-assisted bicycle.

In an example embodiment, using the objective-based ride control algorithm includes monitoring the sensor information over time, determining an operational mode of the motor-assisted bicycle based on the monitored sensor information, and determining the set of controlled variable settings based on the determined operational mode of the motor-assisted bicycle.

In an example embodiment, determining the operational mode of the motor-assisted bicycle includes detecting particular sensor information that indicates an increase in terrain incline, the particular sensor information including at least one of a decreasing rate of speed of the motor-assisted bicycle for at least a threshold period of time, a combination of a location of the motor-assisted bicycle and a direction of travel of the motor-assisted bicycle, or a combination of a decrease in suspension travel at a rear of the motor-assisted bicycle and an increase in suspension travel at a front of the motor-assisted bicycle.

In an example embodiment, determining the set of controlled variable settings based on the determined operational mode of the motor-assisted bicycle includes one or more of shifting a transmission ratio of the motor-assisted bicycle closer towards full underdrive, increasing a torque output of an electric motor of the motor-assisted bicycle, increasing a suspension pressure of a suspension system of the motor-assisted bicycle at the rear of the motor-assisted bicycle, or decreasing a suspension pressure of the suspension system of the motor-assisted bicycle at the front of the motor-assisted bicycle.

In an example embodiment, the set of input parameters includes a ride experience parameter indicating a first level of effort that the user desires to expend for a first ride and a second level of effort that the user desires to expend for a second ride, the second level of effort being greater than the first level of effort, and wherein at least one of a shift in the transmission ratio towards full underdrive or an increase in the torque output of the electric motor is greater for the first ride than for the second ride.

In an example embodiment, determining the operational mode of the motor-assisted bicycle including detecting particular sensor information that indicates an emergency braking operation, the particular sensor information including at least one of an increase in braking pressure by more than a threshold amount in less than a first threshold period of time, a decrease in cadence speed by more than a threshold amount in less than a second threshold period of time, or a combination of an increase in suspension travel at a rear of the motor-assisted bicycle and a decrease in suspension travel at a front of the motor-assisted bicycle.

In an example embodiment, determining the set of controlled variable settings based on the determined operational mode of the motor-assisted bicycle includes one or more of stopping power to a transmission of the motor-assisted bicycle, stopping power to an electric motor of the motor-assisted bicycle, decreasing a suspension pressure of a suspension system of the motor-assisted bicycle at the rear of the motor-assisted bicycle, increasing a suspension pressure of the suspension system of the motor-assisted bicycle at the front of the motor-assisted bicycle, or initiating an automatic braking operation of the motor-assisted bicycle.

In an example embodiment, a motor-assisted bicycle is disclosed. The motor-assisted bicycle includes a frame, a transmission, an electric motor coupled to the transmission, a power source for supplying power to the electric motor, a crankset, one or more sensors, and a controller communicatively coupled to the one or more sensors, the transmission and the electric motor. The controller includes memory storing executable instructions and a processor configured to access the memory and execute the instructions to perform a set of operations. The set of operations includes receiving, via a user interface, user input indicative of a desired ride experience for a user, the desired ride experience associated with a set of input parameters; receiving sensor information from the one or more sensors, the sensor information indicative of at least one of an operational characteristic of the motor-assisted bicycle or an environmental characteristic; using an objective-based ride control algorithm, the set of input parameters and the sensor information to determine a set of controlled variable settings for one or more operational components of the motor-assisted bicycle; and controlling the one or more operational components of the motor-assisted bicycle based on the set of controlled settings to support the desired ride experience for the user.

In an example embodiment, the power source is a battery and the set of input parameters includes a target remaining charge of the battery upon reaching a destination location, and the processor is configured to execute the instructions to control the battery to reduce an amount of power supplied to the electric motor in order to conserve charge of the battery to meet the target remaining charge.

In an example embodiment, the processor is configured to use the objective-based ride control algorithm by executing the instructions to monitor the sensor information over time, determine an operational mode of the motor-assisted bicycle based on the monitored sensor information, and determine the set of controlled variable settings based on the determined operational mode of the motor-assisted bicycle.

In an example embodiment, the set of controlled variable settings includes at least one of a transmission ratio of the motor-assisted bicycle, an adjustment to the transmission ratio, a torque output by the electric motor, or an adjustment to the torque output.

In an example embodiment, the motor-assisted bicycle further includes a braking mechanism and a suspension system, and the set of controlled variable settings includes at least one of a braking force applied by the braking mechanism, an adjustment to the braking force, a suspension pressure of the suspension system, or an adjustment to the suspension pressure.

In an example embodiment, a non-transitory computer-readable medium for objective-based ride control of a motor-assisted bicycle is disclosed. The non-transitory computer-readable medium is readable by a processing circuit and stores instructions executable by the processing circuit to cause a method to be performed. The method includes receiving, via a user interface, user input indicative of a desired ride experience for a user, the desired ride experience associated with a set of input parameters; receiving sensor information indicative of at least one of an operational characteristic of the motor-assisted bicycle or an environmental characteristic; using an objective-based ride control algorithm, the set of input parameters and the sensor information to determine a set of controlled variable settings for one or more operational components of the motor-assisted bicycle; and controlling the one or more operational components of the motor-assisted bicycle based on the set of controlled settings to support the desired ride experience for the user.

Any of the above-described methods, systems, and/or non-transitory computer readable media embodiments can be combined in any manner to obtain additional embodiments of the disclosed technology. In particular, any feature, component, aspect, or the like of any given embodiment can be combined with any other feature, component, aspect, or the like of any other embodiment to obtain another embodiment of the disclosed technology.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the disclosed technology are set forth with particularity in the appended claims. A better understanding of the features and advantages of the disclosed technology will be obtained by reference to the following detailed description that sets forth illustrative embodiments, in which the principles of the technology are utilized, and the accompanying drawings of which:

FIG. 6 is a flowchart of an illustrative method for determining controlled variable settings for an e-bike based on sensor information, a determined operational mode of the e-bike, and a desired ride objective of a rider of the e-bike in accordance with example embodiments of the disclosed technology.

DETAILED DESCRIPTION

Figure 1:
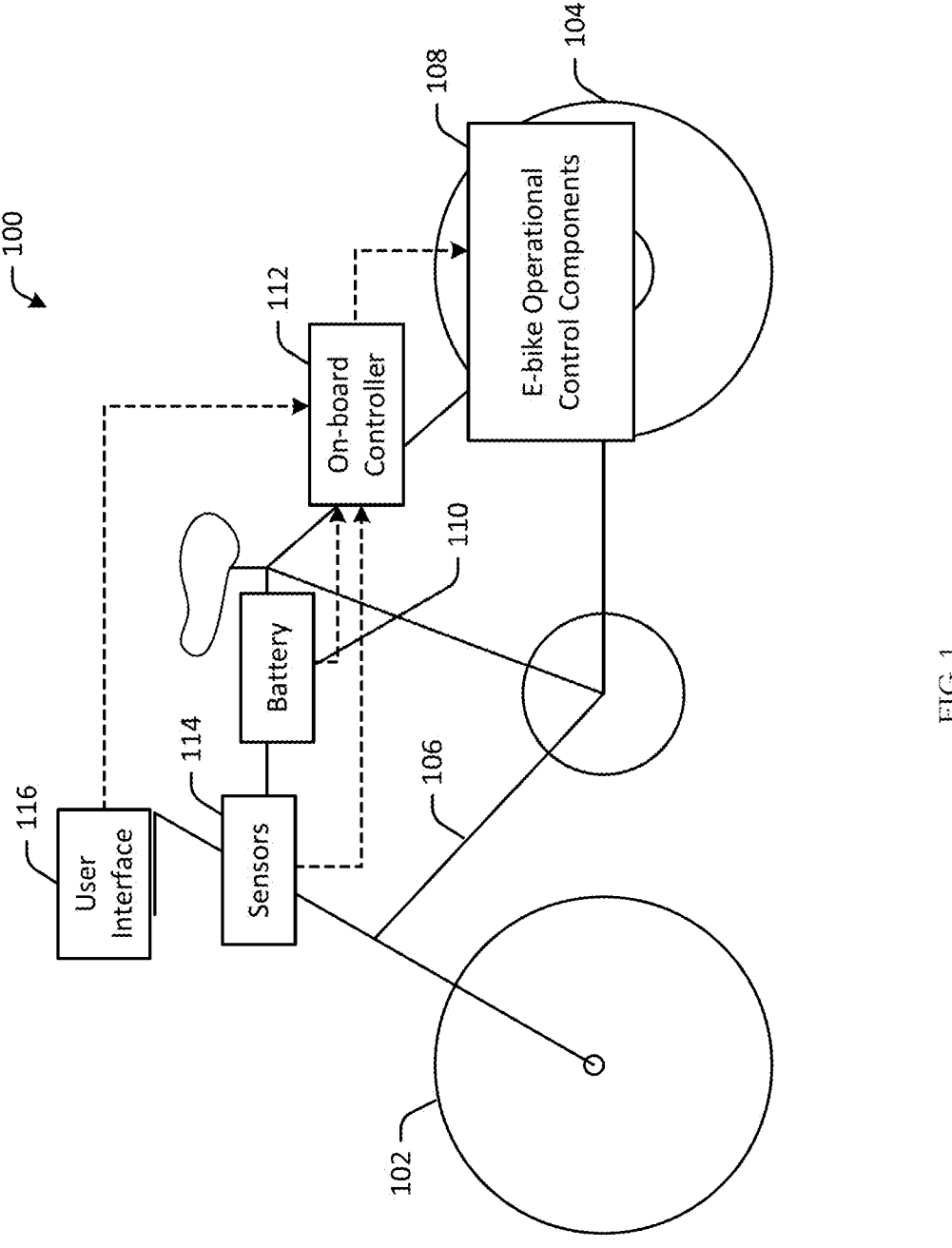
FIG. 1 is a schematic diagram of an e-bike in accordance with example embodiments of the disclosed technology.

A motor-assisted vehicle is a vehicle in which propulsion assist is provided by an integrated motor or engine. An e-bike is a motor-assisted bicycle with an integrated electric motor that provides the propulsion assist. Typically, various operational control components of an e-bike, including the drivetrain (e.g., a CVT) and the electric motor, are controlled by manipulating physical components on the e-bike such as levers, knobs, switches, joysticks, or the like. More specifically, a rider may adjust controlled variable settings of an e-bike such as the transmission ratio and a torque output of the electric motor by providing direct input to the e-bike using the aforementioned physical controls. As a result of changing environmental conditions such as changes in terrain type, terrain incline, elevation, traffic conditions, etc. and/or due to changing operational characteristics of the e-bike (e.g., diminishing battery charge), a rider may end up manipulating these controls repeatedly throughout a ride to adjust the transmission ratio and/or the level of motor assist as needed to achieve a desired ride experience. This can become cumbersome for the rider and may detract from the ride experience.

Disclosed herein are motor-assisted vehicles (e.g., e-bikes) and systems, methods, and computer-readable media that address the above-mentioned technical problem associated with conventional motor-assisted vehicles by automatically and dynamically determining a set of controlled variable settings of the motor-assisted vehicle during a ride in order to support a rider's desired ride objective. According to example embodiments of the disclosed technology, the rider's ride objective may be determined from a set of rider-specified input parameters. An objective-based ride control algorithm may then be executed based on sensor information captured by one or more sensors to dynamically determine controlled variable settings such as transmission ratio, motor torque output, braking force, and/or suspension pressure. Various operational components (e.g., a transmission, electric motor, braking system, and/or suspension system) of the motor-assisted vehicle may then be controlled in real-time during the ride in order to support the rider's ride objective. In this manner, the disclosed technology provides the rider with a desired ride experience, and at the same time, obviates the need for the rider to provide direct inputs to the motor-assisted vehicle to set/adjust controlled variable settings. Moreover, according to some embodiments of the disclosed technology, the objective-based ride control algorithm includes a self-learning function that utilizes rider feedback on a ride to refine the controlled variable adjustments to ensure that future rides better meet the rider's ride objectives, experience, physical skills, interpretation of the ride experience, etc.

It should be understood that determining the controlled variable settings to support the rider's ride objective may include determining controlled variable settings that achieve the ride objective or determining controlled variable settings that attempt to achieve the ride objective (i.e., within a certain tolerance of the desired ride objective). In addition, it should be understood that determining controlled variable settings and controlling operational components of a motor-assisted vehicle based on the controlled variable settings may include determining a setting for a controlled variable (e.g., transmission ratio) and controlling a corresponding operational component (e.g., a transmission) to establish that setting or determining an adjustment to a current setting for a controlled variable (e.g., a change to a current transmission ratio) and controlling the corresponding operational component (e.g., the transmission) to adjust the current setting based on the determined adjustment.

FIG. 1 is a schematic diagram of an e-bike 100 in accordance with example embodiments of the disclosed technology. While embodiments of the disclosed technology may be described herein with reference to an e-bike such as e-bike 100, it should be appreciated that such embodiments are also applicable to other types of motor-assisted vehicles including, without limitation, to motor-assisted tricycles, light electric vehicles (LEVs), or other motor-assisted wheeled vehicles. As shown, the e-bike 100 may include standard bicycle components such as a front wheel 102, a rear wheel 104, a frame 106, and pedals (not shown).

The e-bike 100 may further include various operational control components 108 including a device to provide torque assist to a wheel (e.g., an electric motor), a drivetrain, a braking mechanism, a suspension system, and the like. A power source may be provided to power the electric motor. For example, a rechargeable battery 110 may be integrated with the e-bike and may supply an input current to the electric motor. The electric motor may generate an output torque based on the input current and may work in coordination with the drivetrain to transfer the torque to a wheel (e.g., the rear wheel 104) of the e-bike 100.

As noted, the operational control components 108 may include a drivetrain, which may include a crankset, a chain, and a gearing system. In some embodiments, the drivetrain may include a set of differently sized gears and derailleurs configured to mechanically move a bike chain across the gears. In other embodiments, an internally geared hub/ transmission may be provided that houses the gearing. In some embodiments, a CVT—a particular type of internally geared hub that does not have fixed gear ratios—may be employed.

The e-bike 100 may further include an on-board controller 112 communicatively coupled to the operational control components 108. As will be described in more detail with reference to FIG. 2, the controller 112 may include a memory storing executable instructions of an objective-based ride control algorithm and a processor configured to access the memory and execute the instructions of the ride control algorithm to automatically and dynamically determine controlled variable settings during a ride in order to support a rider's desired ride objective. For example, the controller 112 may be configured to send control signals to the drivetrain and electric motor of the e-bike 100 to set/adjust a transmission ratio and/or a motor assist level (e.g., an output torque of the electric motor), respectively. Moreover, in some embodiments, the controller 112 may be configured to control other operational components 108 of the e-bike as well, such as a braking mechanism and a suspension system. For example, the controller 112 may be configured to send control signals to set/adjust a braking force applied by the braking system or a suspension pressure of the suspension system.

In some embodiments, the controller 112 may be communicatively coupled to a display via which the controller 112 may present a user interface 116 (e.g., a graphical user interface (GUI)) for receiving user input from a rider. In some embodiments, the display may be integrated with the e-bike 100. For example, the display may be mounted to a handlebar of the e-bike 100. In other embodiments, a rider's smartphone, wearable device, or the like may be used to access the user interface 116. For example, a rider may connect his device to the controller 112 using a wireless communication protocol such as Bluetooth, WiFi, or the like, and the controller 112 may be configured to present the user interface 116 on the rider's mobile device after the connection is established. The controller 112 may include a wireless network interface to enable such a wireless connection. In some embodiments, a rider may access the user interface 116 via a mobile application on her mobile device.

User input received via the mobile application user interface 116 may be transmitted to a server (e.g., a cloud-based server), which in turn, may transmit the information to the controller 112. In some embodiments, the controller 112 may be configured to communicate with other vehicles on the road, road infrastructure, or the mobile devices of other vehicle occupants or riders using, for example, V2X communication technology.

The e-bike 100 may further include one or more sensors 114. The sensors 114 may be integrated with the e-bike 100 and may be communicatively coupled to the controller 112. The controller 112 may receive sensor data from the sensors 114 periodically in accordance with a designated sampling rate or continuously as the data is captured in real-time. The sensors 114 may include, without limitation, a Global Positioning System (GPS) receiver configured to obtain GPS location data; an inclination/tilt sensor configured to capture data indicative of a terrain's incline; a speed sensor configured to capture speed/velocity data for the e-bike 100; an inertial sensor (e.g., an accelerometer, gyroscope, magnetometer, etc.) configured to capture acceleration, inclination, and/or vibration data for the e-bike 100; a radar and/or LiDAR configured to capture data indicative of objects/obstacles such as other vehicles, pedestrians, or the like in the environment being traversed by the e-bike 100; biometric sensor(s) configured to capture biometric data of a rider of the e-bike 100 such as heart/pulse rate, pulse oximetry data indicative of an oxygen saturation level for a rider, a VO2 max level (maximal oxygen consumption) for a rider, or the like; biometric sensor(s) such as a fingerprint sensor, iris scanner, or the like configured to capture data that can uniquely identify a rider, and which can be used to access a corresponding rider profile for the rider; and so forth. In some embodiments, the controller 112 may also be configured to receive data (e.g., weather data, construction data, etc.) from external sensors and/or third-party services/servers. The sensor information may be used to determine various states of the e-bike 100 and/or various attributes of the rider.

Figure 2:
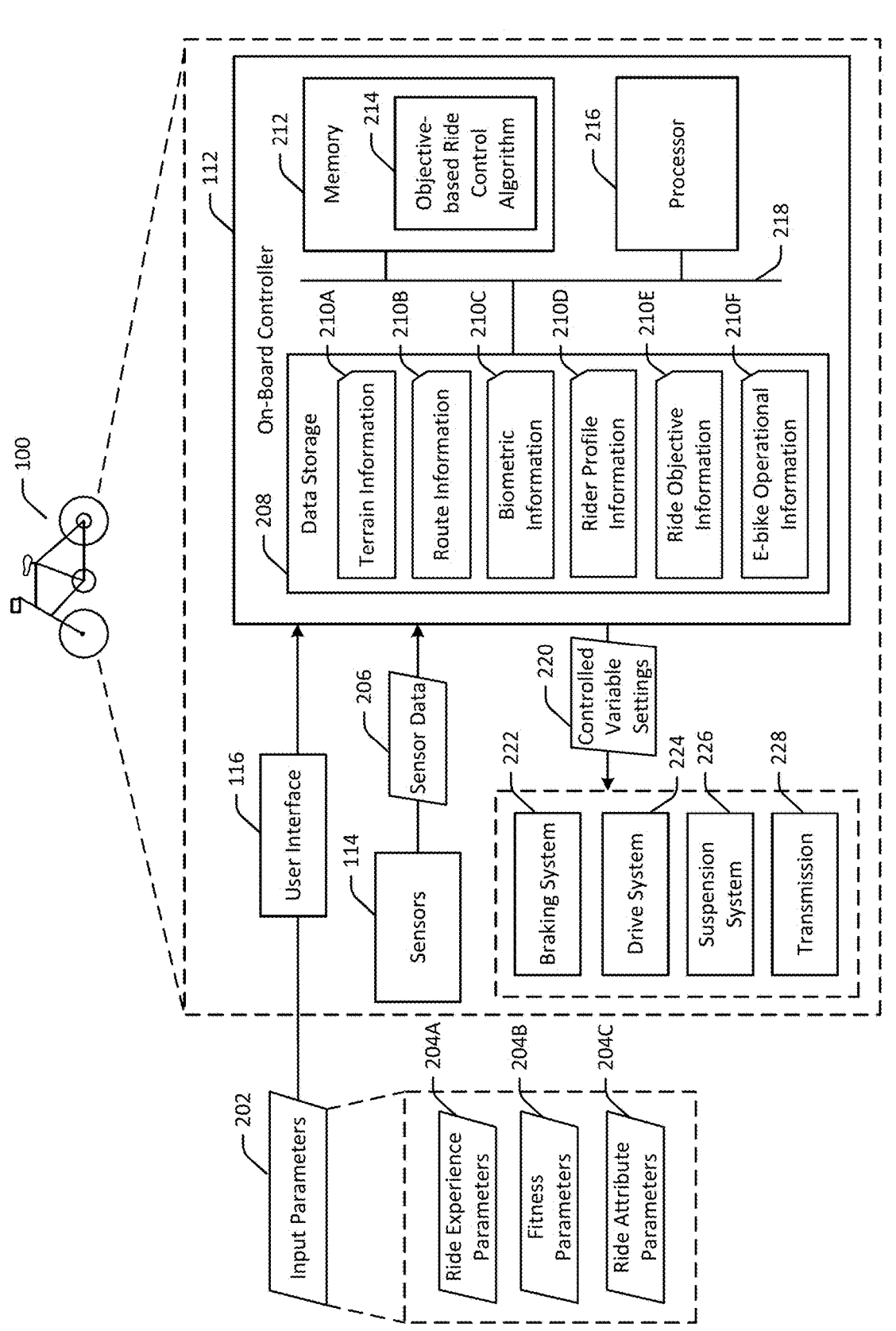
FIG. 2 is a schematic diagram illustrating automatic control of operational control components of an e-bike in order to support a rider's desired ride objective in accordance with example embodiments of the disclosed technology.

FIG. 2 is a schematic diagram illustrating a system for automatic control of the operational control components 108 of the e-bike 100 in order to support a rider's desired ride objective in accordance with example embodiments of the disclosed technology. The on-board controller 112 is shown in more detail in FIG. 2. In example embodiments, the controller 112 includes a memory 212 and a processor 216. An objective-based ride control algorithm 214 is shown in FIG. 2 as being loaded into the memory 212. The ride control algorithm 214 may include computer/machine-executable instructions executable by the processor 216 to cause operations to be performed to automatically and dynamically determine controlled variable settings such as transmission ratio, motor assist level, braking force, and/or suspension pressure during a ride of the e-bike 100 such that a rider's ride objective is supported.

The memory 212 may be volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In various implementations, the memory 212 may include multiple different types of memory such as various types of static RAM (SRAM), various types of dynamic RAM (DRAM), various types of unalterable ROM, and/or writeable variants of ROM such as electrically erasable programmable read-only memory (EEPROM), flash memory, and so forth. The memory 212 may include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.).

The processor 216 may include any suitable processing unit capable of accepting data as input, processing the input data by executing stored computer-executable instructions on the data, and generating output data. The processor 216 may include, without limitation, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor 216 may have any suitable microarchitecture design and may include any of a variety of types of constituent components such as registers, multiplexers, arithmetic logic units, cache controllers for controlling read/write operations to cache memory, branch predictors, or the like. The microarchitecture design of the processor 216 can be made capable of supporting any of a variety of instruction sets.

The controller 112 may further include data storage 208. The data storage 208 may include removable storage and/or non-removable storage including, but not limited to, magnetic storage, optical disk storage, and/or tape storage. The data storage 208 may provide non-volatile storage of computer-executable instructions and other data. The memory 212 and the data storage 208 are examples of non-transitory computer-readable media as that term, or variants of that term, are used herein. The data storage 208 can store computer-executable code, instructions, or the like (e.g., the ride control algorithm 214) that can be loadable into the memory 212 and executable by the processor 216. The data storage 208 can also store data that can be copied to the memory 212 for use by the processor 216 during the execution of stored instructions. The various types of data illustratively depicted as being stored in the data storage 208 will be described in more detail later in this disclosure.

In example embodiments, a rider may provide user input to the controller 112 via the user interface 116. The user input may take the form of one or more input parameters 202. In some embodiments, the user interface 116 may be a collection of user interfaces that together guide the rider to provide input representing the input parameters 202. In particular, as will be described in more detail later in this disclosure with reference to the illustrative user interfaces of FIGS. 7-12, the rider may be presented with a series of prompts, and the rider's responses to the prompts may constitute the input parameters 202. The input parameters 202 may reflect a rider's overall ride objective for a ride.

The input parameters 202 may include, for example, ride experience parameters 204A, fitness parameters 204B, and ride attribute parameters 204C. The ride experience parameters 204A may indicate an overall ride experience/mood that the rider desires for a ride. For instance, the ride experience parameters 204A may indicate an overall level of effort that the rider wishes to expend during a ride. In some embodiments, a ride experience parameter 204A may be selected from multiple discrete experience/mood types corresponding to different levels of manual effort by the rider. As a non-limiting example, the ride experience parameters 204A may include a "relaxed" ride experience parameter, a "normal" ride experience parameter, and a "superhero" ride experience parameter.

In some embodiments, if a ride experience parameter 204A corresponding to a "relaxed" ride experience is selected, the cumulative amount of motor assist provided during the ride (and/or the amount of motor assist provided during specific portions of the ride such as during uphill segments) may be greater and/or the transmission ratio may be shifted more towards full underdrive for a greater portion of the ride (and/or during specific portions of the ride such as uphill segments) as compared to the "normal" ride experience, thereby providing a ride experience that requires less overall manual effort from the rider. In contrast, if a ride experience parameter 204A corresponding to the "superhero" ride experience is specified—indicating that the rider prefers a more challenging ride experience—the cumulative amount of motor assist provided during the ride (and/or during specific portions such as uphill segments) may be reduced and/or the transmission ratio may be shifted more towards full overdrive for a greater portion of the ride (and/or during specific portions such as uphill segments) as compared to the "normal" ride experience. The "normal" ride experience may represent a default ride experience according to which the cumulative motor assist provided during the ride (and/or during specific portions of the ride) and/or the transmission ratio shifting during the ride (and/or during specific portions of the ride) translate to an intermediate amount of manual effort expended by the rider as compared to the "relaxed" and "superhero" ride experiences. It should be appreciated that the above examples of ride experience parameters 204A are merely illustrative and not exhaustive and that any number of ride experience parameters 204A corresponding to any number of different ride experiences/moods may be defined.

The input parameters 202 may further include fitness parameters 204B. The fitness parameters 204B may include, for example, a caloric burn parameter specifying a number of calories that the rider desires to burn during a ride. As the number of calories specified by the caloric burn parameter increases, the cumulative motor assist level provided during the ride (and/or during specific portions thereof) may be reduced and/or the transmission ratio may be shifted more towards full overdrive during the ride (and/or during specific portions thereof) in order to increase the number of calories burned. In some embodiments, various calorie burn options may be provided to a rider based on the rider's specified starting and destination locations and physical attributes of the rider such as sex, weight, height, body type, and the like.

The fitness parameters 204B may further include a heart rate zone parameter specifying, for one or more heart rate zones, a respective target percentage of the duration of a ride that the rider desires for his heart rate to fall within a corresponding heart rate zone. The various target heart rate zones may include zones having an established definition in the fitness context such as the "cardio" zone and the "fat burn" zone as well as a custom-defined zone specified by the rider. Each heart rate zone may correspond to a respective range of heart rates, which may be tailored to a particular rider's sex, height, weight, body type, and the like. That is, the particular range of heart rates that corresponds to the fat burn zone or the cardio zone may, for example, vary from rider to rider based on their individual physical attributes. In some embodiments, the heart rate zone parameter may specify a maximum heart rate that should not be exceeded during the ride and/or a minimum heart rate that the rider wishes to stay above for at least a threshold period of time during the ride.

In some embodiments, the fitness parameters 204B may further include a high intensity interval training (HIIT) input parameter that may specify, for example, an HIIT ride regimen including a duration of high-intensity and low-intensity intervals as well as a desired target heart rate/target heart rate zone and/or caloric burn for each interval and/or cumulatively across the duration of the ride. In other embodiments, the HIIT input parameter may be a type of ride experience input parameter 204A corresponding to a particular ride experience/mood (e.g., a variation of the "superhero" ride experience).

The input parameters 202 may further include ride attribute parameters 204C. The ride attribute parameters 204C may include parameters relating to specific attributes/characteristics of a ride including, without limitation, a target remaining battery charge at the conclusion of a ride; a starting location and a destination location for the ride; a desired navigation route between the starting and destination locations; and so forth. With respect to a desired navigation route, the rider may specify a ride attribute parameter 204C that indicates a particular scenic route that the rider wishes to take (which may be custom-defined by the rider or selected by the rider from a default set of candidate scenic routes); a route with more/less uphill and/or downhill segments; a route with a particular combination/duration of uphill/downhill/flat segments; a route having at least a threshold average grade/incline, at least a threshold average elevation climb, or at least a threshold cumulative elevation climb; a route that includes more/less of a particular type of terrain such as a dirt road surface, concrete road surface, or the like; a route with at least a threshold number of charging stations located along the route; and so forth.

As previously noted, the input parameters 202 may be representative of an overall ride objective for the rider such as having a particular type of ride experience (e.g., a "relaxed" ride), meeting a particular fitness objective (e.g., burning a certain number of calories or maintaining heart rate within a target heart rate zone for a certain duration of the ride), or achieving another type of ride objective (e.g., traversing a particular type of route, having a target amount of battery life remaining at the conclusion of the ride, etc.). Upon receiving the input parameters 202 via the user interface 116, the controller 112 may store the input parameters 202 as ride objective information 210E in the data storage 210E. The ride objective information 210E may be used by the ride control algorithm 214 to determine, at least in part, controlled variable settings (e.g., transmission ratio, motor assist level, braking force, suspension pressure) during the ride that attempt to meet the ride objective represented by the ride objective information 210E.

The data storage 208 may further store other types of information indicative of input variables to the ride control algorithm 214. One or more of the types of information stored in the data storage 208 may be obtained as sensor data 206 from the sensors 114. In particular, the data storage 208 may store terrain information 210A that may indicate a grade/incline of a terrain currently being traversed by the e-bike 100, a type of terrain being traversed (e.g., a type of road surface), or the like. The terrain information 210A may further include grade/incline information for terrains corresponding to candidate routes between a rider's specified starting and destination locations, terrain types for the candidate routes, and so forth. In some embodiments, the terrain information 210A may be captured by a tilt/inclination sensor, an inertial sensor, or the like of the sensors 114. In other embodiments, the terrain information 210A may be determined from GPS data captured by a GPS receiver.

The data storage 208 may also store route information 210B. The route information 210B may include, for example, various candidate routes that can be traversed between a starting location and a destination location specified by a rider. The route information 210B may further specify various attributes of a candidate route such as a scenic rating for the route, a number of landmarks along the route, a number of charging stations along the route, expected traffic levels along the route, and so forth.

The data storage 208 may additionally store biometric information 210C. The biometric information 210C may include heart/pulse rate data for a rider, pulse oximetry data indicative of an oxygen saturation level for the rider, a VO2 max level for the rider, or the like. The sensors 114 may include a heart rate sensor, a pulse oximeter, a VO2 meter, and the like for capturing the above-mentioned biometric information. In some embodiments, a seat of the e-bike 100 may include a weight sensor for capturing a rider's weight. The biometric information 210C may further include fingerprint data captured by a fingerprint sensor, iris data captured by an iris scanner, or the like. Such biometric information can be used to uniquely identify a rider and access a corresponding rider profile for the rider.

The data storage 208 may further store rider profile information 210D for various riders. A rider profile for a particular rider may include, for example, historical input parameters/ride objectives specified by the rider in connection with prior rides; default/preferred input parameters/ride objectives for the rider (e.g., a preferred number of calories to burn or a preferred target heart rate/target heart rate zone for a ride); physical attribute information for the rider (e.g., height, weight, etc.); and so forth. In some embodiments, the rider profile information 210D may be accessed to identify historical/preferred input parameters/ride objectives for a rider and present them to the rider to allow the rider to select a preexisting set of input parameters and thereby expedite the ride objective setup process. In some embodiments, a rider may access a mobile application that is hosted on one or more servers remote from the e-bike 100. The mobile application may communicate with the controller 112 to, for example, relay rider input received via one or more user interfaces 116 of the mobile application to the controller 112. Alternatively, the user interface(s) 116 may be locally stored and hosted on the e-bike 100. In either case, when a rider accesses the user interface(s) 116 for the first time (e.g., as part of accessing a corresponding mobile application on her smartphone or other mobile device for the first time), the rider may be prompted to create to a rider profile. The rider profile may initially include physical attribute information for the rider, biographical information for the rider, initial ride preference information for the rider, and so forth, and may be updated over time to include any of the above-described information as more knowledge is gained about the rider with each subsequent ride.

The data storage 208 may further store e-bike operational information 210F. The e-bike operational information 210F may include various data reflecting operational parameters/characteristics of the e-bike 100. The e-bike operational information 210F may be captured from one or more of the sensors 114 such as a vehicle speed sensor, a pedal cadence sensor, a braking force sensor, a suspension pressure sensor, an electric motor sensor, a transmission sensor, or the like. The e-bike operational information 210F may include, without limitation, pedal cadence, vehicle speed/velocity, transmission position, motor power, motor current, braking force/pressure, suspension pressure, and the like.

In example embodiments, one or more of the types of information stored in the data storage 208, and potentially received as the sensor data 206 from the sensors 114, may be provided as input variables to the ride control algorithm 214. For instance, GPS location data from the route information 210B, grade/incline data from the terrain information 210A, height/weight data from the biometric information 210C, rider-specified input parameters 202 from the ride objective information 210E, and operational parameters/characteristics of the e-bike 100 (e.g., cadence speed, vehicle speed, transmission position, motor power/input current, etc.) from the e-bike operational information 210F may be provided as input to the ride control algorithm 214. The processor 216 may then execute computer-executable instructions of the ride control algorithm 214 to determine various controlled variable settings 220 over the course of a ride in order to support the rider's ride objective as represented by the input parameters 202. The controlled variable settings 220 may include, for example, a transmission ratio of a transmission 228 of the e-bike 100, an output torque of a drive system 224 (e.g., an electric motor) of the e-bike 100, a braking force applied by a braking system 212 of the e-bike 100, a braking modulation of the braking system 222, and/or a suspension pressure of a suspension system 226 of the e-bike 100.

Consider, for instance, an example scenario in which a rider specifies a ride experience parameter 204A corresponding to a "relaxed" ride experience/mood. In this example scenario, the algorithm 214 may output the following control scheme for determining the controlled variable settings 220 that support the ride objective associated with the "relaxed" ride experience/mood. In particular, the algorithm 214 may prioritize maintaining a set pedal cadence corresponding to a desired level of manual effort that the rider wishes to expend. In some embodiments, the algorithm 214 may seek to maintain the set pedal cadence despite changes in terrain/incline/elevation. In some embodiments, the control scheme adopted by the algorithm 214 may seek to maintain the set pedal cadence by adjusting the transmission ratio as a first priority, and secondarily, by adjusting an amount of motor assist that is provided. The algorithm 214 may adopt this control scheme in order to conserve battery charge. The algorithm 214 may then shift to a battery conservation mode if, for example, the battery charge falls below a threshold amount of charge (e.g., 15%), in which case, the algorithm 214 may reduce the amount of motor assist as a first priority and permit the pedal cadence to vary by a threshold amount (e.g., 10%) from the target pedal cadence.

As another non-limiting example, consider a scenario in which a rider specifies a ride experience parameter 204A corresponding to a HIIT variation of the "superhero" ride experience/mood. In this example scenario, the algorithm 214 may output the following control scheme for determining the controlled variable settings 220 that support the ride objective associated with the HIIT variation of the "superhero" ride experience/mood. In particular, the algorithm 214 may prioritize maintaining and alternating between intervals of peak heart rate and intervals of reduced heart rate. The algorithm 214 may receive the heart rate data continuously (or periodically at a defined sampling interval) as a portion of the biometric information 210C. In some embodiments, the algorithm 214 may seek to maintain and alternate between the peak heart rate and reduced heart rate intervals despite changes in terrain/incline/elevation. In some embodiments, the algorithm 214 may seek to match the peak heart rate intervals with hill climb segments of the route being traversed and the reduced heart rate intervals with flatter or downhill segments.

In some embodiments, the control scheme adopted by the algorithm 214 may seek to reduce the level of motor assist as a first priority in combination with increasing the pedal cadence as a second priority until the peak heart rate is achieved. The algorithm 214 may continue to adjust motor assist level and/or transmission ratio to maintain the peak heart rate for the duration of the high-intensity interval. Thereafter, the algorithm 214 may increase the level of motor assist as a first priority and reduce the pedal cadence as a second priority until recovery of the heart rate to, for example, 65% of the peak heart rate is achieved. The algorithm 214 may continue to adjust motor assist level and/or transmission ratio to maintain the recovered heart rate for the duration of the low-intensity interval. The algorithm 214 may alternate between these control schemes for the high-intensity and low-intensity intervals. As with the "relaxed" ride experience, in the HIIT variation of the "superhero" ride experience, the algorithm 214 may similarly shift to a battery conservation mode if, for example, the battery charge falls below a threshold amount of charge (e.g., 15%).

As yet another non-limiting example, consider a scenario in which a rider specifies a ride experience parameter 204A corresponding to an endurance variation of the "superhero" ride experience/mood. In this example scenario, the algorithm 214 may output the following control scheme for determining the controlled variable settings 220 that support the ride objective associated with the endurance variation of the "superhero" ride experience/mood. In particular, the algorithm 214 may prioritize maintaining a high but sustainable heart rate. The algorithm 214 may receive the heart rate data continuously (or periodically at a defined sampling interval) as a portion of the biometric information 210C. In some embodiments, the algorithm 214 may seek to maintain the high and sustainable heart rate despite changes in terrain/incline/elevation.

In some embodiments, the control scheme adopted by the algorithm 214 may seek to reduce the level of motor assist as a first priority in combination with increasing the pedal cadence as a second priority until the high and sustainable heart rate is achieved (e.g., 75% of the peak heart rate). The algorithm 214 may continue to adjust motor assist level and/or transmission ratio to maintain the endurance heart rate. As with the other example ride experience scenarios detailed above, in the endurance variation of the "superhero" ride experience, the algorithm 214 may similarly shift to a battery conservation mode if, for example, the battery charge falls below a threshold amount of charge (e.g., 15%).

It should be appreciated that the ride experience scenarios detailed above are merely illustrative and not exhaustive. Other ride objectives based on fitness input parameters 204B (e.g., a desired number of calories to burn during a ride), ride attribute input parameters 204C (e.g., battery conservation with starting and ending GPS locations defined), and so forth are also within the scope of the disclosed technology. It should further be appreciated that, in some embodiments, there may be overlap between control schemes adopted by the algorithm 214 for different types of input parameters 202. For instance, the control schemes described above for the HIIT or endurance variations of the "superhero" ride experience may overlap with the control scheme adopted to achieve a ride objective associated with a fitness input parameter 204B.

In addition, in various embodiments, controlled variables 220 other than motor assist level (i.e., output torque of the electric motor) and transmission ratio may be set/adjusted as part of a control scheme adopted by the algorithm 214. Additional controlled variables 220 that may be automatically set/adjusted include, without limitation, braking force, braking modulation, and suspension pressure. Including electronically controlled braking along a continuum as a controlled variable 220 capable of being set/adjusted may yield a number of additional advantages including regenerative braking and the ability to recharge the battery, particularly during downhill riding, as well as, controlled braking to maintain a set pedal cadence without reaching excessive vehicle speed, again particularly during downhill riding.

In some embodiments, the algorithm 214 may be a self-learning algorithm that receives feedback data from the rider and refines the control schemes adopted to support the ride objectives represented by various input parameters 202. For instance, the rider may be asked a set of questions via the user interface 116 at the conclusion of a ride. The questions may, for example, ask the rider whether the level of manual effort the rider had to exert matched her desired level of effort, and if not, how the actual effort required did not align with the desired amount of effort and/or which segments of the ride required more or less than the desired amount of manual effort; whether there were more specific aspect of the ride that the rider would have changed (e.g., provide more/less motor assist during particular uphill segments); and so forth.

Additionally, or alternatively, the rider may be prompted during the ride to provide the feedback. That is, during the ride itself, the rider may be asked if the level of manual effort she is having to expend is more or less than what she was expecting or wanting; whether she would like to change any particular current aspect of the ride (e.g., a current transmission ratio, a current level of motor level, etc.); and so forth. In some embodiments, rider feedback may be sought at periodic intervals during the ride and/or in response to specific ride conditions that may be more likely to cause a deviation from the rider's desired ride objective (e.g., during an uphill segment). By receiving rider feedback in real-time during a ride, the control algorithm 214 may be able to adjust its control scheme on-the-fly to better align with the rider's ride objective. Although the dynamic and automatic control of controlled variable settings in accordance with embodiments of the disclosed technology obviates the need for direct rider input to the e-bike 100, in some circumstances, the rider may nonetheless wish to provide direct input to set/adjust a transmission ratio, motor assist level, or the like if, for example, she feels that the current settings are not aligned with her ride objective. As such, in some embodiments, the rider feedback during the ride may take the form of direct rider input to set/adjust one or more controlled variables.

The rider's feedback responses may be stored as feedback data, potentially as part of the rider profile information 210D associated with the rider, and fed into the ride control algorithm 214 to refine the algorithm's control schemes for future rides for the rider in order to provide future ride experiences that more closely match the rider's ride objectives. In some embodiments, the feedback data may be specific to a particular rider and used to refine the control schemes adopted for that particular rider's future rides. In other embodiments, the feedback data may be accumulated across multiple riders and used to refine control schemes generally associated with particular input parameters 202 and corresponding ride objectives.

In some embodiments, a rider's ride objective for a given ride may be a function of multiple different types of input parameters 202 that operate cooperatively. That is, in some embodiments, multiple different input parameter types (e.g., a ride experience parameter 204A and a ride attribute parameter 204C; a ride experience parameter 204A and a fitness parameter 204B; etc.) may cooperatively support the overall ride objective. For instance, assume that a rider specifies a ride experience input parameter 204A corresponding to a "relaxed" ride experience as well as a fitness-based parameter 204B indicating a minimum caloric burn that the rider desires for the ride. To meet the rider's overall ride objective, the control algorithm 214 may provide less motor assist and/or more underdrive during downhill/flat segments of a route than it otherwise would have if no minimum caloric burn was specified, in order to increase the rider's caloric burn to meet the desired caloric burn, but at the same time, maintain the "relaxed" ride experience for the rider. As another non-limiting example, the control algorithm 214 may not alter the control scheme for setting/adjusting controlled variables that it would use if only the "relaxed" ride experience was specified and not the minimum caloric burn, but rather may extend the duration of the ride to accommodate both the desired "relaxed" ride experience as well as the desired caloric burn.

In some embodiments, a conflict may exist between multiple input parameters of different types. For instance, assume again that a rider specifies a ride experience input parameter 204A corresponding to a "relaxed" ride experience and a fitness-based parameter 204B indicating a minimum caloric burn that the rider desires for the ride. Further assume that the rider has specified a ride attribute input parameter 204C indicating a target battery charge to remain at the conclusion of the ride. In some scenarios, assuming particular starting and destination locations, the control algorithm 214 may not be able to determine a control scheme that can meet a ride objective corresponding to all of the specified input parameters. More specifically, the control algorithm 214 may determine that a route between the starting and destination locations and a corresponding control scheme do not exist that can achieve the desired "relaxed" ride experience, while also burning the desired number of calories and ensuring that the specified target battery charge remains at the end of the ride.

In such an example scenario, the control algorithm 214 may prompt the rider to modify one or more of the specified input parameters so that the overall ride objective can be met. For example, the control algorithm 214 may prompt the rider to accept a slightly more challenging/less relaxed ride experience that, for instance, involves providing less motor assist cumulatively over the ride and/or during specific segments (e.g., uphill segments with grades/inclines above a threshold level) so that the target battery charge ride attribute input parameter 204C can be satisfied. As another non-limiting example, the control algorithm 214 may prompt the rider so lower the caloric burn requirement, accept a slightly lower amount of remaining battery charge at the end of the ride, and/or change at least one of the starting and destination locations.

It should be appreciated that the above examples of how different types of input parameters can cooperate or conflict with one another in connection with developing a control scheme to support a rider's overall ride objective are illustrative and not exhaustive. Further, while the description of the user interfaces of FIGS. 7-12 assumes that different input parameter types are specified for different rides, it should be appreciated that multiple different input parameter types may be specified for a given ride and an overall ride objective may be defined based on the multiple different input parameter types (as described above), and that additional user interfaces may be presented to rider to enable and support such functionality.

Figure 3:
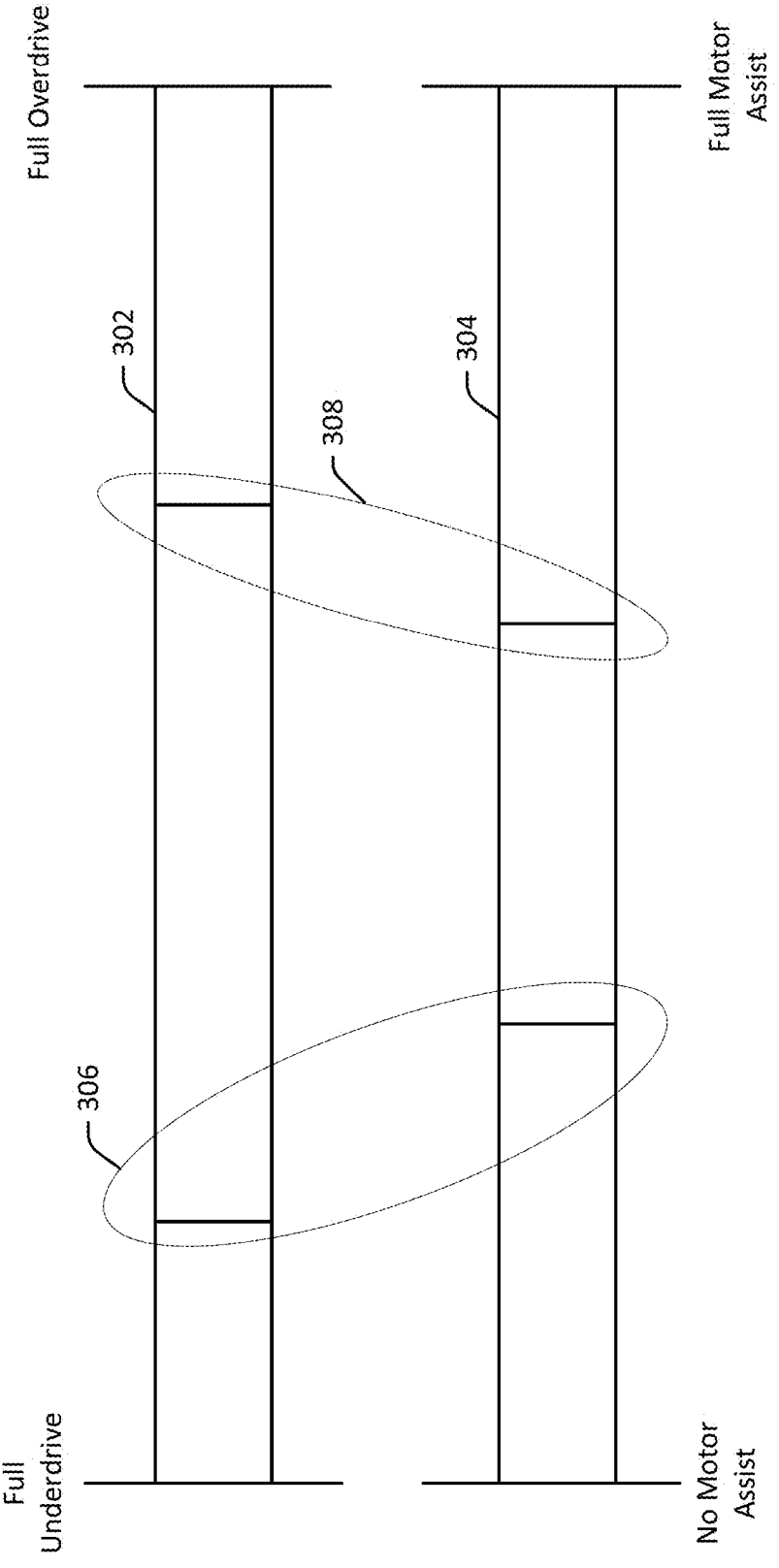
FIG. 3 is a schematic diagram illustrating the determination—without requiring direct rider input—of various combinations of controlled variable settings of an e-bike along a continuum of candidate settings in order to support a rider's desired ride objective in accordance with example embodiments of the disclosed technology.

FIG. 3 is a schematic diagram illustrating the selection—without requiring direct rider input—of various combinations of controlled variable settings of an e-bike along a continuum of candidate settings in order to support a rider's desired ride objective in accordance with example embodiments of the disclosed technology. Two example types of controlled variables are depicted in FIG. 3—transmission ratio and motor assist. Transmission ratio may refer to a gear ratio of a CVT or other type of transmission of a motor-assisted vehicle (e.g., transmission 228 of e-bike 100). Motor assist may refer to an amount of output torque provided by a drive system (e.g., electric motor) of a motor-assisted vehicle (e.g., drive system 224 of e-bike 100).

As shown in FIG. 3, the transmission ratio may be selectable/adjustable across a continuum 302 of settings from full underdrive on one end of the spectrum to full overdrive on the other end of the spectrum. Similarly, motor assist may be selectable/adjustable across a continuum 304 of settings from no motor assist on one end of the spectrum to full motor assist on the other end of the spectrum. In this manner, any combination of transmission ratio and motor assist may be selected at any given point in time during a ride based on the terrain, the battery charge, etc. in order to meet a ride objective corresponding to a rider-specified set of input parameters. Example combinations 306, 308 of transmission ratio and motor assist are depicted in FIG. 3. The combination 306 has a lower transmission ratio and a lower motor assist than the combination 308. The algorithm 214 may transition from the combination 308 to the combination 306 if, for example, entering a battery conservation mode during a ride. It should be appreciated other controlled variables such as braking force and suspension pressure may also be selectable/adjustable independently and/or in combination with the controlled variables depicted in FIG. 3 as part of automatic ride control to support a rider's desired ride objective. It should further be appreciated that description herein of shifting the transmission ratio towards full underdrive or towards full overdrive may refer to transitioning the transmission ratio from a current value to a value that is closer to full underdrive or full overdrive, whichever the case may be, and may not necessarily involve (although it could) shifting all the way to an endpoint of the continuum 302. Similarly, it should further be appreciated that description herein of adjusting the motor assist level towards full motor assist or towards no motor assist may refer to transitioning the motor assist level (i.e., the motor output torque) from a current setting to a new setting that is closer to full motor assist or no motor assist, whichever the case may be, and may not necessarily (although it could) encompass transitioning the motor assist level all the way to an endpoint of the continuum 304.

Figure 4:
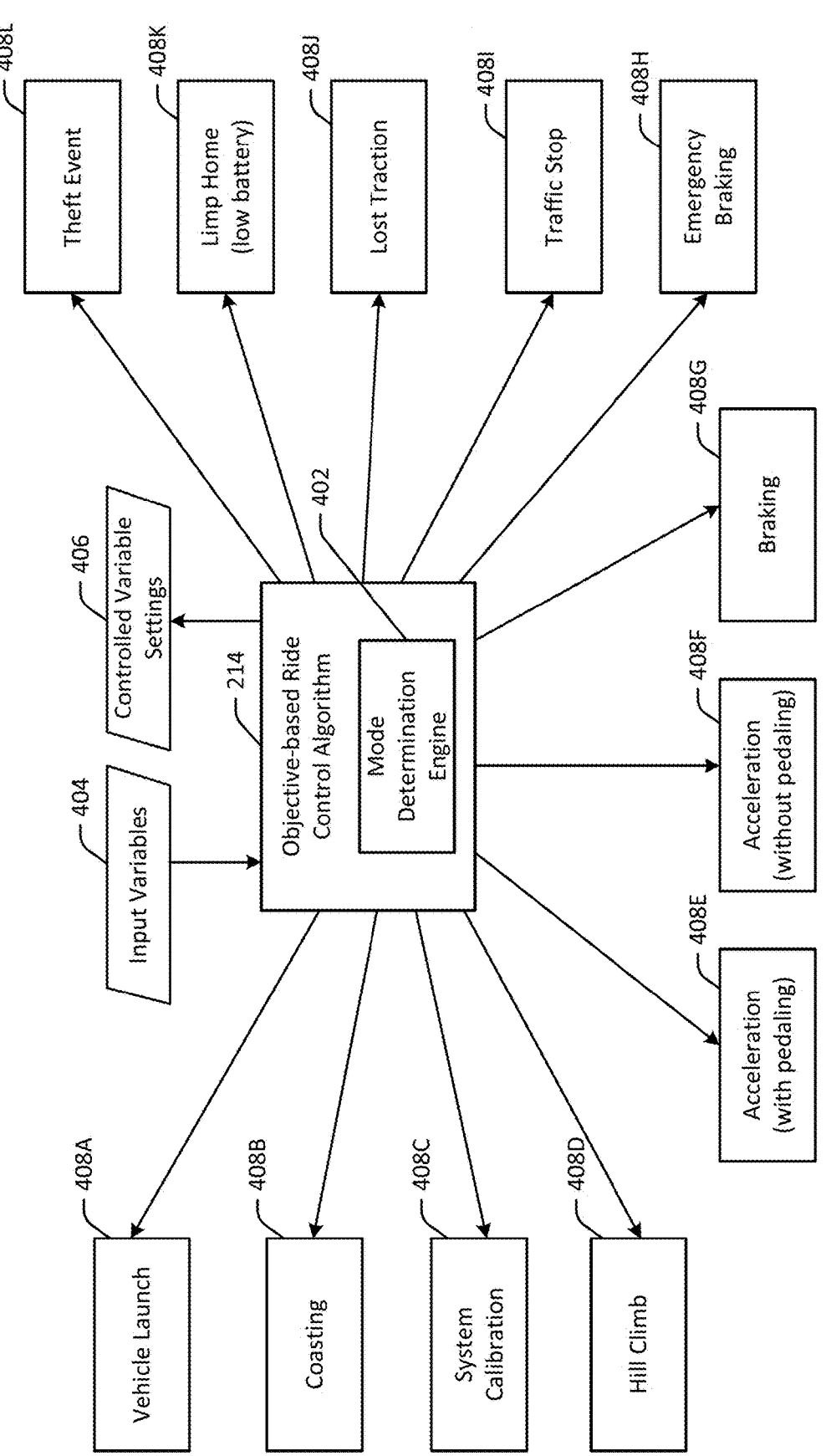
FIG. 4 is a schematic diagram of a state machine illustrating the determination of controlled variable settings for an e-bike based on sensor information, a determined operational mode of the e-bike, and a desired ride objective of a rider of the e-bike in accordance with example embodiments of the disclosed technology.

FIG. 4 is a schematic diagram illustrating a state machine to assist with the determination of controlled variable settings during an e-bike ride based on a set of input variables (as reflected in sensor information captured from one or more sensors), a determined operational mode of the e-bike, and a desired ride objective of a rider of the e-bike in accordance with example embodiments of the disclosed technology. The objective-based ride control algorithm 214 may include a mode determination engine 402. The engine 402 may include computer-executable instructions that are executable by the processor 216 to determine an operational mode of the e-bike (e.g., e-bike 100). A variety of example operational modes are shown in FIG. 4 including a vehicle launch mode 408A; a coasting mode 408B; a system calibration mode 408C; a hill climb mode 408D; an acceleration (with pedaling) mode 408E; an acceleration (without pedaling) mode 408F (such as in a downhill scenario); a braking mode 408G; an emergency braking model 408H; a traffic stop model 408I; a lost traction mode 408J; a limp home (low battery) mode 408K; and a theft event mode 408L. It should be appreciated that these modes are merely illustrative and not exhaustive.

In example embodiments, the mode determination engine 402 may monitor a set of input variables 404 (e.g., monitored captured sensor data 206) and determine a current operational mode of the e-bike 100 (or an impending transition to a new operational mode) based on the monitored set of input variables 404. The input variables 404 may include any of the example types of input variables described earlier. Based on the determined operational mode of the e-bike 100 and the set of input variables 404, the algorithm 214 may determine controlled variable settings 406 for supporting a desired ride objective corresponding to rider-specified input parameters. The set of controlled variable settings 406 may include any of the types of controlled variable settings described earlier with reference to controlled variable settings 220.

As a non-limiting example, the mode determination engine 402 may determine that the e-bike 100 has entered or is soon to enter the hill climb mode 408D based on various detected changes to the monitored set of input variables 404 (e.g., based on particular sensor information contained in the sensor data 206). For instance, the mode determination engine 402 may determine that the e-bike 100 has entered or is about to enter the hill climb mode 408D based on detecting one or more of the following: a decreasing rate of vehicle speed; a combination of a particular GPS location and a particular direction of travel indicative of an increase in terrain grade/incline; a reduction in suspension travel at a rear of the e-bike 100 and/or an increase in suspension travel at a front of the e-bike 100 (due to a weight of the rider shifting towards the rear of the e-bike 100 as the hill climb is entered). Upon detecting the hill climb mode 408D, the algorithm 214 may establish one or more of the following controlled variable settings 406: shifting the transmission ratio towards full underdrive in anticipation of the increase in terrain incline; increasing the motor assist (i.e., increasing output torque of the motor) to maintain vehicle speed or slow the rate of vehicle speed reduction; increasing the suspension pressure at a rear of the e-bike 100 and/or decreasing a suspension pressure at a front of the e-bike 100. These controlled variable settings 406 seek to, for example, ensure that the manual effort being expended by the rider remains relatively constant during and after the transition to the hill climb mode 408D.

As another non-limiting example, the mode determination engine 402 may determine that the e-bike 100 has entered the emergency braking mode 408H based on various detected changes to the monitored set of input variables 404 (e.g., based on particular sensor information contained in the sensor data 206). For instance, the mode determination engine 402 may determine that the e-bike 100 has entered the emergency braking model 408H based on detecting one or more of the following: a rapid (e.g., within less than a threshold period of time) and significant (e.g., by more than a threshold amount) increase in braking force/pressure; a rapid (e.g., within less than a threshold period of time) and significant (e.g., by more than a threshold amount and potentially down to zero) decrease in vehicle speed; an increase in suspension travel at a rear of the e-bike 100 and/or a decrease in suspension travel at a front of the e-bike 100 (due to a weight of the rider shifting towards the front of the e-bike 100 during the emergency braking operation). Upon detecting the emergency braking mode 408H, the algorithm 214 may establish one or more of the following controlled variable settings 406: stopping power to the transmission; stopping power to the electric motor; decreasing the suspension pressure at a rear of the e-bike 100 and/or increasing a suspension pressure at a front of the e-bike 100; initiating an automatic braking event and/or rapid brake modulation. These controlled variable settings 406 seek to, for example, assist with the emergency braking operation.

As yet another non-limiting example, consider the coasting mode 408B. The mode determination engine 402 may determine that the e-bike 100 has entered the coasting mode 408B based on detecting one or more of the following: a vehicle acceleration going to zero while a vehicle speed is non-zero; a rapid (e.g., within less than a threshold period of time) decrease in pedal cadence; a decrease in terrain grade/incline. Upon detecting the coasting mode 408B, the algorithm 214 may establish one or more of the following controlled variable settings 406: stopping or reducing the motor assist; initiating an automatic braking event, potentially to provide a regenerative braking function that charges the battery.

Figure 5:
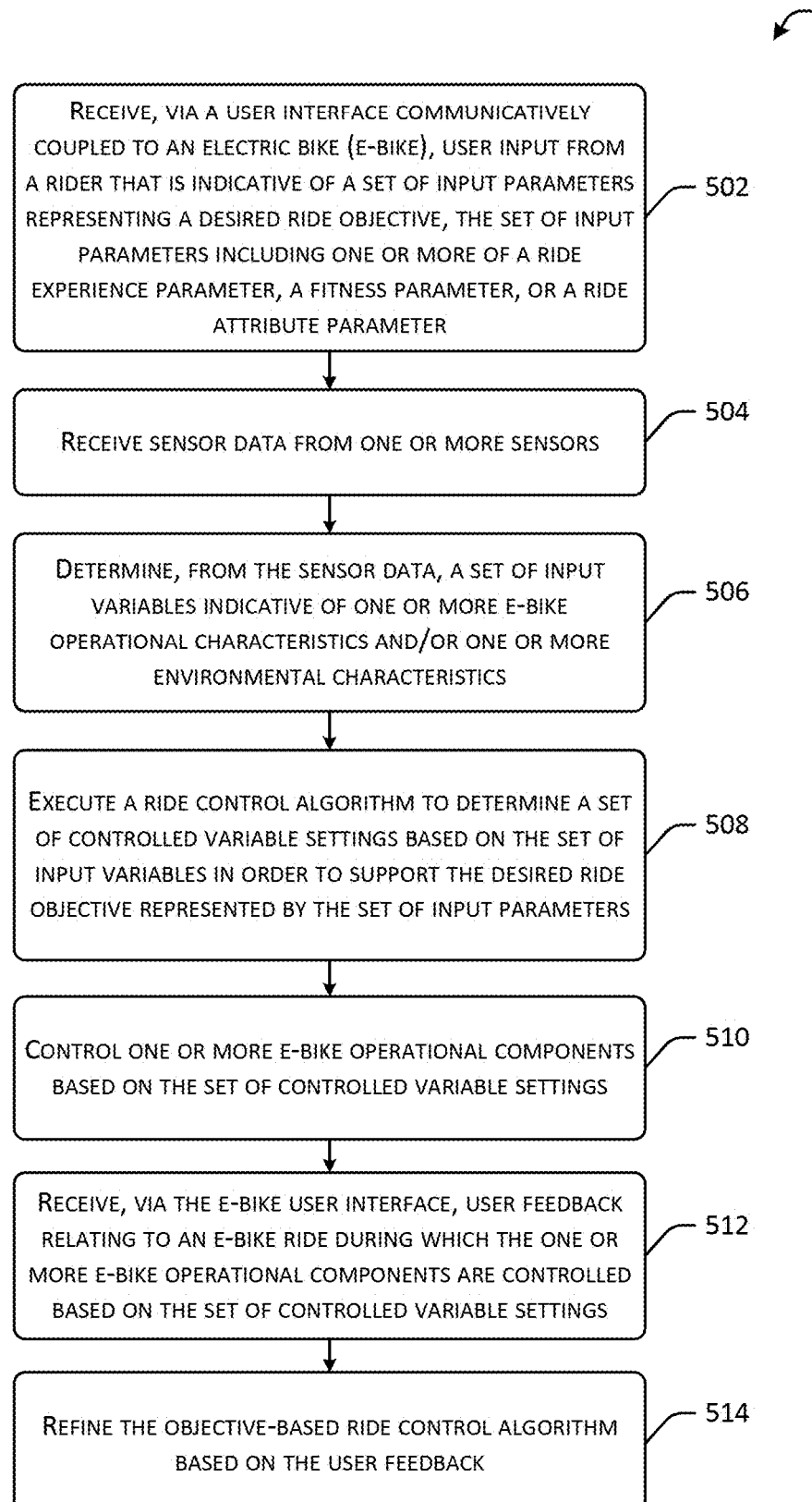
FIG. 5 is a flowchart of an illustrative method for executing an objective-based ride control algorithm to automatically and dynamically determine a set of controlled variable settings during a ride based on sensor information and a set of input parameters that reflects a rider's desired objective for the ride in accordance with example embodiments of the disclosed technology.

FIG. 5 is a flowchart of an illustrative method 500 for executing an objective-based ride control algorithm to determine, based on sensor information representing a set of input variables, a set of controlled variable settings that support a rider's desired ride objective, where the rider's ride objective is represented by a set of input parameters. FIG. 5 will be illustratively described hereinafter with reference to the example e-bike 100 and the implementation of FIG. 2. It should be appreciated, however, that the method 500 is not restricted to e-bikes and is also applicable to other types of motor-assisted vehicles.

At block 502 of the method 500, the controller 112 may receive, via the user interface 116, user input from a rider that is indicative of a set of input parameters 202 that represents a rider's desired ride objective. The input parameters 202 may include one or more of a ride experience parameter 204A (e.g., an overall "mood" that the rider desires for the ride and that correlates to a level of manual effort that the rider wishes to expend during the ride); a fitness parameter 204B (e.g., a target number of calories the rider wishes to burn during the ride; target amounts of time (percentages of the ride duration) that the rider desires for her heart rate to be maintained in various heart zones during the ride, etc.); or a ride attribute parameter (e.g., a remaining battery charge level that the rider wants to have at the conclusion of the ride, a particular route that the rider wishes to traverse during the ride such as a particular scenic route, a route with at least one charging station, etc.).

At block 504 of the method 500, the controller 112 may receive sensor data 206 from one or more sensors 114. The sensor data 206 may include, without limitation, GPS location data; terrain grade/incline data; terrain elevation/altitude data; vehicle speed/velocity data; vehicle acceleration data; vehicle orientation data; vehicle vibration data; vehicle temperature data; other vehicle operational data from a drivetrain sensor, a motor sensor, a braking system sensor, a suspension system sensor, a pedal sensor, or the like); radar data; LiDAR data; biometric data of a rider of the vehicle; and so forth. In some embodiments, the controller 112 may also be configured to receive data (e.g., weather data, construction data, etc.) from external sensors and/or third-party services/servers.

At block 506 of the method 500, the controller 112 may determine, from the received sensor data 206, a set of input variables indicative of one or more operational characteristics of the e-bile 100 and/or one or more characteristics of an environment being traversed by the e-bike. The e-bike operational characteristics may include, for example, pedal cadence, vehicle speed/velocity, transmission position, motor power, motor current, braking force/pressure, suspension pressure, and the like. The environmental characteristics, for example, GPS location data for the e-bike 100, terrain incline, terrain type, terrain elevation/altitude, etc.

At block 508 of the method 500, the controller 112, or more specifically, the processor 216 may execute computer-executable instructions of the objective-based ride control algorithm 214 to determine a set of controlled variable settings based on the determined set of input variables in order to support the desired ride objective of the rider, as represented by the set of input parameters 202. As previously described, the controlled variable settings may include one or more of the following: a setting/adjustment of a transmission ratio towards the full overdrive end of the transmission ratio continuum or towards the full underdrive end of the continuum; a setting/adjustment of the motor assist level towards the full motor assist end of the motor assist continuum or towards the no motor assist end of the continuum; a setting/adjustment to the braking force/braking modulation; and a setting/adjustment to the suspension pressure; and so forth. In some embodiments, the processor 216 may execute the control algorithm 214 to generate and implement a control scheme that dynamically and automatically determines one or more controlled variable settings 220 in order to attempt to meet a ride objective of the rider as defined by the set of input parameters 202 for the ride.

At block 510 of the method 500, the controller 112 may control one or more operational components 108 of the e-bike 100 based on the determined controlled variable settings 220. The e-bike operational components that are controlled may include, for example, the drive system 224 to set/adjust an electric motor output torque, the transmission 228 to set/adjust a transmission ratio, the suspension system 226 to set/adjust a suspension pressure, and/or the braking system 222 to set/adjust a braking force/braking modulation. The controller 112 may control the operational components 108 to establish the controlled variable settings in real-time during the ride.

At block 512 of the method 500, the controller 112 may receive user feedback via the user interface 116 at the conclusion of (or during) an e-bike ride during which the e-bike operational components 108 are controlled based on controlled variable settings 220 tailored to meet a rider's ride objective. Then, at block 514 of the method 500, the processor 216 may refine the control algorithm 214 based on the user feedback such that the control algorithm 214 generates control schemes for future rides that are even better tailored to meet the rider's ride objectives.

In particular, in some embodiments, the algorithm 214 may be a self-learning algorithm that receives feedback data from the rider and refines the control schemes adopted to support the ride objectives represented by various input parameters 202. For instance, the rider may be asked a set of questions via the user interface 116 at the conclusion of a ride and/or during the ride. The questions may, for example, relate to whether the level of manual effort the rider had to exert during the ride matched her desired level of effort, whether there was anything more specific the rider would have changed about the ride (e.g., provide more/less motor assist during uphill segments), and so forth. The rider's responses may be stored as feedback data and fed into the ride control algorithm 214 to refine the algorithm's control schemes for future rides for the rider in order to provide ride experiences in the future that more closely match the rider's ride objectives. In some embodiments, the feedback data may be specific to a particular rider and used to refine the control schemes adopted for that particular rider's future rides. In other embodiments, the feedback data may be accumulated across multiple riders and used to refine control schemes generally associated with particular input parameters 202 and corresponding ride objectives.

FIG. 6 is a flowchart of an illustrative method 600 for determining controlled variable settings for an e-bike based on sensor information indicative of a set of input variables, a determined operational mode of the e-bike, and a desired ride objective of a rider of the e-bike in accordance with example embodiments of the disclosed technology. FIG. 6 will be illustratively described hereinafter with reference to the example e-bike 100 and the implementations of FIGS. 2 and 3. It should be appreciated, however, that the method 600 is not restricted to e-bikes and is also applicable to other types of motor-assisted vehicles.

At block 602 of the method 600, the processor 216 may execute computer-executable instructions of the ride control algorithm 214 to monitor a set of input variables 404. The set of input variables 404 may include any of the example types of input variables previously described. In some embodiments, monitoring a set of input variables may include monitored sensor information representing the set of input variables. At block 604 of the method 600, the processor 216 may execute the control algorithm 214 to determine an operational mode of the e-bike 100 based on the monitored set of input variables 214. In particular, in some embodiments, the processor 216 may execute computer-executable instructions of the mode determination engine 402 to determine the operational mode. The operational mode may be any of the example types of modes depicted in FIG. 4.

At block 606 of the method 600, the processor 216 may execute the control algorithm 214 to determine a set of controlled variable settings 406 based on the operational mode determined at block 604 and the a user-selected ride objective, as represented by the set of input parameters 202 specified by the rider prior to initiation of the e-bike ride. Finally, at block 608 of the method 600, the controller 112 may control one or more e-bike operational components 108 based on the set of controlled variable settings in order to meet the rider's ride objective. It should be appreciated that the controlled variable settings may dynamically change as the operational mode of the e-bike 100 changes in order to ensure that the rider's ride objective continues to be supported/met.

Figure 7:
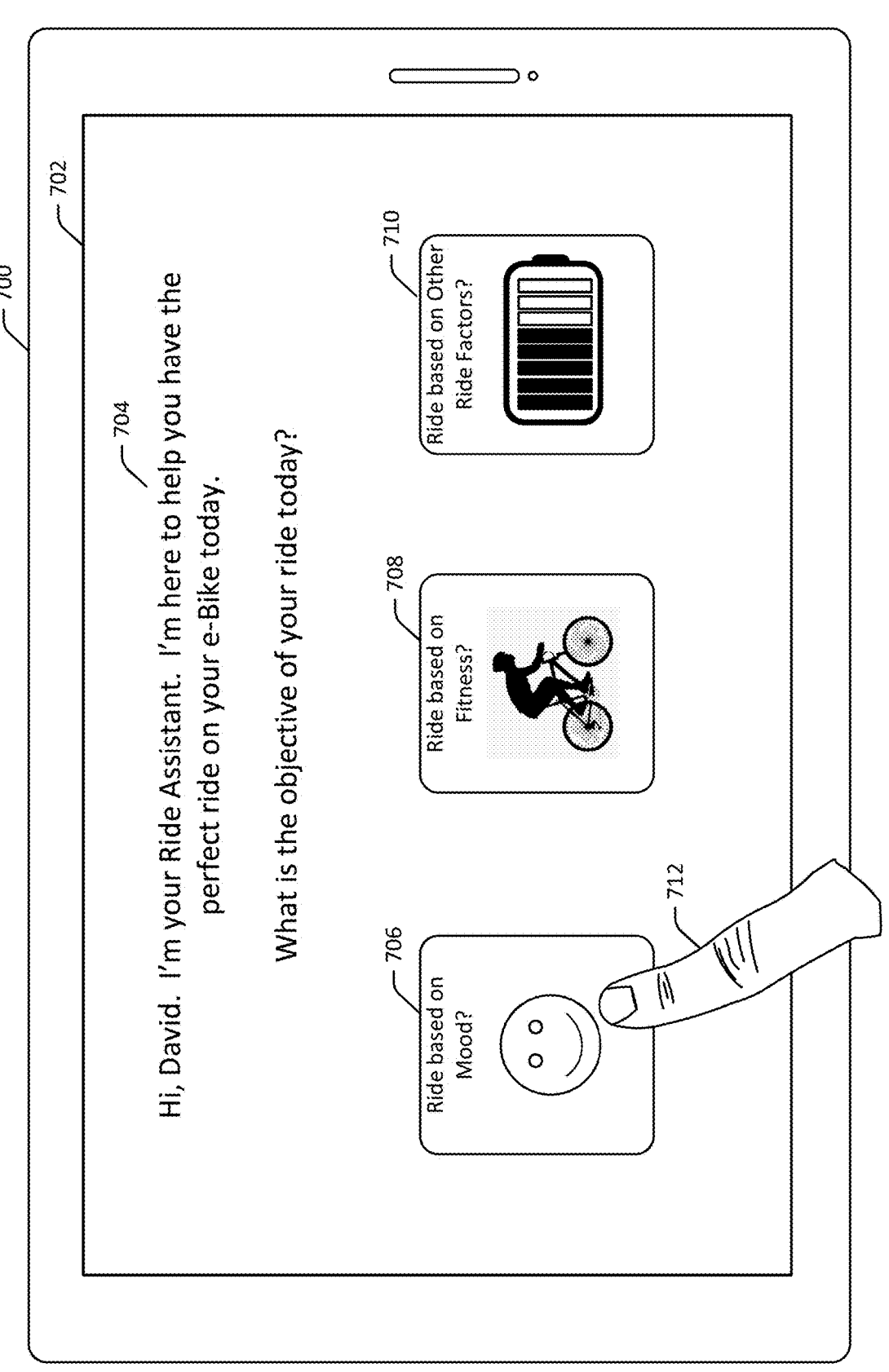
FIG. 7 depicts an illustrative user interface 702 for specifying a ride objective for an e-bike ride based on a ride experience input parameter in accordance with example embodiments of the disclosed technology.

FIG. 7 depicts an illustrative user interface 702 for specifying a ride objective for a motor-assisted vehicle ride based on a ride experience input parameter in accordance with example embodiments of the disclosed technology. The user interface 702 may be presented on a display of a display device 700, which may be a mobile device of a rider of the motor-assisted vehicle (e.g., the e-bike 100) or a device integrated with the motor-assisted vehicle. In either case, the display device 700 may be communicatively coupled to the controller 112. The user interface 702 and the user interfaces of FIGS. 8-12 will be described with reference to an e-bike as an example motor-assisted vehicle. However, it should be appreciated that the discussion is also applicable to any suitable type of motor-assisted vehicle.

The user interface 704 may include text 704 that prompts the rider to specify a ride objective via selection of a particular input parameter represented by a corresponding graphical icon in the user interface 704. Alternatively, or in addition to the text 704, the device 700 may output an audio/voice prompt to the rider via a speaker of the device 700 or an external speaker integrated with the e-bike. The user interface 702 may display, for example, a graphical icon 706 representative of a ride experience input parameter, a graphical icon 708 representative of a fitness input parameter, and a graphical icon 710 representative of a ride attribute input parameter. An illustrative selection 712 of the ride experience input parameter icon 706 is shown in FIG. 7. In particular, the icon 706 may correspond to a ride objective that is based on a particular type of ride experience desired by the rider (i.e., a particular "mood" of the rider).

Figure 8:
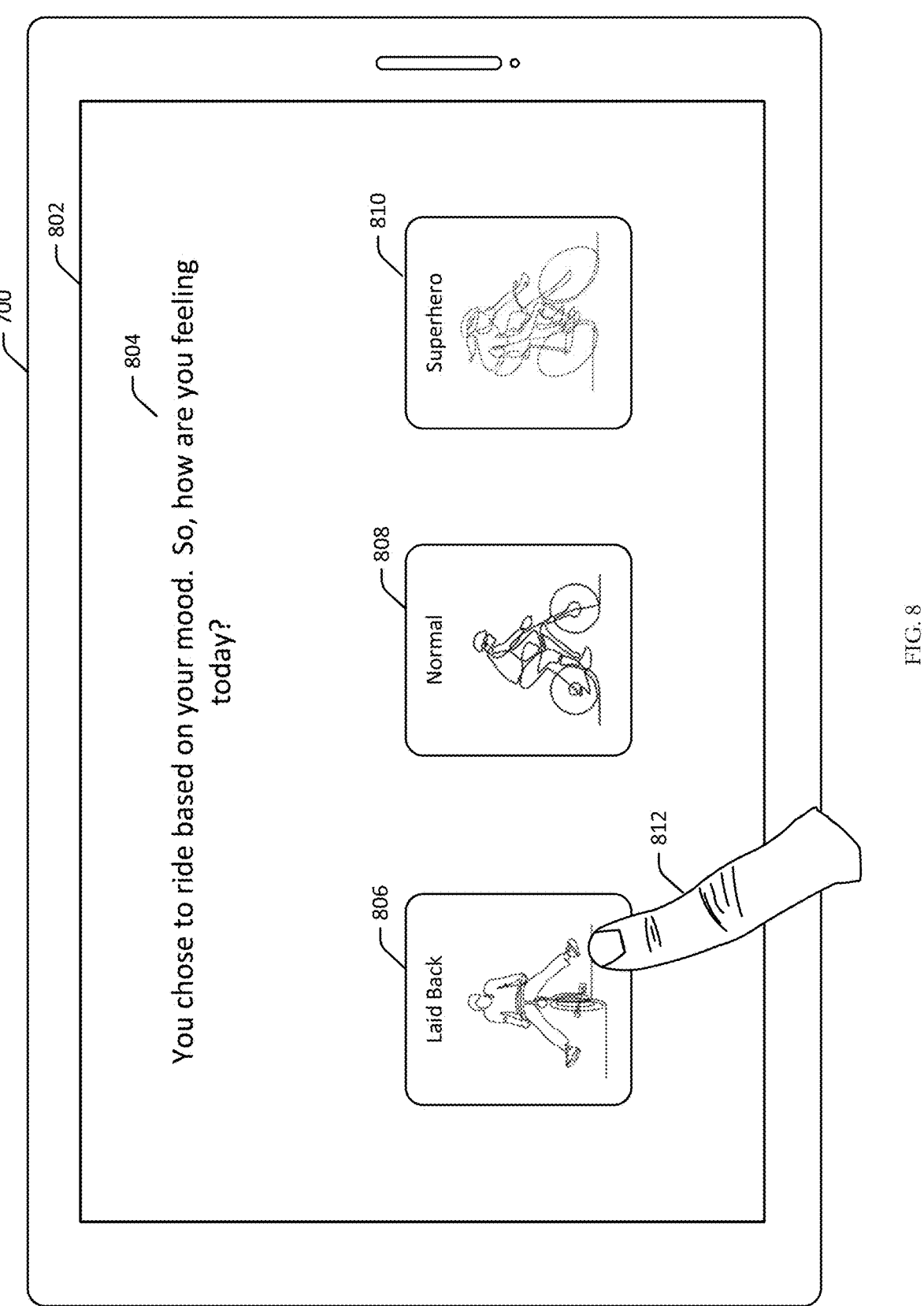
FIG. 8 depicts an illustrative user interface 802 for specifying a desired ride experience type for a selected ride experience input parameter in accordance with example embodiments of the disclosed technology.

FIG. 8 depicts an illustrative user interface 802 for specifying a desired ride experience type for a selected ride experience input parameter in accordance with example embodiments of the disclosed technology. FIG. 8 assumes that the ride experience input parameter icon 706 was selected from the user interface 702 of FIG. 7. The user interface 802 may include text prompts 804 (and/or voice prompts) asking the rider to specify a particular type of ride experience desired for the ride. The user interface 802 is illustratively shown as displaying graphical icons corresponding to three different candidate ride experiences. It should be appreciated, however, that in other embodiments, additional ride experience variants may be defined and selectable from the user interface 802 including potentially a custom ride experience that the rider can define.

The user interface 802 includes an example graphical icon 806 representing a "relaxed" ride experience, a graphical icon 808 representing a "normal" ride experience, and a graphical icon 810 representing a "superhero" ride experience. The ride experiences represented by icons 806, 808, and 810 may correspond, respectively, to ride experiences that progressively require the rider to expend an increasing amount of manual pedaling effort over the course of the e-bike ride. As such, the ride experiences represented by icons 806, 808, and 810 may correspond, when moving left to right from icon 806 to icon 810, to a progressively greater cumulative shifting towards the full overdrive end of the transmission ratio continuum and/or a progressively reduced cumulative use of motor assist, during rides corresponding to the ride experiences. An illustrative selection 812 of the graphical icon 806 corresponding to the "relaxed" ride experience is shown in FIG. 8. During implementation of the "relaxed" ride experience, the algorithm 112 may adopt a control scheme that involves a greater use of motor assist and/or a greater amount of transmission ratio shifting in the direction of full underdrive than compared to the "normal" and "superhero" ride experiences. This may be particularly the case when uphill terrain is being traversed.

Figure 9:
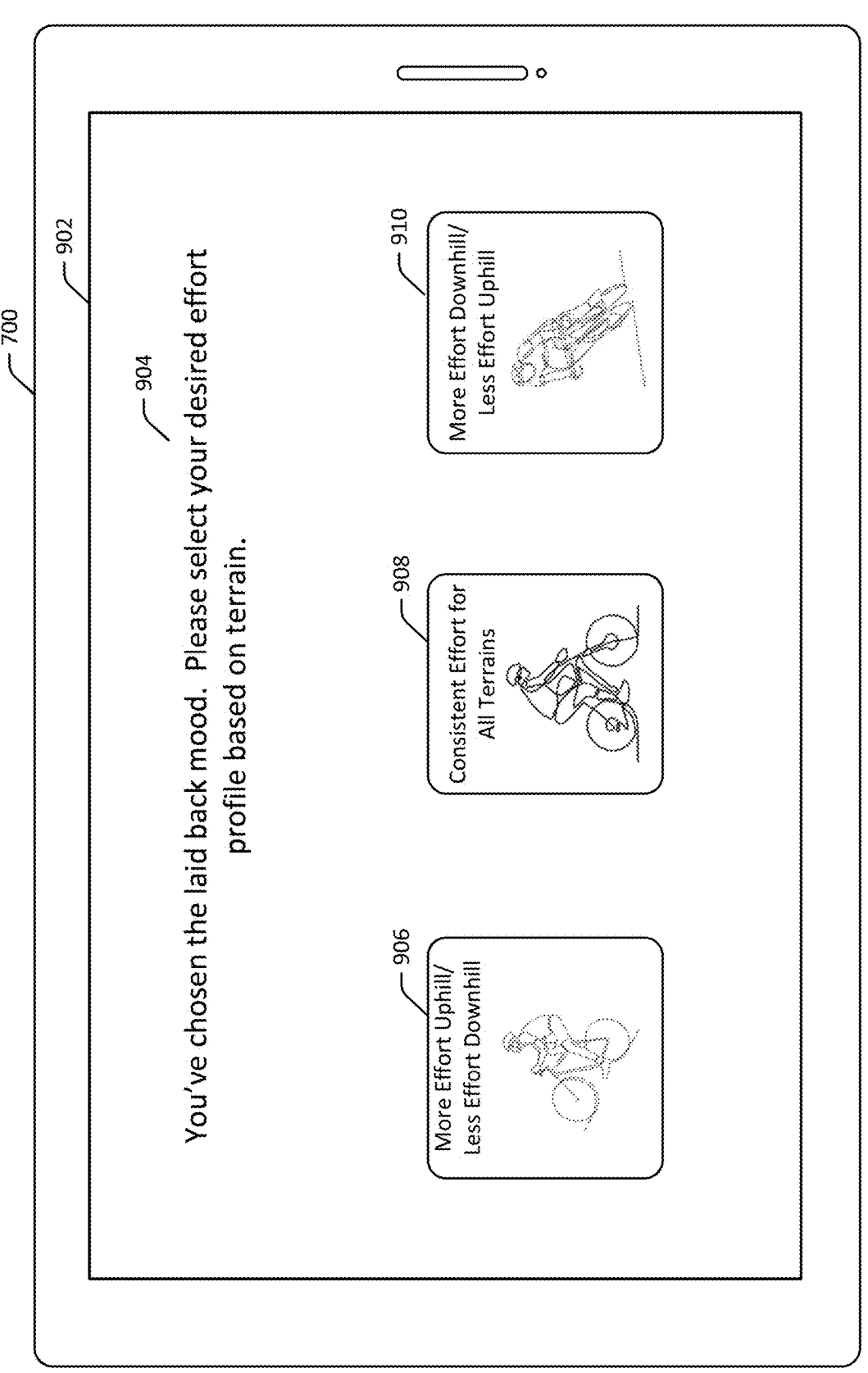
FIG. 9 depicts an illustrative user interface 902 for specifying a terrain-based effort profile for a selected ride experience type in accordance with example embodiments of the disclosed technology.

FIG. 9 depicts an illustrative user interface 902 for specifying a terrain-based effort profile for a selected mood/ride experience in accordance with example embodiments of the disclosed technology. The user interface 902 assumes that the graphical icon 806 corresponding to the "relaxed" ride experience was selected from the user interface 802 of FIG. 8. The user interface 902 may include a text prompt 904 (and/or voice prompts) requesting that the rider specify a terrain-based effort profile for the selected ride experience/mood type.

The user interface 902 illustratively depicts three different terrain-based effort profiles. In particular, the user interface 902 displays a graphical icon 906 corresponding to a terrain-based effort profile according to which the user will be required to provide more manual effort while traveling uphill and less effort while traveling downhill (corresponding to more overdrive and/or less motor assist while traveling uphill and more underdrive and/or more motor assist while traveling downhill). The user interface 902 may further display a graphical icon 908 corresponding to a consistent amount of effort across all terrains. Still further, the user interface 902 may display a graphical icon 910 corresponding to a terrain-based effort profile according to which the user will be required to provide less manual effort while traveling uphill and more effort while traveling downhill (corresponding to more underdrive and/or more motor assist while traveling uphill and more overdrive and/or less motor assist while traveling downhill).

Figure 10:
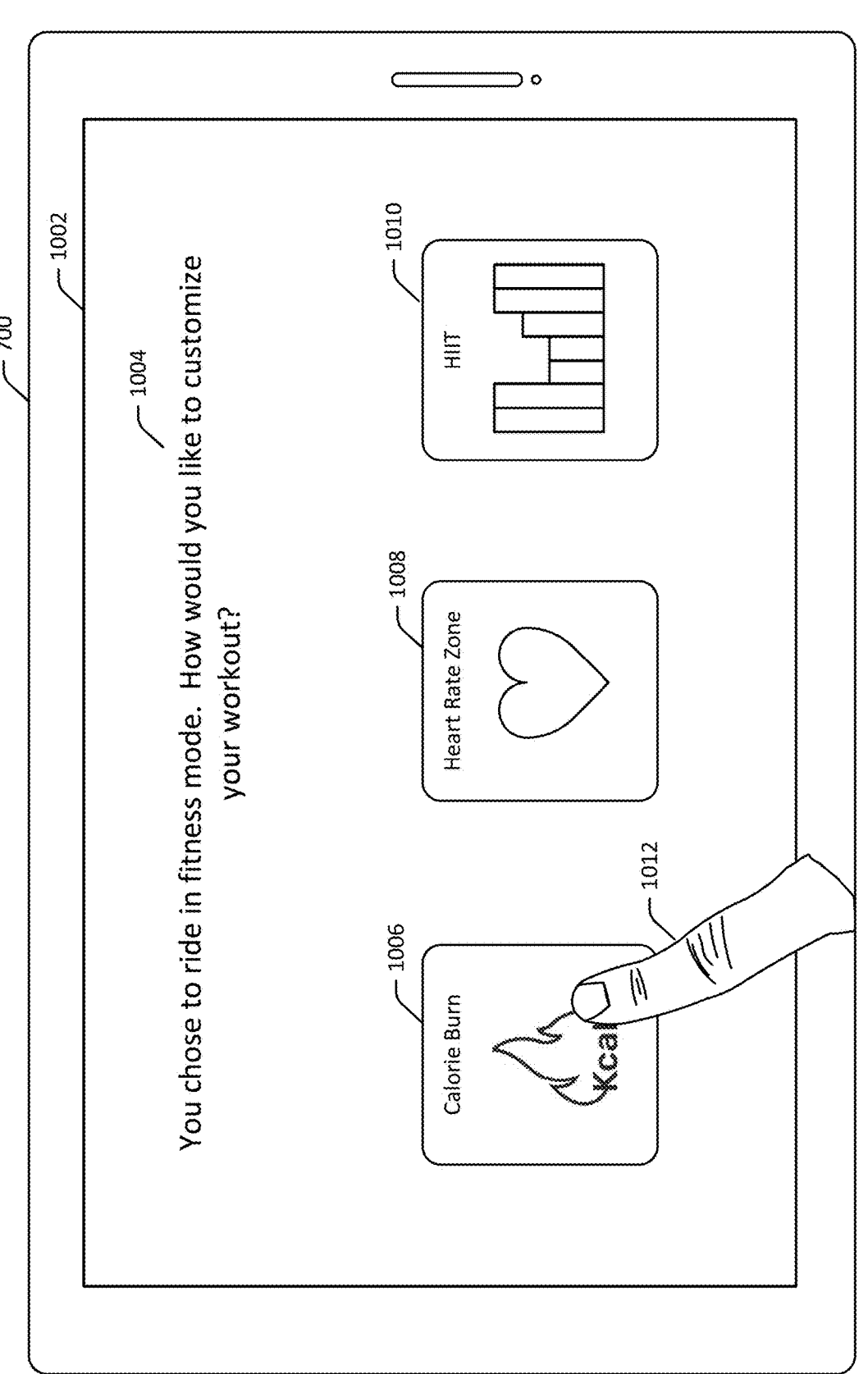
FIG. 10 depicts an illustrative user interface 1002 for specifying a ride objective for an e-bike ride based on a fitness-based input parameter in accordance with example embodiments of the disclosed technology.
Figure 11:
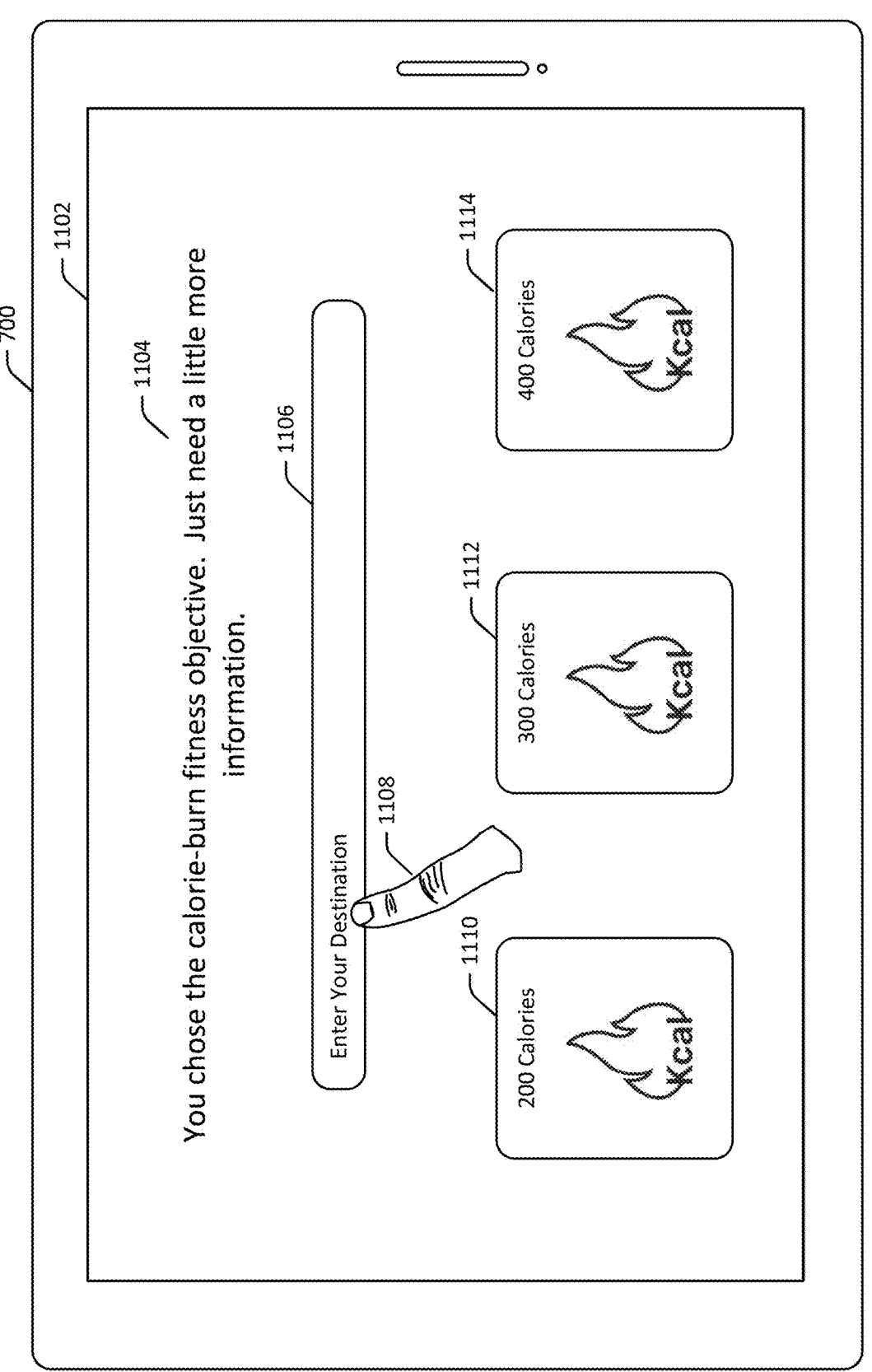
FIG. 11 depicts an illustrative user interface for selecting a desired number of calories to burn based on a specified destination as part of a selected caloric burn fitness-based ride objective in accordance with example embodiments of the disclosed technology.

FIG. 10 depicts an illustrative user interface 1002 for specifying a ride objective for an e-bike ride based on a fitness input parameter in accordance with example embodiments of the disclosed technology. The user interface 1002 may be presented on the display device 700 responsive to selection of the graphical icon 708, corresponding to a selection of a ride objective based on a fitness input parameter, from user interface 702 of FIG. 7. The user interface 1002 may present a text prompt 1004 (and/or a voice prompt) requesting that the rider select a particular type of fitness-based input parameter.

The user interface 1002 may include a graphical icon 1006 corresponding to a caloric burn ride objective, a graphical icon 1008 corresponding to a target heart rate zone ride objective, and a graphical icon 1010 corresponding to another type of fitness-based ride objective, which in this example is an HIIT ride objective. Depending on which graphical icon is selected, the algorithm 214 may adopt a control scheme that seeks to meet the fitness-based ride objective corresponding to the selected icon. In particular, if the graphical icon 1006 is selected, the algorithm 214 may adopt a control scheme for dynamically adjusting one or more controlled variables to ensure that a rider's desired number of calories are burned during the ride. Along similar lines, if the graphical icon 1008 is selected, the algorithm 214 may adopt a control scheme for dynamically adjusting one or more controlled variables to ensure that the rider's heart rate is maintained within various target heart rate zones for respective target durations of the ride. And, if the graphical icon 1010 is selected, the control algorithm 214 may, for example, adopt a control scheme for dynamically adjusting one or more controlled variables to ensure that a rider's heart rate alternates between a heart rate that is within a certain tolerance of the rider's peak heart rate (e.g., within 10% tolerance) during high-interval time periods and a heart rate that is within a certain tolerance of a specified reduced percentage of the rider's peak heart rate (e.g., within 10% of 75% of the rider's peak heart rate).

In an example scenario, assume that the rider makes a selection 1012 of the graphical icon 1006 corresponding to the caloric burn ride objective. In response, the user interface 1102 depicted in FIG. 11 may be presented on the display device 700. The rider may interact with the user interface 1102 to select a desired number of calories to burn during a ride based on a specified destination. In some embodiments, the user interface 1102 may include a field 1106 selectable 1108 by the rider to enter a destination location. In particular, the rider may enter the destination location in the field 1106 as free-form input. In some embodiments, an intelligent search feature may identify and present selectable candidate destination locations to the rider as the rider begins entering characters in the field 1106. In some embodiments, a map of a location surrounding the e-bike's current location may be presented in the user interface 1102, and the rider may be able to specify a destination location by selecting a particular point on the map. In some embodiments, the starting location may default to a current location of the e-bike. Alternatively, the rider may be able to enter the starting location in the same field 1106 (e.g., prior to entering the destination location) or in another field presented in the user interface 1102. In some embodiments, the starting and/or destination locations may default to prior historical locations (e.g., a most recent location); may be selectable from a list of favorite/historical locations; may be left un-specified by the rider, in which case, the control algorithm 214 may automatically determine them or provide candidate options to the rider for selection based on specified ride input parameters; and so forth.

In some embodiments, the ride control algorithm 214 may determine various candidate routes between the starting and destination locations. Each candidate route may be associated with a corresponding number of calories expected to be burned by the rider over the course of the route. The caloric burn associated with each route may be a function of characteristics of the route such as terrain (e.g., incline changes, elevation/altitude changes, changes in terrain type, etc.) as well as physical attributes of the rider such as the rider's sex, height, weight, body type, and the like. The physical attribute information for the rider may be determined from the biometric information 210C and/or the rider profile information 210D. In some embodiments, the user interface 1102 may include one or more selectable fields via which the rider may input the physical attribute information. In some embodiments, the different candidate caloric burn options may correspond to a same route but to different levels of manual effort that the rider will be expected to expend during the route. For instance, a greater caloric burn for a given route may correspond to a cumulatively lesser amount of motor assist and/or a cumulatively greater amount of shifting towards full overdrive during the ride than may occur for a lesser caloric burn for the same route.

The user interface 1102 illustratively presents three caloric burn options. In particular, the user interface 1102 includes a graphical icon 1110 representing a least candidate number of calories burned, a graphical icon 1112 representing an intermediate candidate number of calories burned, and a graphical icon 1114 representing a highest candidate number of calories burned. Based on the icon selected, the control algorithm may adopt a control scheme that dynamically sets/adjusts controlled variables such as transmission ratio and motor assist level along a route between the starting location and destination location based on changing environmental and/or operational conditions such as changes in terrain, changes in traffic conditions, changes in battery charge, and so forth, in order to ensure the rider is able to burn the selected number of calories. As the selected number of calories increases, the cumulative motor assist level provided during the ride (and/or during specific portions thereof) may be reduced and/or the transmission ratio may be shifted more towards full overdrive during the ride (and/or during specific portions thereof) in order to increase the number of calories burned. Alternatively, different caloric burn options may correspond to the same dynamic control of transmission ratio and/or motor assist during the ride, but to different routes that differ in terms of their traversal difficulty due to inherent characteristics of the routes (e.g., differences in terrain).

Figure 12:
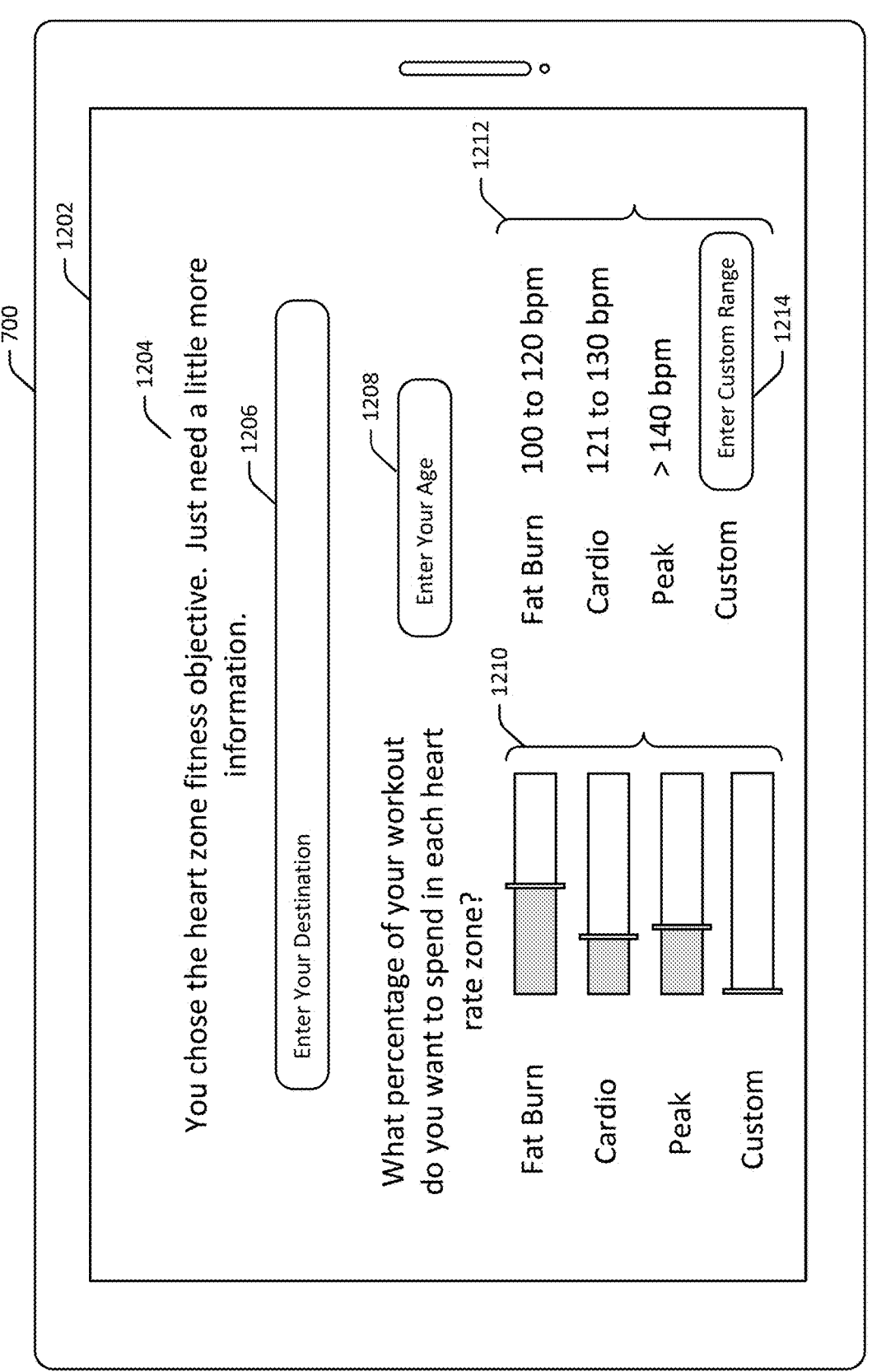
FIG. 12 depicts an illustrative user interface for specifying target heart rate zones in connection with a selected target heart zone fitness-based ride objective in accordance with example embodiments of the disclosed technology.

Referring again to the user interface 1002, in an alternative example scenario, if the rider selects the graphical icon 1008 corresponding to the target heart rate zones ride objective, the user interface 1202 of FIG. 12 may be presented to the rider. In particular, FIG. 12 depicts a user interface 1202 for specifying target percentages for a selected target heart rate zone ride objective in accordance with example embodiments of the disclosed technology. The user interface 1202 may include a text prompt 1204 (and/or an audio prompt) requesting that the rider provide additional information such as an indication of a destination location and a respective indication of the percentage of the ride that the rider wishes for her heart rate to be maintained in each of one or more target heart rate zones.

In particular, the user interface 1202 may include a field 1206 selectable by the rider to enter in a destination location. As with the field 1106 of user interface 1102, the rider may enter the destination location in the field 1206 as free-form input, and in some embodiments, an intelligent search feature may be provided that determines and makes available for selection candidate destination locations that match the input provided in the field 1206. Further, in some embodiments, a map of a location surrounding the e-bike's current location may be presented in the user interface 1302, and the rider may be able to specify a destination location by selecting a particular point on the map. In some embodiments, the starting location may default to a current location of the e-bike, while in other embodiments, the rider may be able to enter the starting location in the same field 1206 (e.g., prior to entering the destination location) or in another field presented in the user interface 1202.

The user interface 1202 is illustratively depicted as including a field 1208 selectable by the rider to enter the rider's age. In some embodiments, the field 1208 may not be present, in which case, the rider's age may be determined from the rider profile information 210D and/or the biometric information 210C. In some embodiments, one or more additional selectable fields may be presented in the user interface 1202 via which the rider may input additional attribute information of the rider such as sex, weight, height, body type (which may be selectable for a predetermined set of body types), and the like. Alternatively, such information may be determined from the rider profile information 210D and/or the biometric information 210C.

The user interface 1202 may further include a collection of graphical control elements 1210 (e.g., sliders) for specifying target percentages of the ride for various heart rate zones. More specifically, each slider may correspond to a particular heart rate zone, and the rider may specify a desired percentage of the ride that she would like her heart rate to be maintained in a particular heart rate zone by moving a marker horizontally along a continuum to the desired percentage value. In some embodiments, the rider may be prohibited from specifying a cumulative percentage sum for all heart rate zones that exceeds 100%. While sliders are depicted in FIG. 12 as example graphical control elements, it should be appreciated that any suitable user interface mechanism can be employed for receiving the target heart rate zone percentages from the rider. For instance, the rider may enter the target percentages into respective fields, select the target percentages from drop-down menus, or the like.

As previously noted, the heart rate zones may include zones having an established definition in the fitness context such as the "cardio" zone and the "fat burn" zone. Each heart rate zone may correspond to a respective range of heart rates 1212, which may be shown in the user interface 1202 for the rider's reference. Each heart rate zone may be tailored to a particular rider's sex, height, weight, body type, and the like. For example, the particular range of heart rates that corresponds to the fat burn zone (or the cardio zone) may vary from rider to rider based on their individual physical attributes. For instance, if the bounds of the fat burn heart rate zone are defined, at least in part, by reduced percentage(s) of the peak heart rate (e.g., 70% of the peak heart rate), these bounds may vary for different riders since their peak heart rates will likely differ based on their age, fitness level, etc. As such, the rider's physical attribute information may be used to calculate the heart rate range for each heart rate zone. The rider's physical attribute information may also be used to calculate a peak heart rate for the rider, and thus, a peak heart rate zone corresponding to any heart rate that exceeds the peak heart rate. Further, in some embodiments, the rider may be provided with the capability to define a custom heart rate zone by entering a custom heart rate range in a field 1214 of the user interface 1202. In addition, in some embodiments, the rider may be provided with the capability to specify a maximum heart rate that should not be exceeded at any point during the ride and/or a minimum heart rate that the rider wishes to stay above for at least a threshold period of time during the ride.

Referring again to FIG. 7, if the rider selects the graphical icon 710 corresponding to a ride objective based on a ride attribute parameter, one or more user interfaces (not shown) may be presented on the device 700, via which the rider can define/specify the desired ride attribute parameter. The ride attribute parameter may correspond to any of the types of ride attributes discussed previously including, without limitation, conserving a specified amount of battery charge at the conclusion of the ride, taking a specified route (e.g., a scenic route, a route with at least charging station along the way, etc.), and so forth. The algorithm 214 may then adopt a control scheme that seeks to satisfy the ride objective represented by the selected ride attribute parameter. If the ride attribute parameter is battery charge conservation, for example, then the algorithm may set/adjust controlled variables such as transmission ratio and motor assist (particularly during a coasting operational mode 408B and/or during downhill segments) in order to reduce the overall amount of motor assist employed and/or to shift the transmission ratio more towards full underdrive or full overdrive, whichever the case may be, such that at least a desired amount of battery charge remains at the conclusion of the ride.

It should be appreciated that any embodiments individually described herein can be combined in any manner to yield additional embodiments of the disclosed technology. It should further be appreciated that discussion herein of one or more aspects of any particular embodiment shall not be construed as an admission that such aspect(s) are not also shared by other embodiments of the disclosed technology.

Figure 13:
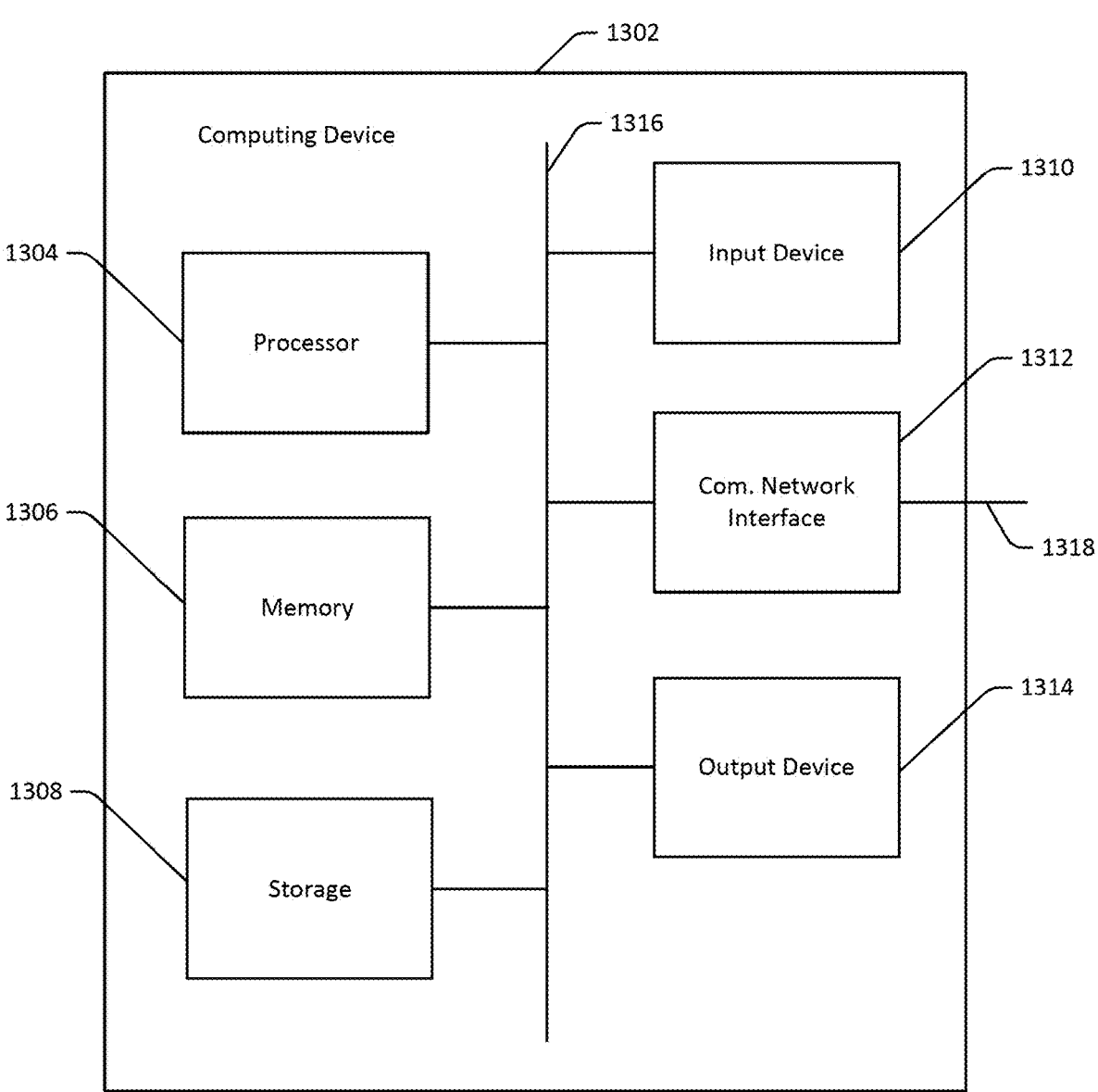
FIG. 13 is a block diagram depicting an example computing device that may be used to implement features disclosed herein in accordance with example embodiments of the disclosed technology.

FIG. 13 depicts a diagram of an example of a computing device 1302. In some embodiments, the computing device 1302 may be a particular implementation of the controller 112 and may perform some or all of the functionality described herein in connection with the controller 112. In other embodiments, the computing device 1302 may be a device remote from the e-bike 100 (e.g., a cloud-based server) that performs some or all of the functionality of the controller 112. The computing device 1302 comprises a processor 1304, memory 1306, storage 1308, an input device 1310, a communication network interface 1312, and an output device 1314 communicatively coupled to a communication channel 1316. The processor 1304 is configured to execute executable instructions (e.g., programs). In some example embodiments, the processor 1304 comprises circuitry or any processor capable of processing the executable instructions.

The memory 1306 stores data. Some examples of memory 1306 include storage devices, such as RAM, ROM, RAM cache, virtual memory, etc. In various embodiments, working data is stored within the memory 1306. The data within the memory 1306 may be cleared or ultimately transferred to the storage 1308.

The storage 1308 includes any storage configured to retrieve and store data. Some examples of the storage 1308 include flash drives, hard drives, optical drives, cloud storage, and/or magnetic tape. Each of the memory system 1306 and the storage system 1308 comprises a computer-readable medium, which stores instructions or programs executable by processor 1304.

The input device 1310 is any device that inputs data (e.g., mouse and keyboard). The output device 1314 outputs data (e.g., a speaker or display). It will be appreciated that the storage 1308, input device 1310, and output device 1314 may be optional. For example, the routers/switchers may comprise the processor 1304 and memory 1306 as well as a device to receive and output data (e.g., the communication network interface 1312 and/or the output device 1314).

The communication network interface 1312 may be coupled to a network via the link 1318. The communication network interface 1312 may support communication over an Ethernet connection, a serial connection, a parallel connection, and/or an ATA connection. The communication network interface 1312 may also support wireless communication (e.g., 802.11, WiMax, LTE, 5G, WiFi). It will be apparent that the communication network interface 1312 may support many wired and wireless standards.

It will be appreciated that the hardware elements of the computing device 1302 are not limited to those depicted in FIG. 13. A computing device 1302 may comprise more or less hardware, software and/or firmware components than those depicted (e.g., drivers, operating systems, touch screens, biometric analyzers, and/or the like). Further, hardware elements may share functionality and still be within various embodiments described herein. In one example, encoding and/or decoding may be performed by the processor 1104 and/or a co-processor located on a GPU.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently. The datastore or database may include cloud storage. It will further be appreciated that the term "or," as used herein, may be construed in either an inclusive or exclusive sense. Moreover, plural instances may be provided for resources, operations, or structures described herein as a single instance. The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

The systems, methods, engines, datastores, and/or databases described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The present invention(s) are described above with reference to example embodiments. It will be apparent to those skilled in the art that various modifications may be made and other embodiments may be used without departing from the broader scope of the present invention(s). Therefore, these and other variations upon the example embodiments are intended to be covered by the present invention(s).

What is claimed is:

1. A method of objective-based ride control of a motor-assisted bicycle, the method comprising:
   receiving, via a user interface, user input indicative of a user identity of a user and a desired ride experience for the user, the desired ride experience associated with a set of input parameters;
   receiving sensor information indicative of at least one of an operational characteristic of the motor-assisted bicycle or an environmental characteristic;
   using the user identity to obtain an objective-based user-specific ride control algorithm dedicated to the user;
   using the objective-based user-specific ride control algorithm, the set of input parameters and the sensor information to determine a set of controlled variable settings for one or more operational components of the motor-assisted bicycle, the set of one or more operational components being selected from operational components of a transmission and operational components of an electric motor;

controlling the one or more operational components of the motor-assisted bicycle based on the set of controlled variable settings to support the desired ride experience for the user;
receiving user feedback regarding an actual ride experience of the user; and
adjusting the objective-based user-specific ride control algorithm based on the user feedback to modify the desired ride experience for the user in the future.

2. The method of claim 1, wherein the set of input parameters comprises at least one of a ride experience parameter, a fitness parameter, or a ride attribute parameter.

3. The method of claim 2, wherein the ride experience parameter indicates a level of effort that the user desires to expend for a ride between a starting location and a destination location.

4. The method of claim 2, wherein the fitness parameter comprises one of a target caloric burn for the user for a ride between a starting location and a destination location or a heart rate zone for at least a portion of the ride.

5. The method of claim 2, wherein the ride attribute parameter comprises a target remaining charge of a battery of the motor-assisted bicycle upon reaching a destination location.

6. The method of claim 1, wherein the set of controlled variable settings comprises at least one of a transmission ratio of the motor-assisted bicycle, an adjustment to the transmission ratio, a torque output by the electric motor of the motor-assisted bicycle, or an adjustment to the torque output.

7. The method of claim 1, wherein the set of controlled variable settings comprises at least one of a braking force applied by a braking mechanism of the motor-assisted bicycle, an adjustment to the braking force, a suspension pressure of a suspension system of the motor-assisted bicycle, or an adjustment to the suspension pressure.

8. The method of claim 1, wherein the sensor information comprises at least one of location information indicative of a location of the motor-assisted bicycle, an elevation at the location of the motor-assisted bicycle, a cadence speed of the motor-assisted bicycle, a speed of the motor-assisted bicycle, a power output of the electric motor of the motor-assisted bicycle, an input current to the electric motor, a braking force applied to a braking mechanism of the motor-assisted bicycle, or a suspension pressure of a suspension system of the motor-assisted bicycle.

9. The method of claim 1, wherein receiving the sensor information comprises receiving the sensor information from one or more sensors onboard the motor-assisted bicycle.

10. The method of claim 1, wherein using the objective-based user-specific ride control algorithm comprises:
   monitoring the sensor information over time;
   determining an operational mode of the motor-assisted bicycle based on the monitored sensor information; and
   determining the set of controlled variable settings based on the determined operational mode of the motor-assisted bicycle.

11. The method of claim 10, wherein determining the operational mode of the motor-assisted bicycle comprises detecting particular sensor information that indicates an increase in terrain incline, the particular sensor information comprising at least one of a decreasing rate of speed of the motor-assisted bicycle for at least a threshold period of time, a combination of a location of the motor-assisted bicycle and a direction of travel of the motor-assisted bicycle, or a combination of a decrease in suspension travel at a rear of the motor-assisted bicycle and an increase in suspension travel at a front of the motor-assisted bicycle.

12. The method of claim 11, wherein determining the set of controlled variable settings based on the determined operational mode of the motor-assisted bicycle comprises one or more of shifting a transmission ratio of the motor-assisted bicycle closer towards full underdrive, increasing a torque output of the electric motor of the motor-assisted bicycle, increasing a suspension pressure of a suspension system of the motor-assisted bicycle at the rear of the motor-assisted bicycle, or decreasing a suspension pressure of the suspension system of the motor-assisted bicycle at the front of the motor-assisted bicycle.

13. The method of claim 12, wherein the set of input parameters comprises a ride experience parameter indicating a first level of effort that the user desires to expend for a first ride and a second level of effort that the user desires to expend for a second ride, the second level of effort being greater than the first level of effort, and wherein at least one of a shift in the transmission ratio towards full underdrive or an increase in the torque output of the electric motor is greater for the first ride than for the second ride.

14. The method of claim 10, wherein determining the operational mode of the motor-assisted bicycle comprises detecting particular sensor information that indicates an emergency braking operation, the particular sensor information comprising at least one of an increase in braking pressure by more than a threshold amount in less than a first threshold period of time, a decrease in cadence speed by more than a threshold amount in less than a second threshold period of time, or a combination of an increase in suspension travel at a rear of the motor-assisted bicycle and a decrease in suspension travel at a front of the motor-assisted bicycle.

15. The method of claim 14, wherein determining the set of controlled variable settings based on the determined operational mode of the motor-assisted bicycle comprises one or more of stopping power to a transmission of the motor-assisted bicycle, stopping power to the electric motor of the motor-assisted bicycle, decreasing a suspension pressure of a suspension system of the motor-assisted bicycle at the rear of the motor-assisted bicycle, increasing a suspension pressure of the suspension system of the motor-assisted bicycle at the front of the motor-assisted bicycle, or initiating an automatic braking operation of the motor-assisted bicycle.

16. A motor-assisted bicycle, comprising:
a frame;
a transmission;
an electric motor coupled to the transmission;
a power source for supplying power to the electric motor;
a crankset;
one or more sensors; and
a controller communicatively coupled to the one or more sensors, the transmission and the electric motor, the controller comprising:
memory storing executable instructions; and
a processor configured to access the memory and execute the instructions to:
receive, via a user interface, user input indicative of a user identity of a user and a desired ride experience for the user, the desired ride experience associated with a set of input parameters;
receive sensor information from the one or more sensors, the sensor information indicative of at least one of an operational characteristic of the motor-assisted bicycle or an environmental characteristic;

use the user identity to obtain an objective-based user-specific ride control algorithm dedicated to the user;
use the objective-based user-specific ride control algorithm, the set of input parameters and the sensor information to determine a set of controlled variable settings for one or more operational components of the motor-assisted bicycle, the set of one or more operational components being selected from operational components of the transmission and operational components of the electric motor;
control the one or more operational components of the motor-assisted bicycle based on the set of controlled variable settings to support the desired ride experience for the user;
receive user feedback regarding an actual ride experience of the user; and
adjust the objective-based user-specific ride control algorithm based on the user feedback to modify the desired ride experience for the user in the future.

17. The motor-assisted bicycle of claim 16, wherein the power source is a battery and the set of input parameters comprises a target remaining charge of the battery upon reaching a destination location, the processor being further configured to execute the instructions to control the battery to reduce an amount of power supplied to the electric motor in order to conserve charge of the battery to meet the target remaining charge.

18. The motor-assisted bicycle of claim 16, wherein the processor is configured to use the objective-based user-specific ride control algorithm by executing the instructions to:
monitor the sensor information over time;
determine an operational mode of the motor-assisted bicycle based on the monitored sensor information; and
determine the set of controlled variable settings based on the determined operational mode of the motor-assisted bicycle.

19. The motor-assisted bicycle of claim 16, wherein the set of controlled variable settings comprises at least one of a transmission ratio of the motor-assisted bicycle, an adjustment to the transmission ratio, a torque output by the electric motor, or an adjustment to the torque output.

20. The motor-assisted bicycle of claim 16, further comprising:
a braking mechanism; and
a suspension system,
wherein the set of controlled variable settings comprises at least one of a braking force applied by the braking mechanism, an adjustment to the braking force, a suspension pressure of the suspension system, or an adjustment to the suspension pressure.

21. A non-transitory computer-readable medium for objective-based ride control of a motor-assisted bicycle, the non-transitory computer-readable medium readable by a processing circuit and storing instructions executable by the processing circuit to cause a method to be performed, the method comprising:
receiving, via a user interface, user input indicative of a user identity of a user and a desired ride experience for the user, the desired ride experience associated with a set of input parameters;
receiving sensor information indicative of at least one of an operational characteristic of the motor-assisted bicycle or an environmental characteristic;

using the user identity to obtain an objective-based user-specific ride control algorithm dedicated to the user;

using the objective-based user-specific ride control algorithm, the set of input parameters and the sensor information to determine a set of controlled variable settings for one or more operational components of the motor-assisted bicycle, the set of one or more operational components being selected from operational components of a transmission and operational components of an electric motor;

controlling the one or more operational components of the motor-assisted bicycle based on the set of controlled variable settings to support the desired ride experience for the user;

receiving user feedback regarding an actual ride experience of the user; and adjusting the objective-based user-specific ride control algorithm based on the user feedback to modify the desired ride experience for the user in the future.

* * * * *